(12) United States Patent
Rose et al.

(10) Patent No.: US 12,663,555 B2
(45) Date of Patent: Jun. 23, 2026

(54) SPECTRAL ANALYSIS AND MACHINE LEARNING TO DETECT OFFSET WELL COMMUNICATION USING HIGH FREQUENCY ACOUSTIC OR VIBRATION SENSING

(71) Applicant: Momentum AI, LLC, Edmond, OK (US)

(72) Inventors: Jeffrey Neal Rose, Boulder, CO (US); Jonathan Swanson Rose, Boulder, CO (US)

(73) Assignee: Momentum AI, LLC, Edmond, OK (US)

( * ) Notice: Subject to any disclaimer, the term of this patent is extended or adjusted under 35 U.S.C. 154(b) by 324 days.

(21) Appl. No.: 18/348,739

(22) Filed: Jul. 7, 2023

(65) Prior Publication Data

US 2023/0417940 A1     Dec. 28, 2023

Related U.S. Application Data

(63) Continuation of application No. 17/291,040, filed as application No. PCT/US2020/064314 on Dec. 10, 2020, now Pat. No. 11,726,223.

(Continued)

(51) Int. Cl.
*G01V 1/50* (2006.01)
*E21B 41/00* (2006.01)

(Continued)

(52) U.S. Cl.
CPC ............... *G01V 1/42* (2013.01); *E21B 41/00* (2013.01); *E21B 43/26* (2013.01); *E21B 47/095* (2020.05);

(Continued)

(58) Field of Classification Search
CPC . G01V 1/42; G01V 1/301; G01V 1/50; G01V 2210/646; E21B 47/095;

(Continued)

(56) References Cited

U.S. PATENT DOCUMENTS 4,665,511 A     5/1987   Rodney et al.
4,757,873 A     7/1988   Linyaev et al.

(Continued)

FOREIGN PATENT DOCUMENTS

AU       2010308495 A1 *  5/2012   ............. E21B 49/00
EP       2 327 857 B1     3/2014

(Continued)

OTHER PUBLICATIONS

Anderson, "Fighting Water with Water how Engineers are Turning the Tides on Frac Hits", Abra Controls Inc., 10 pages, Dec. 4, 2018.

(Continued)

*Primary Examiner* — Krystine E Breier
(74) *Attorney, Agent, or Firm* — NOD Law PC

(57) ABSTRACT

This disclosure presents a system, method, and apparatus for preventing fracture communication between wells, the system comprising: a sensor coupled to a fracking wellhead, circulating fluid line, or standpipe of a well and configured to convert acoustic vibrations in fracking fluid in the well into an electrical signal; a memory configured to store the electrical signal; a machine-learning system configured to analyze current frequency components of the electrical signal in a window of time and to identify impending fracture communication between the well and an offset well, the machine-learning system having been trained on previous frequency components of electrical signals measured during previous instances of fracture communication (Continued)

between wells; and a user interface configured to return a notification of the impending fracture communication to an operator of the well.

40 Claims, 28 Drawing Sheets

Related U.S. Application Data

(60) Provisional application No. 63/058,548, filed on Jul. 30, 2020, provisional application No. 63/058,534, filed on Jul. 30, 2020, provisional application No. 62/945,957, filed on Dec. 10, 2019, provisional application No. 62/945,949, filed on Dec. 10, 2019, provisional application No. 62/945,929, filed on Dec. 10, 2019, provisional application No. 62/945,953, filed on Dec. 10, 2019.

(51) Int. Cl.

| | |
|---|---|
| *E21B 43/26* | (2006.01) |
| *E21B 47/095* | (2012.01) |
| *E21B 47/14* | (2006.01) |
| *E21B 49/00* | (2006.01) |
| *G01V 1/30* | (2006.01) |
| *G01V 1/42* | (2006.01) |
| *E21B 47/06* | (2012.01) |

(52) U.S. Cl.
CPC .............. *E21B 47/14* (2013.01); *E21B 49/00* (2013.01); *G01V 1/301* (2013.01); *G01V 1/50* (2013.01); *E21B 47/06* (2013.01); *E21B 2200/22* (2020.05); *G01V 2210/43* (2013.01); *G01V 2210/646* (2013.01)

(58) Field of Classification Search
CPC .......... E21B 47/14; E21B 41/00; E21B 43/26; E21B 49/00; E21B 2200/22
See application file for complete search history.

(56) References Cited

U.S. PATENT DOCUMENTS

| | | | |
|---|---|---|---|
| 5,031,155 | A | 7/1991 | Hsu |
| 5,130,950 | A | 7/1992 | Orban et al. |
| 5,170,378 | A | 12/1992 | Mellor et al. |
| 5,214,251 | A | 5/1993 | Orban et al. |
| 5,235,984 | A | 8/1993 | D'Sa |
| 5,341,345 | A | 8/1994 | Warner et al. |
| 5,459,697 | A | 10/1995 | Chin et al. |
| 5,515,336 | A | 5/1996 | Chin et al. |
| 5,753,812 | A | 5/1998 | Aron et al. |
| 5,995,447 | A | 11/1999 | Mandal et al. |
| 6,002,639 | A | 12/1999 | Birchak et al. |
| 6,088,294 | A | 7/2000 | Leggett, III et al. |
| 6,213,250 | B1 | 4/2001 | Wisniewski et al. |
| 6,366,531 | B1 | 4/2002 | Varsamis et al. |
| 6,564,899 | B1 | 5/2003 | Arian et al. |
| 6,672,163 | B2 | 1/2004 | Han et al. |
| 6,995,500 | B2 | 2/2006 | Yogeswaren |
| 7,036,363 | B2 | 5/2006 | Yogeswaren |
| 7,075,215 | B2 | 7/2006 | Yogeswaren |
| 7,100,688 | B2 | 9/2006 | Stephenson et al. |
| 7,339,494 | B2 | 3/2008 | Shah et al. |
| 7,460,435 | B2 | 12/2008 | Garcia-Osuna et al. |
| 7,513,147 | B2 | 4/2009 | Yogeswaren |
| 7,587,936 | B2 | 9/2009 | Han |
| 7,819,188 | B2 | 10/2010 | Auzerais et al. |
| 7,999,695 | B2 | 8/2011 | Rodney et al. |
| 8,162,050 | B2 | 4/2012 | Roddy et al. |
| 8,818,779 | B2 | 8/2014 | Sadlier et al. |
| 8,898,044 | B2 | 11/2014 | Craig |

| | | | | |
|---|---|---|---|---|
| 9,194,967 | B2 | 11/2015 | Lacazette et al. | |
| 9,477,002 | B2 | 10/2016 | Miller et al. | |
| 9,557,434 | B2 | 1/2017 | Keller et al. | |
| 9,567,819 | B2 | 2/2017 | Cavender et al. | |
| 9,988,900 | B2 | 6/2018 | Kampfer et al. | |
| 10,030,497 | B2 | 7/2018 | Dawson et al. | |
| 10,036,233 | B2 | 7/2018 | Tang et al. | |
| 10,385,670 | B2 | 8/2019 | James et al. | |
| 10,392,916 | B2 | 8/2019 | Moos et al. | |
| 10,400,584 | B2 | 9/2019 | Palomarez | |
| 10,415,376 | B2 | 9/2019 | Song et al. | |
| 10,458,233 | B2 | 10/2019 | Xia | |
| 10,465,505 | B2 | 11/2019 | Disko et al. | |
| 10,480,308 | B2 | 11/2019 | Morrow et al. | |
| 10,781,690 | B2 | 9/2020 | Malik et al. | |
| 11,015,436 | B2 | 5/2021 | Adamopoulos et al. | |
| 11,313,215 | B2 | 4/2022 | Yi et al. | |
| 11,608,740 | B2 | 3/2023 | Moos et al. | |
| 11,726,223 | B2 | 8/2023 | Rose et al. | |
| 11,740,377 | B2 | 8/2023 | Thompson et al. | |
| 12,287,444 | B2 | 4/2025 | Thompson et al. | |
| 2010/0118657 | A1* | 5/2010 | Trinh ...................... | E21B 44/00 367/82 |
| 2012/0106292 | A1 | 5/2012 | Fuller et al. | |
| 2012/0111559 | A1 | 5/2012 | Deady et al. | |
| 2012/0111560 | A1* | 5/2012 | Hill ................... | E21B 43/11857 166/308.1 |
| 2013/0206398 | A1 | 8/2013 | Tufano et al. | |
| 2014/0110167 | A1 | 4/2014 | Goebel et al. | |
| 2014/0172306 | A1 | 6/2014 | Brannigan et al. | |
| 2015/0233232 | A1 | 8/2015 | Rodney et al. | |
| 2015/0285937 | A1* | 10/2015 | Keller ..................... | E21B 47/16 166/250.1 |
| 2015/0337653 | A1 | 11/2015 | Hill et al. | |
| 2016/0115778 | A1 | 4/2016 | Van Oort et al. | |
| 2017/0241221 | A1 | 8/2017 | Seshadri et al. | |
| 2018/0120865 | A1 | 5/2018 | Nuryaningsih et al. | |
| 2018/0171773 | A1 | 6/2018 | Nessjoen et al. | |
| 2018/0171774 | A1 | 6/2018 | Ringer et al. | |
| 2019/0033898 | A1 | 1/2019 | Shah et al. | |
| 2019/0120044 | A1 | 4/2019 | Langnes et al. | |
| 2019/0120047 | A1 | 4/2019 | Jin et al. | |
| 2019/0203585 | A1 | 7/2019 | Nguyen et al. | |
| 2019/0242253 | A1 | 8/2019 | Felkl et al. | |
| 2019/0257972 | A1 | 8/2019 | Palmer et al. | |
| 2019/0353557 | A1 | 11/2019 | Zhang et al. | |
| 2020/0256187 | A1 | 8/2020 | Lakings et al. | |
| 2021/0025383 | A1 | 1/2021 | Bodishbaugh et al. | |
| 2021/0032978 | A1 | 2/2021 | Kabannik | |
| 2021/0140312 | A1 | 5/2021 | Dumoit et al. | |
| 2022/0049601 | A1 | 2/2022 | Jaaskelainen et al. | |
| 2022/0186605 | A1 | 6/2022 | Quan et al. | |
| 2022/0365239 | A1 | 11/2022 | Rose et al. | |
| 2022/0381934 | A1 | 12/2022 | Thompson et al. | |
| 2023/0025091 | A1 | 1/2023 | Thompson et al. | |
| 2023/0228897 | A1 | 7/2023 | Thompson et al. | |
| 2023/0350091 | A1 | 11/2023 | Thompson et al. | |
| 2023/0417941 | A1 | 12/2023 | Thompson et al. | |

FOREIGN PATENT DOCUMENTS

| | | | | |
|---|---|---|---|---|
| EP | 2 746 527 | B1 | 10/2020 | |
| WO | WO-2011049648 | A1 * | 4/2011 | ........... E21B 49/008 |
| WO | 2016/185435 | A1 | 11/2016 | |
| WO | 2018/117890 | A1 | 6/2018 | |
| WO | 2018/217201 | A1 | 11/2018 | |
| WO | 2019040639 | A1 | 2/2019 | |
| WO | 2021/119300 | A1 | 6/2021 | |
| WO | 2021/119306 | A1 | 6/2021 | |
| WO | 2021/119313 | A1 | 6/2021 | |
| WO | 2021/119324 | A1 | 6/2021 | |

OTHER PUBLICATIONS

Baig et al., "Do Hydraulic Fractures Induce Events Large Enough to be Felt on Surface", CSEG Recorder, 11 pages, online available at <https://csegrecorder.com/articles/view/do-hydraulic-fractures-

(56) References Cited

OTHER PUBLICATIONS induce-events-large-enough-to-be-felt-on-surface>, Known as early as Nov. 22, 2019.

Chen et al, "Toward the Origin of Long-Period Long-Duration Seismic Events during Hydraulic Fracturing Treatment: A Case Study in the Shale Play of Sichuan Basin, China", Seismological Research Letters, vol. 89, No. 3, pp. 1075-1083, May/Jun. 2018.

Daneshy et al., "Fracture Shadowing: A Direct Method for Determining of the Reach and Propagation Pattern of Hydraulic Fractures in Horizontal Wells", SPE Hydraulic Fracturing Technology Conference, pp. 1-9, 2012.

"Distributed Acoustic Sensing Systems (DAS)", Fibre Completion Services, 7 pages, online available at <https:/fibrecompletions.com/distributed-acoustic-sensing-das/>, Known as early as Oct. 21, 2019.

Elmer, William G., "Abstract for 2017 ALRDC Seminar on New Artificial Lift Technology: Smart ESD with Frac Hit Detection", Encline Artificial Lift Technologies LLC., 2 pages, 2017.

Ex Parte Quayle Action received for U.S. Appl. No. 17/292,768 dated Apr. 19, 2023, 10 pages.

"Frac Communication", Halliburton, 1 pages, online available at <https://ww.halliburton.com/en-US/ps/testing-subsea/reservoir-testing-analysis/data-acquisition/spidr/frac-communication.html>, Known as early as Nov. 22, 2019.

Haydu, Carter, "Sensor Suite Illuminates Downhole Fracture Development, Production Efficiency", Multistage Fracking, Digital, 3 pages, 2015.

International Preliminary Report on Patentability received for PCT Application Serial No. PCT/US2020/064294 dated Jun. 23, 2022, 11 pages.

International Preliminary Report on Patentability received for PCT Application Serial No. PCT/US2020/064303 dated Jun. 23, 2022, 11 pages.

International Preliminary Report on Patentability received for PCT Application Serial No. PCT/US2020/064314 dated Jun. 23, 2022, 9 pages.

International Preliminary Report on Patentability received for PCT Application Serial No. PCT/US2020/064327 dated Jun. 23, 2022, 7 pages.

International Search Report and Written Opinion received for International PCT Application Serial No. PCT/US2020/064294 dated Apr. 21, 2021, 13 pages.

International Search Report and Written Opinion received for International PCT Application Serial No. PCT/US2020/064303 dated Mar. 4, 2021, 16 pages.

International Search Report and Written Opinion received for International PCT Application Serial No. PCT/US2020/064314 dated Mar. 4, 2021, 15 pages.

International Search Report and Written Opinion received for International PCT Application Serial No. PCT/US2020/064327 dated May 24, 2021, 12 pages.

Invitation to Pay Additional Fees received for PCT Application Serial No. PCT/US2020/064294 dated Feb. 19, 2021, 2 pages.

Invitation to Pay Additional Fees received for PCT Application Serial No. PCT/US2020/064327 dated Feb. 17, 2021, 2 pages.

Jacobs, Trent "To Solve Frac Hits, Unconventional Engineering must Revolve Around Them", JPT Digital Editor, 19 pages, online available at <https://pubs.spe.org/en/jptflpt-article-detail/?art=5089>, Published on Feb. 8, 2019, Known as early as on Oct. 18, 2019.

Jacobs, Trent, "Innovative Pressure Map Offers Insights on Frac Hits", JPT Digital Editor, 5 pages, online available at <https://pubs.spe.org/en/jpt/jpt-article-detail/?art=4462>, Published on Aug. 7, 2018, Known as early as Oct. 21, 2019.

Jacobs, Trent, "To Right Size Fractures, Producers Adopt Robust Monitoring and Custom Completions", JPT Digital Editor, 17 pages, online available at <https://pubs.spe.org/en/jpt/jpt-article-detail/?art=5862>, Published on Sep. 1, 2019, Known as early as Oct. 21, 2019.

Jin et al., "Machine Learning-based Fracture-Hit Detection Algoritm using LFDAS Signal", The Leading Edge, 12 pages, online available at <www.tleonline.org/theleadingedge/july_2019/MobilePagedArticle.action?articleId=1501610#articleId1501610>, Published on Jul. 2019.

Maxwell, Shawn C., "What Does Microseismic Tell us About Hydraulic Fracture Deformation", CSEG Recorder, pp. 30-45, Oct. 2011.

"Minimizing Risk and Well Damage from Frac Hits", OleumTech, 7 pages, online available at <https://oleumtech.com/news-and-blogs/2019/01/wireless-solution-for-minimizing-well-damage-from-tacking>, published on Jan. 8, 2019, Known as early as Oct. 21, 2019.

Molenaar et al., "Field Cases of Hydraulic Fracture Stimulation Diagnostics using Fiber Optic Distributed Acoustic Sensing (Das) Measurements and Analyses", SPE Unconventional Gas Conference and Exhibition, Jan. 28-30, 2013, Muscat, Oman, 10 pages, 2013.

Notice of Allowance received for U.S. Appl. No. 17/291,040 dated Mar. 20, 2023, 9 pages.

Notice of Allowance received for U.S. Appl. No. 17/291,040 dated Mar. 23, 2023, 9 pages.

Notice of Allowance received for U.S. Appl. No. 17/292,768 dated May 11, 2023, 7 pages.

Notice of Allowance received for U.S. Appl. No. 17/782,125 dated Apr. 5, 2023, 8 pages.

"Particle Imaging Analysis—Flowcam: Oil and Gas", Merkel Technologies Ltd., 6 pages, online available at <https://merkel.co.il/flowcam-oil-and-gas>, Known as early as Feb. 6, 2020.

Platt et al., "Estimating the Creation and Removal Date of Fracking Ponds using Trend Analysis of Landsat Imagery", "Environmental Management", vol. 61, pp. 310-320, 2018.

Requirement for Restriction received for U.S. Appl. No. 17/292,768 dated Feb. 10, 2023, 9 pages.

Richter et al., "Hydraulic Fracture Monitoring and Optimization in Unconventional Completions Using a High-Resolution Engineered Fibre-Optic Distributed Acoustic Sensor", 'First Break, vol. 37, pp. 63-68, Apr. 2019.

Richter, Pete, "High-Resolution Das in Frac Design", Hart Energy, 6 pages, online available at <https://www.hartenergy.com/exclusives/high-resolution-das-frac-design-180999>, Published on Jul. 30, 2019, Known as early as Oct. 12, 2019.

Sardinha et al., "Determining Interwell Connectivity and Reservoir Complexity Through Frac Pressure Hits and Production Interference Analysis", "SPE/CSUR Unconventional Resources Conference—Canada held in Calgary, Alberta, Canada, Sep. 30, 2014-Oct. 2, 2014", 14 pages, 2014.

"Spidr® Self Powered Intelligent Data Retriever", Halliburton, 3 pages, online available at <https://www.halliburton.com/en-US/ps/testing-subsea/reservoir-testing-analysis/data-acquisition/spidr.html>, Known available at Nov. 22, 2019.

Tary et al., "Interpretation of Resonance Frequencies Recorded during Hydraulic Fracturing Treatments", Journal of Geophysical Research: Solid Earth, vol. 119, No. 2, Feb. 4, 2014, 47 pages, online available at <https://agupubs.onlinelibrary.wiley.com/doi/full/10.1002/2013JB010904>, Known as early as Oct. 21, 2019.

Triepke, Joseph, "The Fracking Problem With Over Drilling", Insights, AlphaSense, 7 pages, online available at <https://www.alpha-sense.com/insights/fracking-problem-overdrilling>, Known as early as Oct. 18, 2019.

Vaidyanathan, Gayathri "Hydraulic Fracturing: When 2 Wells Meet, Spills can Often Follow", Energywire, 4 pages, online available at <https://www.eenews.net/stories/1059985587>, published on Aug. 5, 2013, Known as early as Oct. 18, 2019.

"Wellbore Pressure and Fluid Communication Associated with Hydraulic Fracturing", American Petroleum Institute, 4 pages, 2014.

Zborowski, Matt, "Can Machine Learning Mitigate Frac Hits?", Technology, 5 pages, online available at <https://pubs.spe.org/en/jpt/jpt-article-detail/?art=4762>, Published on Nov. 2, 2018, Known as early as Nov. 25, 2019.

(56)        References Cited

OTHER PUBLICATIONS

Zheng et al., "Frac-Hits Mapped by Tube Waves: A Diagnostic Tool to Complement Microseismic Monitoring", 2018 SEG International Exposition and Annual Meeting, Anaheim, California, USA, pp. 2887-2891, Oct. 14, 2018.

Walker, Christopher Richard, Non-Final Office Action issued in U.S. Appl. No. 17/782,367, filed Jan. 30, 2024, 82 pages.

Final Office Action issued in U.S. Appl. No. 19/192,784, filed Sep. 24, 2025, 5 pages.

* cited by examiner 1700-a 1700-b

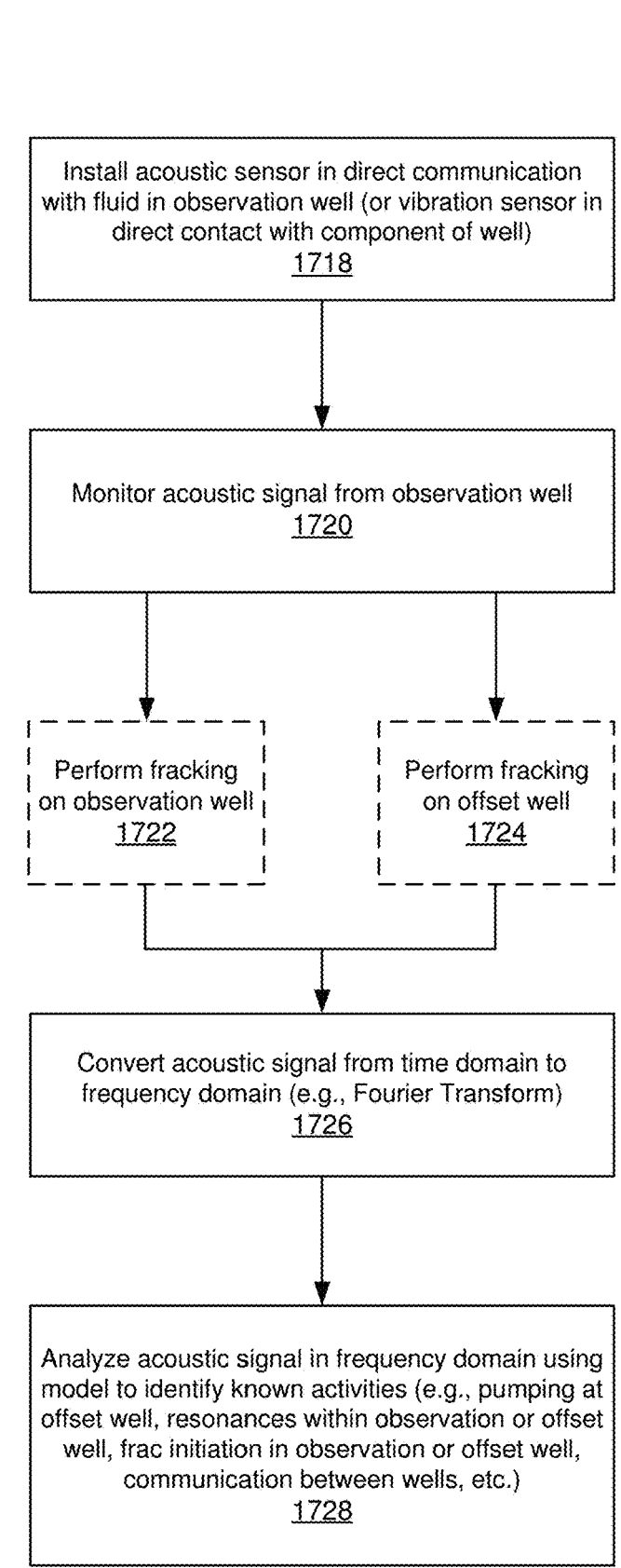

Install acoustic sensor in direct communication with fluid in observation well (or vibration sensor in direct contact with component of well)
1718

Monitor acoustic signal from observation well
1720

Perform fracking on observation well
1722

Perform fracking on offset well
1724

Convert acoustic signal from time domain to frequency domain (e.g., Fourier Transform)
1726

Analyze acoustic signal in frequency domain using model to identify known activities (e.g., pumping at offset well, resonances within observation or offset well, frac initiation in observation or offset well, communication between wells, etc.)
1728

START

Train model using array of acoustic/vibrational
sensors at well heads based on events occurring
at relatively known underground locations
2102

Monitor acoustic/vibrational data in array
2104

Match acoustic/vibrational data to events in model
2106

END

Single-Sensor Microseismic

2300

2400

SPECTRAL ANALYSIS AND MACHINE LEARNING TO DETECT OFFSET WELL COMMUNICATION USING HIGH FREQUENCY ACOUSTIC OR VIBRATION SENSING

CLAIM OF PRIORITY UNDER 35 U.S.C. § 119

The present application is a continuation of U.S. patent application Ser. No. 17/291,040 filed May 4, 2021 entitled "SPECTRAL ANALYSIS AND MACHINE LEARNING TO DETECT OFFSET WELL COMMUNICATION USING HIGH FREQUENCY ACOUSTIC OR VIBRATION SENSING" which is a national phase application based on PCT/US20/64314 filed Dec. 10, 2020 which claims priority to U.S. Provisional Application Nos. 62/945,929 filed Dec. 10, 2019, 62/945,949 filed Dec. 10, 2019, 62/945,953 filed Dec. 10, 2019, 63/058,534 filed Jul. 30, 2020, 63/058,548 filed Jul. 30, 2020 and 62/945,957 filed Dec. 10, 2019 entitled "Spectral Analysis and Machine Learning to Detect Offset Well Communication Using High Frequency Acoustic or Vibration Sensing", "Acoustic and Vibrational Sensor Based Micro-Seismic Analysis", "Spectral Analysis and Machine Learning of Well Activity Using High Frequency Pressure Sensing of Phase-Locked Stimulation", "Spectral Analysis and Machine Learning of Acoustic Signature of Wireline Sticking", "Spectral Analysis, Machine Learning, and Frac Score Assignment to Acoustic Signatures of Fracking Events", and "Spectral Analysis and Machine Learning of Acoustic Signature of Drill Bit Positive Displacement Motor Torque and Drill Bit Wear", respectively, each of which are assigned to the assignee hereof and hereby expressly incorporated by reference herein.

FIELD OF THE DISCLOSURE

The present disclosure relates generally to oil field monitoring. In particular, but not by way of limitation, the present disclosure relates to systems, methods and apparatuses for spectral analysis of acoustic signals received at a well head for detecting offset well communication.

DESCRIPTION OF RELATED ART

Unconventional reservoirs include reservoirs such as tight-gas sands, gas and oil shales, coalbed methane, heavy oil and tar sands, and gas-hydrate deposits. These reservoirs have little to no porosity, thus the hydrocarbons may be trapped within fractures and pore spaces of the formation. Additionally, the hydrocarbons may be adsorbed onto organic material, for instance, of a shale formation. In some cases, these reservoirs may require special recovery operations distinct from conventional operating practices in order to mobilize and extract the oil.

The rapid development of extracting hydrocarbons from these unconventional reservoirs can be tied to the combination of horizontal drilling and induced fracturing (also called "hydraulic fracturing" or simply "fracking") of the formations. Hydraulic fracturing operations may include at least drilling of a well or borehole into the subterranean formation, perforation gun (or perf gun) firing, frac fluid pumping, proppant pumping, and plug installation. Horizontal drilling has allowed for drilling along and within hydrocarbon reservoirs of a formation to capture the hydrocarbons trapped within the reservoirs. In some cases, an amount of mobilization may be related to the number of fractures in the formation and/or the size of existing fractures. Thus, increasing the number of fractures in the formation and/or increasing the size of existing fractures through fracking may serve to increase mobilization.

To increase productivity, there is a desire to locate wells as close to each other as possible. However, if fractures from adjacent or offset wells meet, also known as a "frac hit," there can be communication between the wells (often referred to as a parent and child well). Communication refers to an offset well, often termed a parent well, being affected by the pumping of a hydraulic fracturing treatment in a new well, called the child well. As the name suggests, frac hits can be a violent affair as they are known to be strong enough to damage production tubing, casing, and even wellheads and can ultimately lead to loss of well control. Aside from equipment damage, loss of production due to a frac hit can range anywhere from a temporary loss to a permanent loss of production.

Existing techniques for avoiding frac hits and mitigating frac hit consequences have limitations, and many are either too expensive to include in every well (e.g., Distributed Acoustic Sensing) or provide limited accuracy before communication occurs (e.g., wellhead liquid pressure sensing via static/absolute pressure sensors). Another solution is to space wells far enough apart to lower the chance of communication to near zero, but this leads to inefficient production and the risk of leaving resources in the ground. Thus, there is a need for a refined solution for minimizing equipment and production losses due to frac hits between adjacent or offset wells.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

In a typical hydraulic fracturing treatment, fracturing treatment fluid is pumped downhole into the formation at a pressure sufficiently high to cause new fractures or to enlarge existing fractures in the reservoir. Next, frack fluid plus a proppant, such as sand, is pumped downhole. The proppant material remains in the fracture after the treatment is completed, where it serves to hold the fracture open, thereby enhancing the ability of fluids to migrate from the formation to the well bore through the fracture. The spacing between fractures as well as the ability to stimulate fractures naturally present in the rock may be major factors in the success of horizontal completions in unconventional hydrocarbon reservoirs.

While there are a great many fracking techniques, one useful technique is "plug-and-perf" fracking, which allows variations to the fracking process to be carried out in different regions or stages of a well's horizontal length. The process can include pumping a plug-and-perforating gun to a given depth. The plug is set, the zone perforated, and the tools removed from the well. A ball or plug is pumped downhole to isolate the stages below the plug (or closer to the well's "toe") and the fracture stimulation treatment is then pumped in, although washing, etching, and other treatments may occur first depending on downhole conditions. After fracking of the stage is complete, the next plug is sent down the well to a location closer to the "heel" of the well and a set of perforations are initiated in this next stage, and the process is repeated moving further up the well (also known as "zippering").

As described above, frac hits (or communication between adjacent or offset wells) are a major cause of concern when adjacent or offset wells are located close to each other, for instance, to optimize production. One way to mitigate frac hit consequences is to monitor the absolute pressure of neighboring wells that may be at risk (Dawson and Kampfer 2016). The neighboring wells can be monitored wirelessly and the collected data may be provided to a Supervisory control and data acquisition (SCADA) system. In addition, the critical pressure data can also be processed locally, which may then be used to provide a "trigger alarm" to the frac control room. This enables the control room to know immediately if a well is seeing communication and which well is seeing it, thus, allowing them to take immediate corrective action.

Other methods of 3D mapping to avoid frac hits include microseimic monitoring (Fisher et al. 2004), electromagnetic imaging (Haustveit et al. 2017), seismic time lapse (Atkinson and Davis 2011), fluid and proppant tracers, and others. Distributed Acoustic Sensing (DAS) is an emerging fiber optic-based technology using an optical fiber attached to the wellbore to guide laser energy into the reservoir and then monitor natural scattering in the fiber back to the sensing unit at the surface to determine strain along the fiber. In particular, the sensing unit uses interferometry and very high sample rates (e.g., 5000-10000 Hz) to sense changes in fluid flow and rock formation at various locations in the well. Other techniques rely on dyes and bacteria identification to monitor fluid from a child well reaching the surface of a parent well.

Active well defense is another category of techniques deployed to mitigate the adverse impacts of frac hits. In some cases, active well defense techniques include various means of pressurizing a parent well to preclude frac hits from nearby child wells. For instance, fluid can be pumped into a parent well and then pressurized. In some circumstances, this pressure may help prevent fracking activities from nearby fractures from breaking through the rock (or subterranean formation) separating the parent and child.

However, all these techniques have limitations, and many are either too expensive to include in every well (e.g., Distributed Acoustic Sensing) or provide limited accuracy before communication occurs (e.g., wellhead liquid pressure sensing). While active well defense can be effective when the parent well is no longer being used for production, it has limited success when the parent and child wells are both producing.

Thus, given the grave threat of offset well communication to the environment as well as to production, there is a need for an alternative, and possibly more accurate, system for accurately predicting communication between offset wells in real-time.

In an embodiment, this disclosure describes a high frequency (e.g., greater than 1 kHz) acoustic or vibrational sensor directly coupled to a well, for instance at the well head, and in direct physical contact with fluid in the well, the well casing, the well head pipe, circulating fluid lines, a standpipe, or the well pad (e.g., where vibration sensors are used, direct contact with the fluid is not necessary). For the sake of brevity, an acoustic or vibrational sensor can be used wherever the term acoustic sensor is seen. The high frequency acoustic or vibrational sensor can provide a digital or analogue signal indicative of high frequency pressure fluctuations or indicative of vibrations in the fluid, and this signal can be passed to a conversion and analysis component (e.g., spectrum analyzer) configured to detect frequency components of the signal (e.g., via an algorithm that transforms pressure or vibration data in the time domain to the frequency domain such as a Fast Fourier Transform). In some cases, the conversion and analysis component may be further configured to monitor changes in the signal from one well to the other (e.g., where one of the two wells is approaching a communication or frac hit situation), as described below.

As an example, a 33 Hz signal (2000 RPM) may be associated with fracking pumps at a child well. In this case, if traditional time domain pressure data is used, this signal would just appear to be part of the noise background. However, according to aspects of this disclosure, this 33 Hz signal may see a more pronounced change relative to the background noise frequency components in a pre-frac-hit event/situation, as compared to a change seen using a traditional method of monitoring (e.g., where one looks for absolute pressure changes in the well). For instance, by looking for a 33 Hz signal that is known to be caused by pumping trucks operating at 2000 RPM, a single acoustic sensor at a wellhead of a first well can detect the acoustic signal from pumping trucks at an adjacent or offset well, which would otherwise be completely invisible to a traditional static pressure sensor. Moreover, this pumping truck signal may have phase shifts, reflections, or changes in amplitude that can be traced to known subterranean structures or events, such as fracture initiation or extension. In some embodiments, a signal can intentionally be sent down one well and measured at an adjacent or offset well, or reflections of the signal can be measured, where a frequency of this signal is selected so that it can be more easily distinguished from noise. For instance, the intentional signal can include two distinct frequency peaks known to be spectrally-far from known frequency bands of noise. Such an intentional signal may also help it to be identified at an adjacent well where the intentional signal is attenuated by rock, sand, or other underground material between the wells.

Aspects of the present disclosure generally relate to analyzing high frequency acoustic or vibration signals in a well to assess well activity in real-time via time domain and/or spectral analysis of said signals. These can be compared to static or absolute pressure readings that have long been used to obtain much lower resolution and non-real time insights into subterranean activity. In some cases, the analyzed signals may be transmitted from the lower reaches of the well to the surface, for instance, through liquid in the well. This may not only allow real-time feedback during well operations but may also allow computer algorithms to assess current drilling activities by comparing the feedback to feedback previously received as a result of certain fracking operations or subterranean activity (e.g., fracture initiation, high rate of fluid flow through a propped fracture, communication with an offset or adjacent well, etc.). In some cases, this assessment may be provided to human operators, which may in turn allow them to adjust well operations. In other cases, the real-time feedback may be used to automatically adjust well operations. Real-time feedback may serve to minimize risks that may lead to a significant drop in production, downtime (e.g., take the well offline or make it unusable), threaten the safety of human operators, ground water resources, and/or equipment. In other cases, the real-time feedback may assist in optimizing well output/yield Aspects of the present disclosure generally relate to an early warning system for preventing fracture communication between wells, the system comprising: a sensor coupled to a fracking wellhead, circulating fluid line, or standpipe of a well and configured to convert acoustic vibrations in fracking fluid in the well into an electrical signal; a memory configured to store the electrical signal; a machine-learning system configured to analyze current frequency components of the electrical signal in a window of time and to identify impending fracture communication between the well and an offset well, the machine-learning system having been trained on previous frequency components of electrical signals measured during previous instances of fracture communication between wells; and a user interface configured to return a notification of the impending fracture communication to an operator of the well.

Some embodiments of the disclosure may relate to an early warning system for preventing fracture communication between wells, the system comprising: a sensor coupled to a fracking wellhead, circulating fluid line, or standpipe of a well and configured to convert acoustic vibrations in fracking fluid in the well into an electrical signal; a memory configured to store the electrical signal; a machine-learning system configured to analyze current frequency components of the electrical signal in a window of time and to identify impending fracture communication between the well and an offset well, the machine-learning system having been trained on previous frequency components of electrical signals measured during previous instances of fracture communication between wells; and a user interface configured to return a notification of the impending fracture communication to an operator of the well.

Some other embodiments of the disclosure may relate to a method of predicting fracture communication between wells comprising: providing a sensor coupled to a wellhead, circulating fluid line, or standpipe of a well and configured to convert acoustic vibrations in fluid in the well into an electrical signal in a time domain; recording the electrical signal to a memory; analyzing current frequency components of the electrical signal in a window of time; identifying impending fracture communication between the well and an offset well where the current frequency components show sufficient similarity to previous frequency components measured during previous instances of fracture communication between wells; and returning a notification of the impeding fracture communication to an operator of the well.

Some other embodiments of the disclosure may relate to a method of preventing fracture communication between wells, the method comprising: performing a fracking operation on a first well in a subterranean formation; providing a sensor coupled to a wellhead, circulating fluid line, or standpipe of a second well and configured to convert acoustic vibrations in fluid in the second well into an electrical signal in a time domain; recording the electrical signal to a memory; analyzing current frequency components of the electrical signal in a window of time; identifying an impending fracture communication between the first and second wells where the current frequency components show sufficient similarity to previous frequency components measured during previous instances of fracture communication between wells; and adjusting parameters of the fracking operation on the first well to avoid the impending fracture communication between the first and second wells.

Yet other embodiments of the disclosure may relate to a method of training a machine-learning model to predict fracture communication between wells, the method comprising: providing a sensor coupled to a wellhead, circulating fluid line, or standpipe of a first well and configured to convert acoustic vibrations in fluid in the first well into an electrical signal in a time domain; recording the electrical signal to a memory; analyzing current frequency components of the electrical signal in a window of time; identifying, via a machine-learning system, impending fracture communication between the first well and an offset well where the current frequency components show sufficient similarity to previous frequency components measured during instances of fracture communication between wells; and wherein the machine-learning system is trained by grouping the current frequency components with similar ones of the previous frequency components that are also associated with fracture communication between wells.

Some embodiments of the disclosure may relate to an early warning system for preventing fracture communication between wells, the system comprising: a sensor coupled to a fracking wellhead, circulating fluid line, or standpipe of a first well offset from a second well and configured to convert acoustic vibrations in fracking fluid in the first well into an electrical signal; a memory configured to store the electrical signal; one or more servers comprising a nontransitory, tangible computer readable storage medium, encoded with processor readable instructions to perform a method for warning against impending fracture communication between the first and second wells, the method comprising: analyzing current frequency components of the electrical signal in a window of time; identifying impending fracture communication between the first and second wells where the current frequency components show sufficient similarity to previous frequency components measured during previous instances of fracture communication between wells; and returning a notification of the impeding fracture communication to an operator of the well.

Some other embodiments of the disclosure may relate to a method of spacing wells to avoid fracture communication between the wells, the method comprising: performing a fracking operation on a first well in a subterranean formation; providing a sensor coupled to a wellhead, circulating fluid line, or standpipe of a second well and configured to convert acoustic vibrations in fluid in the second well into an electrical signal in a time domain; recording the electrical signal to a memory; analyzing frequency components of the electrical signal in a window of time; identifying fracture communication between the first and second wells where the frequency components show sufficient similarity to previous frequency components measured during previous instances of fracture communication between wells; and adjusting a spacing of new wells based on the identifying fracture communication between the first and second wells.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 17B shows an embodiment of a method of using acoustic or vibrational data at a well to identify related events through a model analyzing a frequency spectrum of the acoustic or vibrational data, in accordance with one or more implementations.

DETAILED DESCRIPTION

Figure 1:
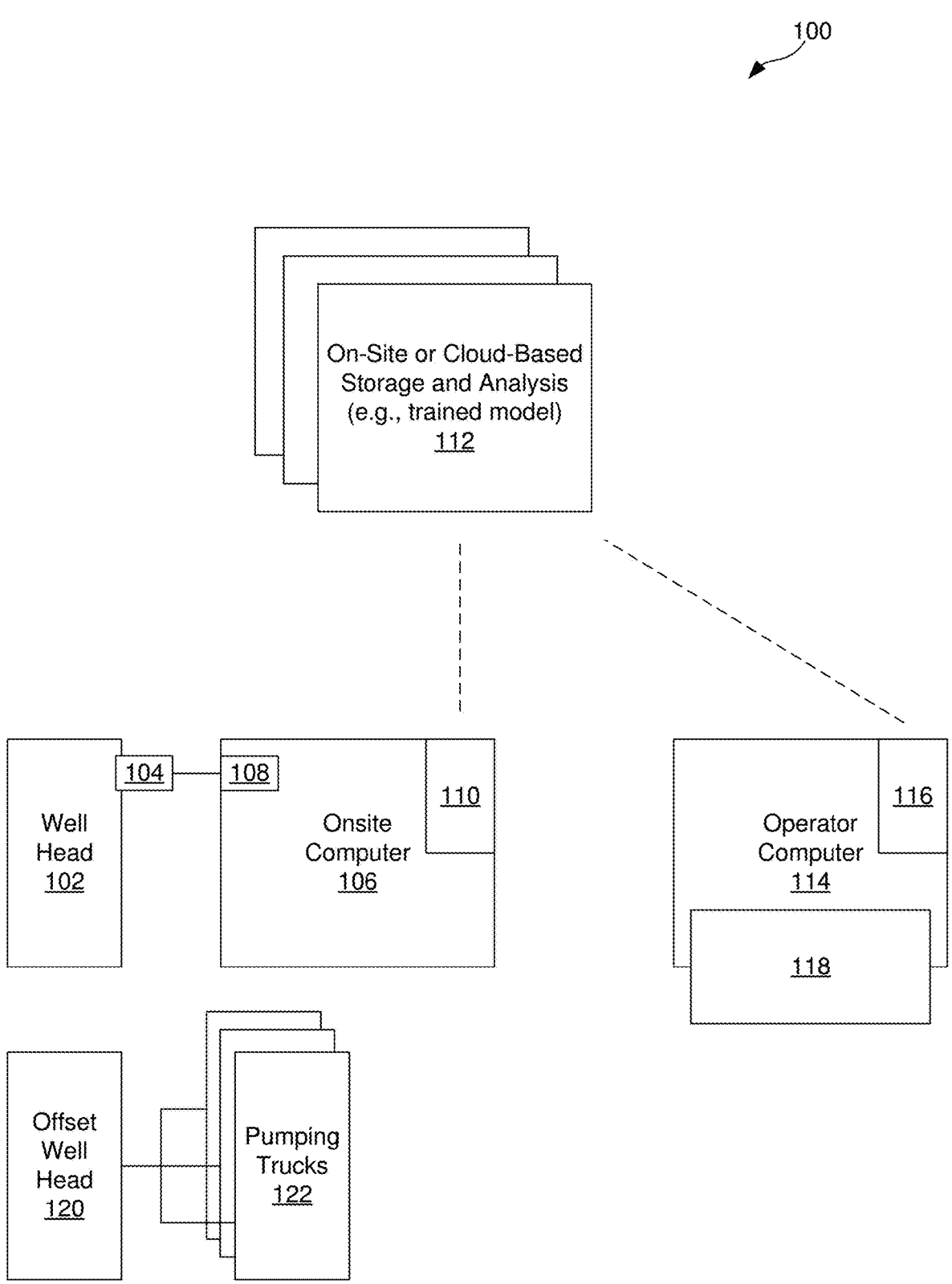
FIG. 1 illustrates a drilling system for monitoring acoustic or vibration signals in an observation well according to an embodiment of the disclosure.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Broadly, the present disclosure relates generally to oil field monitoring. In particular, but not by way of limitation, the present disclosure relates to systems, methods and apparatuses for predicting and preventing fracture communication between adjacent or offset wells. In some aspects, the present disclosure also relates to systems, methods and apparatuses for spectral analysis and/or array-based spectral analysis of acoustic signals received at a well head.

Given the grave threat of offset well communication to the environment as well as to production, there is a need for an early warning system for accurately predicting and preventing communication between offset wells. Whereas existing pressure sensing techniques for oil field monitoring involve recording pressure changes (e.g., absolute changes over long periods of time) with reference to an absolute pressure of fluid in the well, currently used static pressure sensors usually have a slow sample rate (e.g., slower than 1 Hz) and provide very little resolution when a fracture occurs or extends. However, analyzing fluctuations or vibrations in the fluid in well, for instance, in a frequency domain, rather than a time domain, may serve to provide a more accurate understanding of fracture dispersion, propagation, potential communication between adjacent or offset wells, to name a few non-limiting examples. This spectrum can be referred to as an "acoustic or vibrational spectral frequency signature." In some cases, communication between offset or adjacent wells may be predicted by analyzing fluctuations or vibrations in the fluid (i.e., via measurement of acoustics in the fluid), or alternatively, by feeling vibrations through a metal component of the wellhead. By acquiring dynamic acoustic or vibrational pressure data at the well head and converting this time domain data to the frequency domain, analysis can focus on echoes, reflections, seismic signals, and other patterns, which may have better correlations to underground events, and may be more easily discerned through rock and sand formations, than changes in absolute pressure.

In some embodiments, the analysis may comprise generating machine learning (ML) models, or other artificial intelligence (AI) models, and training the models to recognize the acoustic or vibration signatures of different events. One non-limiting example of an event may comprise an impending fracture communication between an observation well and an offset well. Once models have been trained to recognize the acoustic or vibration signatures of different events, real-time acquired data may be compared to the model or analyzed by the model for real-time assessment of potential fracture communication between adjacent wells, which may be used to adjust fracking parameters to prevent such a catastrophic event. In some examples, the real-time acquired data may also be used to differentiate between actual crack openings and mere horizontal shifts in the subterranean formation. Current techniques involve operators making decisions based on geological modeling performed hours before an operating step. Additionally or alternatively, operators rely on trial and error to make informed decisions before a particular step. However, the systems and methods disclosed herein alleviate some of the deficiencies of current techniques by utilizing real-time quantitative and qualitative analysis of crack formation and fluid flow via acoustic and vibration data to more accurately assess the choices that operators can make, and to optionally provide automated and optimized control of fracking operations.

Acoustic and Vibration Sensors

Figure 14:
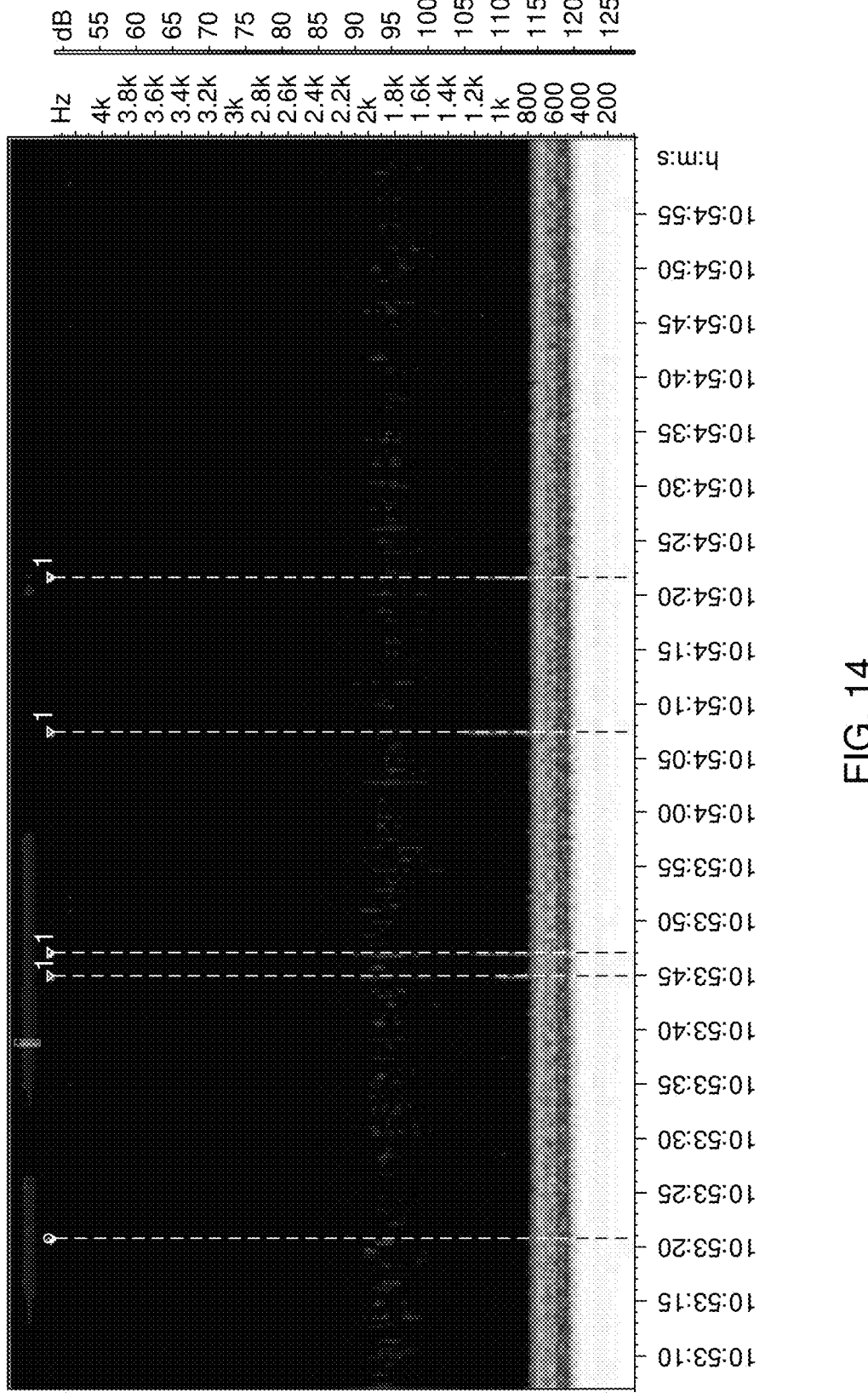
FIG. 14 illustrates one view of an exemplary spectral plot with frequency spikes associated with frac initiation in an observation well, in accordance with one or more implementations.
Figure 15:
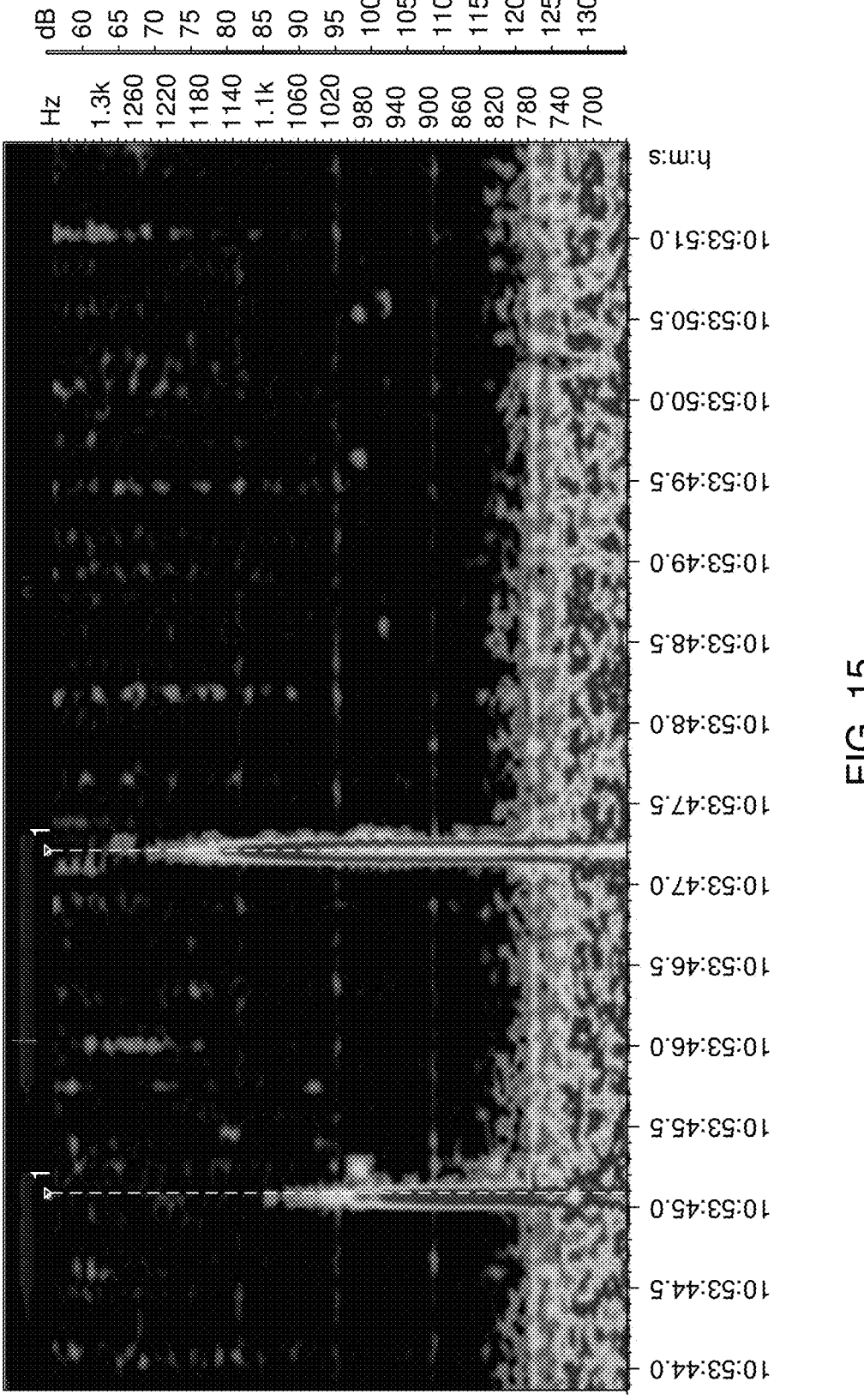
FIG. 15 illustrates a second view of the exemplary spectral plot in FIG. 14, in accordance with one or more implementations.
Figure 16:
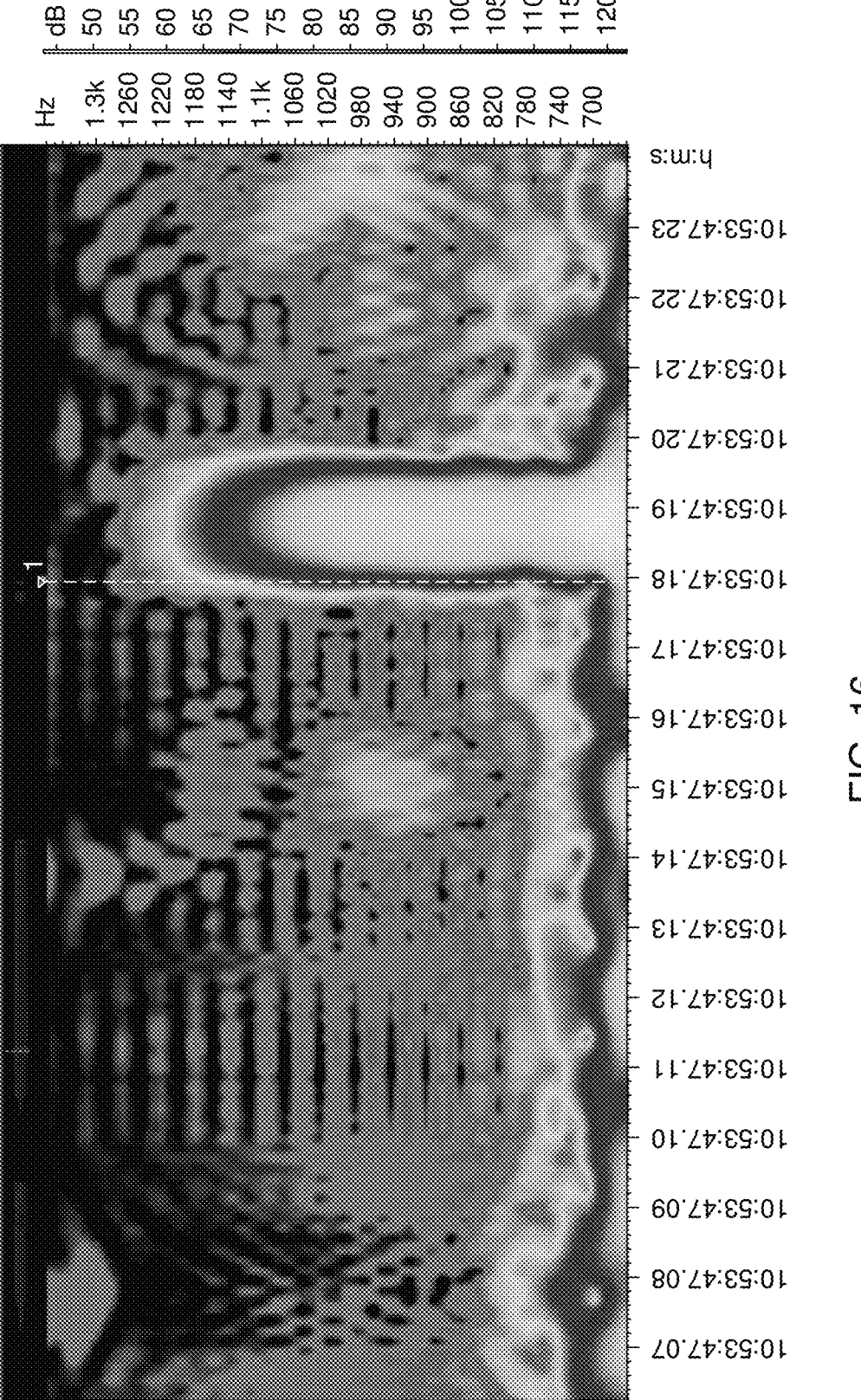
FIG. 16 illustrates a third view of the exemplary spectral plot in FIG. 14, in accordance with one or more implementations.

In some cases, the techniques described in this disclosure may utilize a high frequency (e.g., greater than 1 kHz) acoustic or vibration sensor directly coupled to a well, for instance at the well head. This acoustic or vibration sensor may be in direct physical contact with fluid in the well, the well casing, the well head pipe, the circulating fluid line, the standpipe, or the well pad (e.g., vibration sensors on the well pad can obviate the need to have direct contact with fluid in the well). For the sake of brevity, an acoustic or vibration sensor may be used wherever the term acoustic sensor is seen in this disclosure. In some examples, the high frequency acoustic or vibration sensor may provide a digital or analog signal indicative of high frequency pressure fluctuations. Additionally or alternatively, the signal may be indicative of vibrations in the fluid. In some examples, this signal may be passed to a conversion and analysis component, or a converter (e.g., spectrum analyzer), configured to identify frequency components of the signal (e.g., via an algorithm that transforms pressure or vibration data in the time domain to the frequency domain such as a Fast Fourier Transform (FFT) and compares the frequency domain signal to previously measured frequency domain signals or signatures). FIGS. 14-16 show examples of frequency spectra that were used to identify subterranean events such as fracture initiation or extension much sooner than is possible with traditional techniques, or using fewer sensors (e.g., one).

In some examples, the acoustic sensors described throughout this disclosure may or may not have a reference pressure. Furthermore, the acoustic sensors may be configured to measure at least changes in pressure. Thus, in some cases, the acoustic sensors may be configured to measure absolute pressure in addition to pressure changes (i.e., if a reference pressure is being used). Additionally or alternatively, for instance, if no reference pressure is being used, the acoustic sensors may be used in parallel with an absolute pressure sensor. In some cases, the absolute pressure sensor may be configured to measure static or absolute pressures, where the absolute pressure may be used as a baseline (or reference) for the higher sensitivity data from the acoustic sensor.

It should be noted that throughout this disclosure, a vibration sensor may be used in addition (or as an alternative) to a high frequency acoustic pressure sensor.

Acquiring Data

As previously noted, the term acoustic sensor may be broadly used to refer to a high frequency acoustic pressure sensor and/or a vibration sensor (e.g., sampling at ~1 kHz or greater). One non-limiting example of a vibration sensor may comprise a piezoelectric vibration sensor. In some cases, piezoelectric vibration sensors may be configured to generate a current or voltage proportional to an amount of piezoelectric material movement. The piezoelectric material can be in direct physical contact with the fluid in the well or may be physically coupled to a protective membrane that is in direct physical contact with the fluid. Either way, vibrations in the fluid may be transmitted to the piezoelectric material, which may cause movement or vibrations of the piezoelectric material. Movement of the piezoelectric material may generate a current or voltage, where the current or voltage may be proportional to the amount of vibration or movement of the piezoelectric material. The ICP Pressure Sensor, Model Number 113B23, is one non-limiting example of an acoustic or vibration sensor.

In some cases, the generated current or voltage may be recorded and stored, and there may be a 1 to 1 mapping of vibration data to current or voltage data. The measured current or voltage readings may be used to determine vibration data, for instance, by mapping the current or voltage readings to corresponding vibration values in a look-up table. In some cases, raw data may comprise one or more of the mapped vibration data, and the measured current and/or voltage readings. This raw data can be passed through a transform operation such as a Fourier Transform, and further analyzed in the frequency domain (e.g., via a spectrum analyzer), as described later.

In some cases, a Seismic Emission Tomography (SET) process comprises recording microseismic data using an array of sensors, located on or proximate the surface of the earth, in a well that is to be fractured, in another well or wells, or in one or more boreholes drilled for the purpose of placing sensors. Data is recorded at sensor locations in a digital format as a time series, referred to as a "trace," over a given time period. The duration of recording and the sampling interval is determined by the objectives of the microseismic data acquisition process, the characteristics of the events that generate the detected or sensed microseismic energy, the distances involved, the characteristics of the subsurface, and other factors. Once the seismic data has been recorded, it can be processed and converted to a set of data values that represent useful information, and that information may be displayed in a readily understandable format. The data recorded at each sensor location may be filtered and processed using SET processing techniques and software, that convert the data into a series of gridded subsurface volumes corresponding to multiple time samples. The values of the points in the grid represent attributes of the data, and such values vary over time as the energy emitted at each point in the subsurface varies. The solution to this problem may involve projecting back the microseismic energy to multiple possible points of origin in the subsurface. A microseismic event such as a fracture emits energy that is detected and recorded at multiple sensors. The microseismic data recorded at multiple sensor locations may be projected back to possible points of origin. If microseismic energy was emitted from a given point in the subsurface, then the data tends to add constructively at that point. If no energy was emitted from a given point in the subsurface, then the data cancels out. According to some embodiments of the SET process, each point in the subsurface grid may be treated as if it is a possible source of microseismic energy. Using a known or estimated seismic velocity model, it may be possible to compute the time of a release of energy at a point at a given depth in the subsurface takes to reach each sensor on or proximate the surface, where it is recorded as part of the seismic data trace for the sensor. Knowing this time, a time shift may be applied to the seismic data trace recorded at the sensor, such that the result is a seismic data trace corresponding to what might have been recorded at the point in the subsurface at which the energy was emitted.

Analysis of Acquired Data and Example Applications/Use Cases

Frequency Domain Analysis

In some examples, the transform component and the conversion and analysis component (e.g., converter or spectrum analyzer) may be implemented as a software program, firmware module, hardware comprising analog circuits, or a combination thereof. In some embodiments, a conversion function (e.g., Fourier Transform) may comprise the use of wavelet analysis techniques. In some cases, wavelet analysis may refer to the use of a custom function that is stretched and scaled. Further, wavelet analysis may facilitate in optimizing analysis of detailed timing of events in a signal.

For the purposes of this disclosure, a conversion and analysis component (e.g., spectrum analyzer) may be configured to measure the magnitude of an input signal at different frequencies. Said another way, the conversion and analysis component may analyze signals in the frequency domain, rather than the time domain. Typically, the conversion and analysis component may receive electrical signals as an input. In some other cases, the conversion and analysis component may receive acoustic or vibration signals via an appropriate transducer. In some embodiments, the conversion and analysis component may utilize a Fourier Transform or another applicable transform algorithm to convert raw acoustic or vibration data from the time domain to the frequency domain.

Fracking pads may include one or more acoustic sensors (e.g., one acoustic sensor for each well head) or one or more static pressure sensors and one or more acoustic sensors (e.g., one static and one acoustic sensor for each well head). The acoustic sensors may be high frequency pressure sensors (e.g., sampling at ~1 kHz or greater). Each fracking pad may include a transceiver for transmitting raw data from its sensor(s) to a local or cloud-based conversion and analysis component. Additionally or alternatively, the raw data may be transmitted to a processing resource that receives and analyses outputs from various conversion and analysis components. In one embodiment, a set of pads may comprise a master transceiver configured to receive data from one or more other pads on a local network. Each pad can transmit raw data or converted data (i.e., frequency domain data) to the master transceiver, and the master transceiver may transmit (i.e., relay) the data received on the local network to a cloud-based resource, such as a server farm where more complex analysis takes place (e.g., comparison to a model; training a model).

Further, the acoustic sensors may be coupled to one or more conversion and analysis components. In some cases, the number of conversion and analysis components may vary (e.g., one for each pad, one for each well head, or one for a network of sensors, to name a few non-limiting examples). The conversion and analysis component may be configured to execute an algorithm, such as a FFT algorithm, for transforming raw data from the time domain to the frequency domain. In some other cases, the conversion and analysis component may be used in concert with another device or software module that can perform FFT.

Using spectral analysis rather than static pressure-based sensing enables higher signal to noise ratios than traditional static pressure-based sensors. For instance, a fracture initiation or extension may cause an acoustic pop or a rapid surge in acoustic energy at a certain frequency. Static (or absolute) pressure may not change or may see a very subtle change from this event, the type of pressure change that is difficult to discern from noise (typical variations in static/absolute pressure). However, when viewed in the frequency spectrum, this pop may look like the spectral signatures seen in FIGS. 14-16, sharp and well-defined peaks with large amplitude as compared to the spectral noise floor, and thus be easily delineated from steady state and other downhole events. In some other cases, by training a model based on frequency signatures measured during previous instances of fracture communication between wells, it is possible to identify impending fracture communication between a well and an offset well (i.e., by associating a current frequency spectrum with frequency components of electrical signals measured during previous frac communication between wells). Similarly, horizontal shifting, an event that does not improve hydrocarbon recovery, but does cause significant vibrations that may look like a fracture to traditional microseismic arrays, has a unique frequency signature compared to fracture initiation and extension. By comparing a current frequency signature to known signatures measured during previous horizontal shifts and fracture initiations or extensions, one can accurately distinguish between horizontal shifts and fracture initiation/extension.

In another example, fluid, mud, and proppant flowing through the well holes, perforations in stage walls, and fractures may also be associated with identifiable signatures in the frequency domain. In another example, sand moving along edges of a pipe, well hole, or fracture may generate acoustic or vibration waves at a unique frequency (or frequencies) (e.g., at a different frequency or frequencies from signals generated by clean water moving through the same structure). In such cases, different areas associated with different geological and flow properties may be identifiable based on analyzing signals in the frequency domain. In such cases, the conversion and analysis component may identify frequency signatures associated with specific activities and/or arriving from specific locations in the observation or offset well, where the identifying may be based at least in part on distinguishing between different processes or events during development of the well or offset well. In some cases, the frequency signatures may be dependent on fluid flow properties. As an example, a first area (e.g., where fluids become turbulent) may be associated with a frequency signature that is distinct from another frequency signature associated with a second area (e.g., associated with laminar fluid flow).

In another example, analyzing the frequency spectrum of acoustic signals in the fracking fluid allows identification of activities occurring in adjacent wells. For instance, a first well may be packing sand and gel into existing cracks, while a second adjacent well is opening fractures by pumping fluid down the borehole. In another example, a first well may be opening fractures via hydraulic fracturing operations, while a second adjacent well may be in the production stage (i.e., post drilling and hydraulic fracturing). In some circumstances, the hydraulic fracturing of the first well may adversely impact the production in the neighboring well, for instance, due to hydraulic communication (or offset well communication) between the two adjacent wells. According to aspects of this disclosure, the conversion and analysis component may be able to identify which signals are being caused by which well and/or which activity or operation is producing a given signal, for instance, based on given knowledge of the timing of the processes at nearby wells. In some cases, preventive action may be taken to prevent fracture communication between the nearby wells based on the prediction from the early warning system, described throughout this disclosure.

In some other cases, sound or pressure waves may reflect off of various structures, interfaces between different fluids, etc., within a well. In such cases, the conversion and analysis component may be used to identify beat frequencies or resonances caused by such reflections. In one example, a pump truck may create a 33 Hz signal (i.e., a first frequency signature) during pumping operations. In some embodiments, the 33 Hz signal (i.e., frequency signature) may reflect off of one or more surfaces, including a heel of the well, toe of the well, one or more other structures at the well or well head, etc. In some cases, the reflective bouncing off of the one or more surfaces (e.g., one or more times per second for a 1-mile deep surface-to-heel well) may affect the resonant frequency identified by the conversion and analysis component. For instance, after reflecting and bouncing off of one or more surfaces and/or structures at the well head, a generated signal, such as the 33 Hz signal, may be identified as a ~1 Hz signal (or another frequency different from 33 Hz). In other words, the conversion and analysis component may identify a ~1 Hz signal as the resonant frequency for pump truck signals reflecting up and down through the vertical segment of a well (either the observation well or an adjacent well). In this way, the resonant frequency may be used to better understand the structure of a well, including one or more of the length of the borehole, length of horizontal sections, length of fractures extending from the horizontal section, distance between fractures extending from a current borehole and fractures extending from an adjacent borehole, etc.

In some examples, resonant frequencies may also be used in assessing dimensions and shapes of underground chambers, such as reservoirs or natural cracks, or the thickness of different layers of underground materials. All of these may present unique frequency spectra that an acoustic sensor at wellhead can measure and that can be matched with previous spectra associated with similar structures.

Raw Time Domain Analysis and/or Time & Frequency Domain Analysis

In some cases, the acoustic or vibration data in the time domain may be analyzed, for instance, by a machine learning model without conversion. In such cases, the conversion and analysis component may be responsible for analysis, but not conversion, of the time domain data. It should be noted that, even though no conversion of time domain data into the frequency domain takes place, the model may still have access to frequency information associated with the measured signal. In some cases, knowledge of frequency space decomposition of a signal may be utilized to deconstruct a single waveform in time into a composite of simpler, underlying waveforms (e.g., sinusoidal waveforms). In some other cases, a Short-time Fourier transform (STFT) may be used to determine the sinusoidal frequency and phase content of local sections of a signal as it changes over time. STFT computation may involve dividing a longer time signal into shorter segments of equal length and then computing the Fourier transform separately on each shorter segment. In some cases, once the Fourier spectrum is revealed for each shorter segment, the changing spectra may be plotted as a function of time (i.e., also known as a spectrogram or waterfall plot).

While this disclosure has discussed use cases where a source of a frequency signal is constant, such as that from fracking fluid passing through a perforation in a casing, in other embodiments, the source frequency may vary in time. Adjusting or sweeping a frequency of a source, such as a pump trump in an offset well, can create a signal that is more easily distinguished from background noise, than a static frequency signal. For instance, where a source is swept with a known rate of change, a monitoring system can not only look for the frequencies in the sweep, but also identify the rate of change of that frequency peak (or frequency peaks), thus providing a further 'fingerprint' that can be used to distinguish a signal from noise.

One application is a changing or sweeping frequency source, whose signal is monitored from an offset well, and in this way, subterranean structures or materials between the two wells can be monitored as the signal passes between the wells. For instance, a rock formation may resonate at a different frequency than a sand formation, and thus a bump (i.e., a variation) in amplitude at a certain frequency may be indicative of a rock formation between the offset well where the pumps are being swept in frequency, and the observation well that is monitoring for the sweeping frequency via acoustic or vibration sensors. As another example, modeling may show that a larger amplitude signal (e.g., a frequency signature) is generated and observed when a 40 Hz signal passes through a first shale as compared to a 35 Hz signal, whereas, in a second shale, a 30 Hz signal generates a larger amplitude frequency signature than a 35 Hz signal.

One example of changing a source frequency is that operators may vary and control a generated source frequency signal (e.g., from a pump truck) and monitor changes in the observed signal in the frequency and/or time domain. For instance, rather than simply monitoring a 33 Hz pump truck signal, operators could perform a frequency sweep for the generated pump truck signal (e.g., by gradually adjusting a pump truck frequency through a range, such as 20 Hz to 40 Hz). In this example, the conversion and analysis component may be used to not only pick up on these unique frequencies (e.g., between 20 and 40 Hz) over background frequencies, but also monitor and observe the signal changing in the frequency domain as a function of time.

In another example, source frequency sweeping could be used to identify a structure or material based on optimal transmission frequencies. For instance, where a certain shale formation separates an observation well and another observation well coupled to pump trucks, the pump trucks' revolution per minute (RPMs) could be gradually adjusted until a highest amplitude signal (i.e., corresponding to an optimized frequency for travel through the shale formation between the wells) is observed by the conversion and analysis component. In this way, the sweeping could be used to identify different materials or structures since each may have optimal transmission frequencies. Similarly, this sweeping technique can be used to identify an optimal source frequency to later use during static frequency applications.

It should be noted that, pump trucks are just one example of an acoustic or vibration source, and different acoustic/vibration sources may be utilized in different embodiments. For instance, surface vibrators or surface oscillators used for releasing stuck drill strings may be used as acoustic or vibration sources. In some other cases, surface vibrators used to impart vibratory seismic energy into the ground may be used as acoustic/vibration sources. In yet other cases, an acoustic transducer, ultrasound transducer, sonar transducer, etc., may be used to inject energy into the system.

In some examples, energy produced at a target frequency may be used to optimize the fracking process. For example, energy signals at a particular target or resonant frequency (e.g., 20 Hz) may be used to induce and/or manipulate fractures. In some cases, the resonant frequency may be associated with a target fracture or chamber. Further, the induced signal may produce additive or constructive interference, thus allowing manipulation or control of fractures.

In some embodiments, underground events such as fracking fluid movement or fracture initiation can be the source of acoustic signals, and analysis can look both at the frequency spectra as well as the data in the time domain. By using a combination of analysis methods, more accurate identification of subterranean formations and events may be possible.

Machine Learning

Fourier Analysis

Some embodiments of this disclosure pass acoustic or vibration data in the frequency domain to a machine learning model for analysis, labeling, and training of the model. In some embodiments, the model may be configured to use artificial intelligence based on, for example, a neural network or other type of machine learning algorithm. In some cases, the artificial intelligence algorithm or model may receive time domain data converted to a frequency domain, for instance, using a FFT algorithm or another algorithm for computing the discrete Fourier transform (DFT) of a sequence. A DFT may be obtained by decomposing a sequence of values into components of different frequencies. In some cases, a conversion and analysis component may be utilized to perform the conversion from time to frequency domain. In some other cases, the acoustic or vibration data in the time domain may be passed to a machine learning model without conversion. In such cases, the conversion and analysis component may be responsible for analysis, but not conversion, of the time domain data. It should be noted that, even though no conversion of time domain data into the frequency domain takes place, the model may still have access to frequency information associated with the measured signal. In some cases, the model may look at a window of data in one shot (or one local section of a signal as it changes over time) and learn to detect, for instance, high and low frequency waveforms and structures. The model or neural network may encompass knowledge of frequency space decomposition of a signal and may be configured to deconstruct a single waveform in time into a composite of simpler, underlying waveforms (e.g., sinusoidal waveforms). Thus, in some aspects, the model may be trained to perform something akin to Fourier analysis. In some other cases, the model may utilize a Short-time Fourier transform (STFT) to determine the sinusoidal frequency and phase content of local sections of a signal as it changes over time. STFT computation may involve dividing a longer time signal into shorter segments of equal length and then computing the Fourier transform separately on each shorter segment. In some cases, once the Fourier spectrum is revealed for each shorter segment, the changing spectra may be plotted as a function of time (i.e., also known as a spectrogram or waterfall plot).

Example Machine Learning Algorithms

In some embodiments, a plurality of distinct machine-learning algorithms may be operated in parallel, which may serve to enhance the accuracy of the early warning system for preventing fracture communication between wells. In some aspects, the use of multiple machine-learning algorithms may also decrease incorrect identifications of fracture parameters as compared to the use of a single machine learning algorithm. In some cases, a combination of three or four machine learning algorithms may be operated in parallel, which may provide a balance of high accuracy versus system complexity. Some non-limiting examples of machine learning algorithms may include a neural network, a decision tree, a support vector machine, and Bayesian methods.

Neural Networks

In some cases, a neural network may comprise a plurality of input nodes, where an input node refers to a point within the neural network to which a parameter (e.g., a drilling parameter) may be provided for further processing. Further, the neural network may comprise one or more output nodes, where each output node represents a calculated and/or predicted parameter based on the input data at the input nodes. In some cases, one or more layers of hidden nodes may lie between the input and output nodes, where the hidden nodes may be coupled to some or all of the input nodes and/or the output nodes. Each of the hidden nodes may be configured to perform a mathematical function that is determined or learned during a training phase of the neural network, where the mathematical function may be determined based on the data of the input nodes to which it is coupled. Likewise, the output nodes may perform mathematical functions based on data provided from the hidden nodes. In some embodiments, the neural network may be provided one or more drilling parameters in real-time, as well as one or more historical values of the drilling parameters based on preprocessing, for instance, by an early warning software. In other words, the neural network may be trained using historical data from fracking and drilling operations where adjacent well communication, fracture initiation, extension, or horizontal shifting actually occurred.

In such cases, the neural network may produce a value at an output node based on an input value provided to the input node, where the value may be a probability of occurrence of a fracture communication event, or alternatively a fracture initiation or extension event, or some other subterranean occurrence. Some non-limiting examples of drilling parameters may include a value indicative of fracking fluid pressure; a value indicative of stage time; a value indicative of pH; and a value indicative of perforation spacing.

Decision Trees

With regards to fracking and drilling operations, a decision tree machine learning algorithm may be an example of a predictive model comprising a plurality of interior nodes that may be traversed based on a set of input parameters (e.g., fracking parameters, such as fracking fluid pressure, stage length, pH, etc.). In such cases, the predicted value (e.g., of offset well communication) may be based on arriving at an end node following transitioning from node to node, where the transitioning may be based on the set of input parameters. In such cases, the end node may be dictated by the input parameters. It should be noted that, in some cases, decision trees may also be referred to as classification or regression trees.

Support Vector Machines

In some cases, support vector machines are a class of machine-learning algorithms that perform classifications of data into groups. In particular, support vector machines can be thought of as performing classification by analysis of the data in a multidimensional space. Training data for support vector machines may be "plotted" or "mapped" into the multidimensional space and classified or grouped spatially. It should be noted that the plotting or mapping need not be a true physical plotting, but a conceptual operation. After the training phase, data to be analyzed may be plotted or mapped into the multidimensional space. Further, the support vector machine may be configured to determine the most likely classification of the data. In some cases, the classification of the data to be analyzed may be a "distance" calculation between the spatial location of the data to be analyzed in the mappings and the "nearest" classification. In one non-limiting example, the support vector machine may be provided one or more fracking parameters from fracking operations. In this case, the support vector machine may be configured to plot the data in a multidimensional space and classify the data. During actual fracking operations (i.e., when real-time fracking parameters are provided to the support vector machine), the support vector machine may plot a data point under test in the multidimensional space, and predict a result (e.g., offset well communication, a probability of fracture initiation or increased production) based on the spatial position of the plotted point relative to a spatial delineation (or classification line) between data with offset well communication, fracture initiation or extension events and those without.

Bayesian Methods

In yet other cases, the machine learning algorithm may comprise the use of Bayesian methods. Bayesian methods represent a logically different view of data and probabilities and may be thought of as testing the plausibility of a hypothesis (e.g., an offset well communication, or a fracture extension will occur in the future) based on a previous set of data. In some aspects, Bayesian methods may be considered non-deterministic since they generally assume the plausibility of a hypothesis is based on unknown or unknowable underlying data or assumptions. In some embodiments, a value indicative of plausibility of a hypothesis may be determined based on the previous data (e.g., the training data), following which plausibility may be tested again in view of new data (i.e., with the fracking parameters applied). From the evaluation, a plausibility of the truth of the hypothesis may be determined.

FIG. 1 illustrates a drilling system 100 for monitoring acoustic or vibration signals (referred to simply as, signals) in an observation well. The signals can either be sourced or generated at (or in) the observation well or an optional offset well. As shown, the drilling system 100 can include a well head 102 of the observation well and optionally an offset well having an offset well head 120. The well head 102 of the observation well can include a sensor 104 (e.g., acoustic or vibration sensor) in physical contact with fluid in the observation well or a component directly in contact with the fluid (e.g., a sensor affixed to an outside of the standpipe or wellhead). For instance, the sensor 104 can be arranged within the wellhead, a circulating fluid line, or the standpipe. Alternatively, the sensor 104 can be arranged at an end of a T-junction that runs roughly perpendicular to piping of the wellhead, a circulating fluid line, or the standpipe. Alternatively, the sensor 104 can be arranged within a pipe parallel to piping of the wellhead, circulating fluid line, or standpipe. The sensor 104 can generate a signal and pass said signal to an onsite computer 106, for instance, via an analog-to-digital converter (ADC) 108. The onsite computer 106 may be configured to process signals from one or more wellheads of a pad, or alternatively, from multiple pads. The onsite computer 106 can include a transceiver or antenna 110 configured to transmit raw acoustic or vibration data to a conversion and analysis component. As illustrated, the conversion and analysis component may comprise an on-site or cloud-based storage and analysis unit 112. In some examples, the conversion and analysis component may be configured to convert the raw acoustic or vibration data from a time to a frequency domain. Further, the conversion and analysis component may be configured to identify frequency signatures indicative of one or more events. In some cases, identification of such events may further trigger a communication to an operator computer 114. Some non-limiting examples of such events may include a potential communication between wells, an eminent drill bit failure, wireline sticking, etc. In some cases, the operator computer 114 may be linked to the conversion and analysis component via a transceiver 116 and may further include a display 118 for providing visual warnings or other messages or indicators.

In some cases, the on-site or cloud-based storage and analysis unit 112 may include a trained model (e.g., as part of a machine-learning system) based on previous fracture communication events and their frequency signatures (and optionally previously classified by the machine-learning system). For instance, the model may have been trained using acoustic or vibration data from previous drilling events, for instance, an event that led to a falloff in production. In one example, a communication between two wells may have caused the falloff in production. In this case, the model may be trained to detect acoustic or vibration frequency signatures that suggest an imminent communication between wells. In some embodiments, the on-site or cloud-based storage and analysis unit 112 may be configured to provide automated feedback control to the well, for example, to reduce frac pressure, increase or decrease well spacing of future wells (or change a direction of a well to increase spacing between portions of adjacent wells), or perform another applicable action.

In some embodiments, the on-site or cloud-based storage and analysis 112 may monitor for a signature of pump trucks 122 pumping fluids into the offset well head 120. In some cases, these pump trucks 122 may operate at around 33 Hz. In such cases, the frequency signature (i.e., at 33 Hz) generated by the pump truck may have a greater amplitude than other frequency components generated by the illustrated drilling system 100.

In some cases, sound or pressure waves may reflect off of various structures, interfaces between different fluids or materials, etc., within a well or between wells. In such cases, the conversion and analysis component may be used to identify beat frequencies or resonances caused by such reflections. In some embodiments, the 33 Hz signal (i.e., a first frequency signature) generated by the pump truck may reflect off of one or more surfaces, including a heel of the well, toe of the well, one or more other structures at the well or well head, etc. In some cases, the reflective bouncing off of the one or more surfaces (e.g., one or more times per second for a 1-mile deep surface-to-heel well) may affect the resonant frequency identified by the conversion and analysis component. For instance, after reflecting and bouncing off of one or more surfaces and/or structures at the well head, a generated signal, such as the 33 Hz signal, may have a ~1 Hz beat frequency signal (or another frequency different from 33 Hz), corresponding to reflections. In other words, the conversion and analysis component may identify a ~1 Hz signal as the resonant or beat frequency for pump truck signals reflecting up and down through the vertical segment of a well (either the observation well or an adjacent well) in addition to the original 33 Hz signal. In this way, the resonant frequency may be used to better understand the structure of an observation or offset well, including one or more of the length of the borehole, length of horizontal sections, length of fractures extending from the horizontal section, etc.

Additionally or alternatively, operators may vary and control a generated source frequency signal (e.g., from a pump truck) and monitor changes in the observed signal in the frequency and/or time domain. For instance, rather than simply monitoring the 33 Hz pump truck signal, an operator may perform a frequency sweep for the generated pump truck signal (e.g., by gradually adjust a pump truck frequency through a range, such as 20 Hz to 40 Hz). In this example, the conversion and analysis component may be used not only to pick up on these unique frequencies (e.g., between 20 and 40 Hz) over background frequencies, but also to monitor and observe the signal changing in the frequency domain as a function of time. Additionally or alternatively, the source frequency may be adjusted to optimize travel through a given medium. For instance, where a certain shale formation separates an observation well (i.e., associated with well head 102) and an offset well (i.e., associated with offset well head 120) coupled to the pump trucks, the pump trucks' revolutions per minute (RPMs) could be gradually adjusted until a highest amplitude signal (i.e., corresponding to an optimized frequency for travel through the shale formation between the wells) is observed by the conversion and analysis component comprising the on-site or cloud-based storage and analysis unit 112. Operational measurements can then be taken based on this optimization of the source frequency.

By better understanding offset well communication and predicting said communication, the herein disclosed systems, methods, and apparatus may enable wells to be located/drilled closer together. Today's wells are distanced such that a safe buffer exists that greatly reduces the chances of communication—but this buffer assumes that communication is difficult to predict. With the greater accuracy of the disclosed embodiments, smaller buffers between offset wells can be used. Current practice also often entails shutting down operations on a first well while development of an offset well takes place. The herein disclosed embodiments can be combined with operations in which adjacent wells operate or are developed at the same time without shutting either offset well down.

Figure 2:
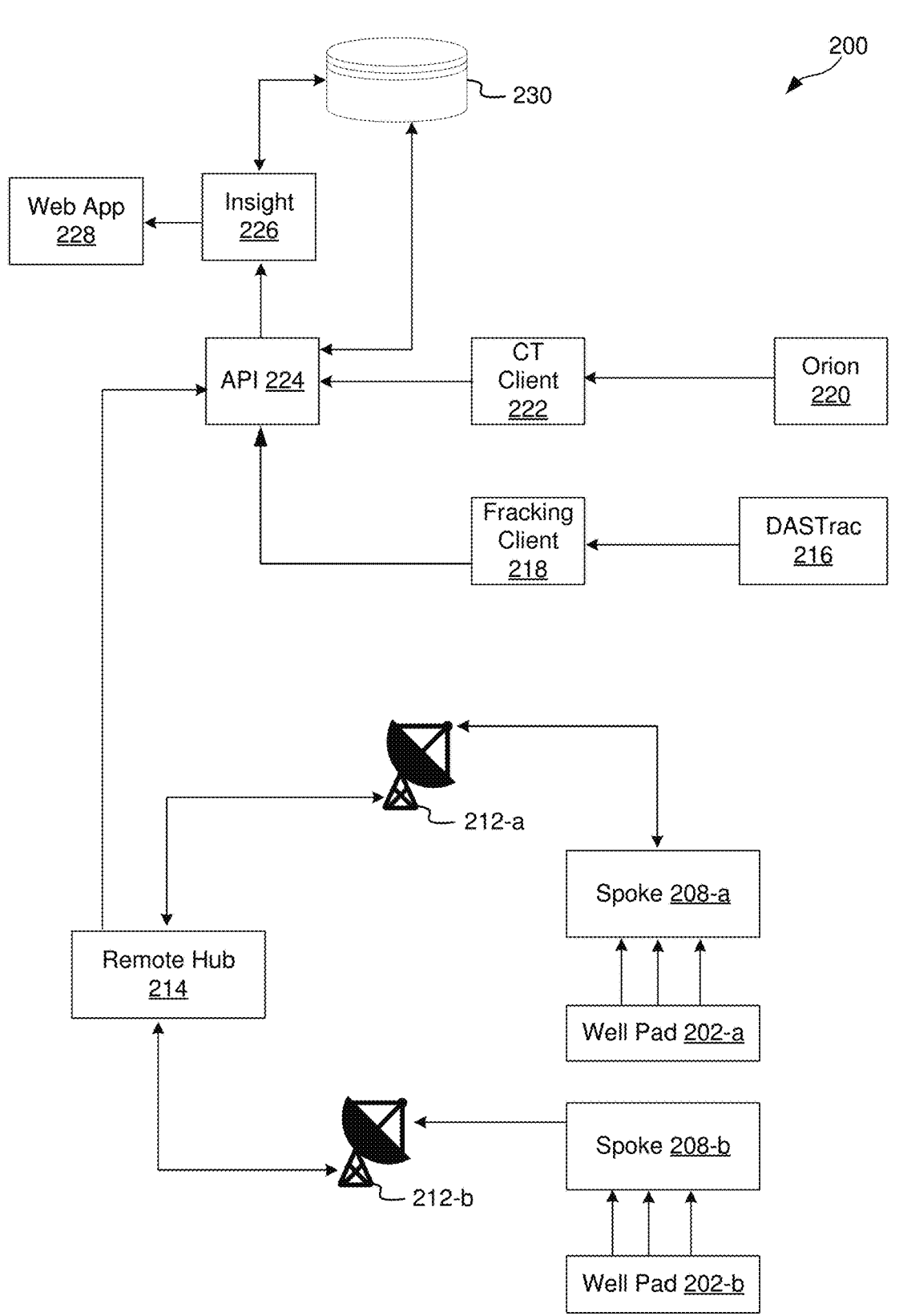
FIG. 2 illustrates a drilling system for monitoring acoustic or vibration signals in an observation well according to an embodiment of the disclosure.

FIG. 2 illustrates a drilling system 200 for monitoring acoustic or vibration signals in an observation well. In some examples, the drilling system 200 may implement one or more aspects of the figures described herein, including at least FIG. 1. As shown, drilling system 200 may comprise one or more well pads 202 (e.g., well pad 202-*a*, well pad 202-*b*), one or more spoke computers 208 (e.g., spoke computers 208-*a*, spoke computer 208-*b*), antenna systems 212 (e.g., antenna system 212-*a*, antenna system 212-*b*), a remote hub 214, and a database 230. While the illustrated embodiment shows two well pads 212, any number of well pads may be utilized. Each well pad 212 may include one or more well heads (shown as well head 102 and/or well head 120 in FIG. 1), where each well head can include a sensor (shown as acoustic sensor 104 in FIG. 1) directly or indirectly coupled to fluids in the well, and optionally an absolute pressure sensor (or static pressure sensor) directly coupled to fluids in the well (e.g., via the wellhead, circulating fluid line, or standpipe, to name a few non-limiting examples). Alternatively, each well may include an acoustic sensor and an optional absolute pressure sensor, and these sensors may not be directly coupled to fluids in the well via the well head. For instance, an adapter below the well head may be used to place the sensor(s) in direct communication with fluid in the well, or the vibration sensor may be coupled to a metal component (e.g., a standpipe) of the well or well head.

The signals can either be sourced at the observation well (e.g., acoustic waves from a fracture initiation) or an adjacent or offset well. In some embodiments, the sensor(s) may be configured to couple to processors (e.g., Raspberry Pi) located in the spoke computers 208-*a* and/or 208-*b*. In some cases, a spoke computer 208 may comprise one or more processors for each well pad 202 in electronic communication with the respective spoke computer. In some cases, in addition to reading the acoustic or vibration signal measurements from the one or more sensors, the computer system (e.g., spoke computers 208) may also be configured to read one or more surface-based parameters directly or indirectly. A non-limiting list of surface-based parameters that may be directly or indirectly read by the computer systems comprises: a hook load; RPM of the drill string at the surface; torque applied to the drill string at the surface; pressure of the drilling fluid as the drilling fluid is pumped into the drill string; pressure of the drilling fluid returning to the surface; and standpipe pressure of the drilling fluid.

In some embodiments, the one or more processors of the spoke computers 208 may be coupled to an antenna system 212. In some cases, the antenna system 212 may comprise an omnidirectional antenna, although other types of antennas are contemplated in different embodiments. Each antenna system 212 may be in communication with a wide area network (WAN), such as a 4G or 5G network. In another embodiment, the antennas of the antenna system 212 may form a local area wireless network wherein one of the antennas may be configured as an interface (e.g., a gateway) between the local area wireless network and a wide area network. In some embodiments, cellular (e.g., multi-beam antennas, sector antennas) or satellite (e.g., dish) antennas may be deployed for communication with a wide area network, to name a few non-limiting examples. Further, omnidirectional or Yagi type antennas, to name two non-limiting examples, may be utilized for local area network communication.

In some cases, the remote hub 214 may be in communication with the antenna systems 212 and the spoke computers 208. Further, the remote hub 214 may be configured to contact an insight program 226 via an Application Programming Interface (API) 224. In some examples, this communication may involve a local area network or a wide area network. Insight 226 may be configured to store data for a training model in the database 230, as well as continually train the model using new data acquired from the acoustic sensors at the well heads. In some cases, the drilling system 200 may also support a web app 228 to provide one or more insights, warnings, feedback, and/or instructions to pad operators. In some examples, the web app 228 may be accessible via a user interface displayed on a user device (e.g., laptop, smartphone, tablet, etc.).

In some embodiments, the processors may comprise (or may be coupled to) a conversion and analysis component. In other embodiments, the processors may send their data through the network(s) to a centralized conversion and analysis component. In some cases, the centralized conversion and analysis component may or may not be located near the well pads 202. For instance, the centralized conversion and analysis component may be located off-site in some embodiments.

As illustrated, the drilling system 200 may further comprise one or more additional components, modules, and/or sub-systems, including, but not limited to, a Data Acquisition and Control System (DASTrac 216), a fracking client 218, a Coiled Tubing (CT) Data Acquisition module 220, and a CT client 222. In some cases, the DASTrac 216 may comprise a data acquisition and control program for acquiring fracking operations data from wellsite process control units and other sensors. Further, DASTrac 216 may be configured to display the acquired data from the data acquisition system in both numeric and graphical form in real time, which may enable operators to change job profiles, scale parameters, advance stages, change stages, and hold stages in response to seeing an impending offset well communication event, to name one non-limiting example. In some cases, the CT Data Acquisition module 220 may be configured to measure and control technological parameters of coiled tubing units during repair and stimulation operations of oil and gas wells. The CT Data Acquisition module 220 may also be configured to record the measured technological parameters on electronic media, and optionally display and visualize them on an operator's computer display. In some cases, the CT client 222 may be configured to access coiled tubing data from the CT Data Acquisition module 220, for instance, directly via the API 224. In the oil and gas industry, coiled tubing may refer to a long metal pipe, usually anywhere between 1 to 3.25 inches in diameter (although other diameters are contemplated in different embodiments), which is supplied spooled on a reel. In some cases, coiled tubing may be used for interventions in oil and gas wells, as production tubing in depleted gas wells, and/or as an alternative to a wireline (i.e., the coiled tubing may be used to carry out operations similar to a wireline). In some embodiments, coiled tubing may be configured to perform open hole drilling and milling operations. Further, due to their high pressure tolerance abilities (e.g., ranging from 55,000 PSI to 120,000 PSI), they may also be utilized to fracture a reservoir. In some cases, one or more sensors (not shown) may be coupled to the coiled tubing and sent downhole. The CT Data Acquisition module 220 may collect real-time downhole measurements from the sensors, where the measurements may be used to model the fatigue on the coiled tubing, predict coiled tubing performance, fluid behavior at modeled downhole well conditions, to name a few non-limiting examples. In some cases, the real-time downhole measurements collected by the CT Data Acquisition module 220 may also be used to optimize treatments, for instance, during interventions (i.e., when the well is taken offline).

The spoke computers can include memory for storing electrical signals, a current frequency domain spectrum, or both, measured by sensors at one or more well heads, circulating fluid lines, or standpipes at the well pads 202-*a* and 202-*b*. The database 230 can also include memory for storing electrical signals, a current frequency domain spectrum, or both, measured by sensors at one or more well heads, circulating fluid lines, or standpipes at the well pads 202-*a* and 202-*b*. The database 230 can also be configured to store frequency domain spectra measured during previous fracture communication events, for example. The database 230 can also include previous classifications or identifications of offset well communication events (i.e., fracture communication between wells) associated with the previous frequency domain spectra. This may include a mapping between events (e.g., a previous event where fracture communication between wells occurred) and previous frequency domain spectra.

Figure 3:
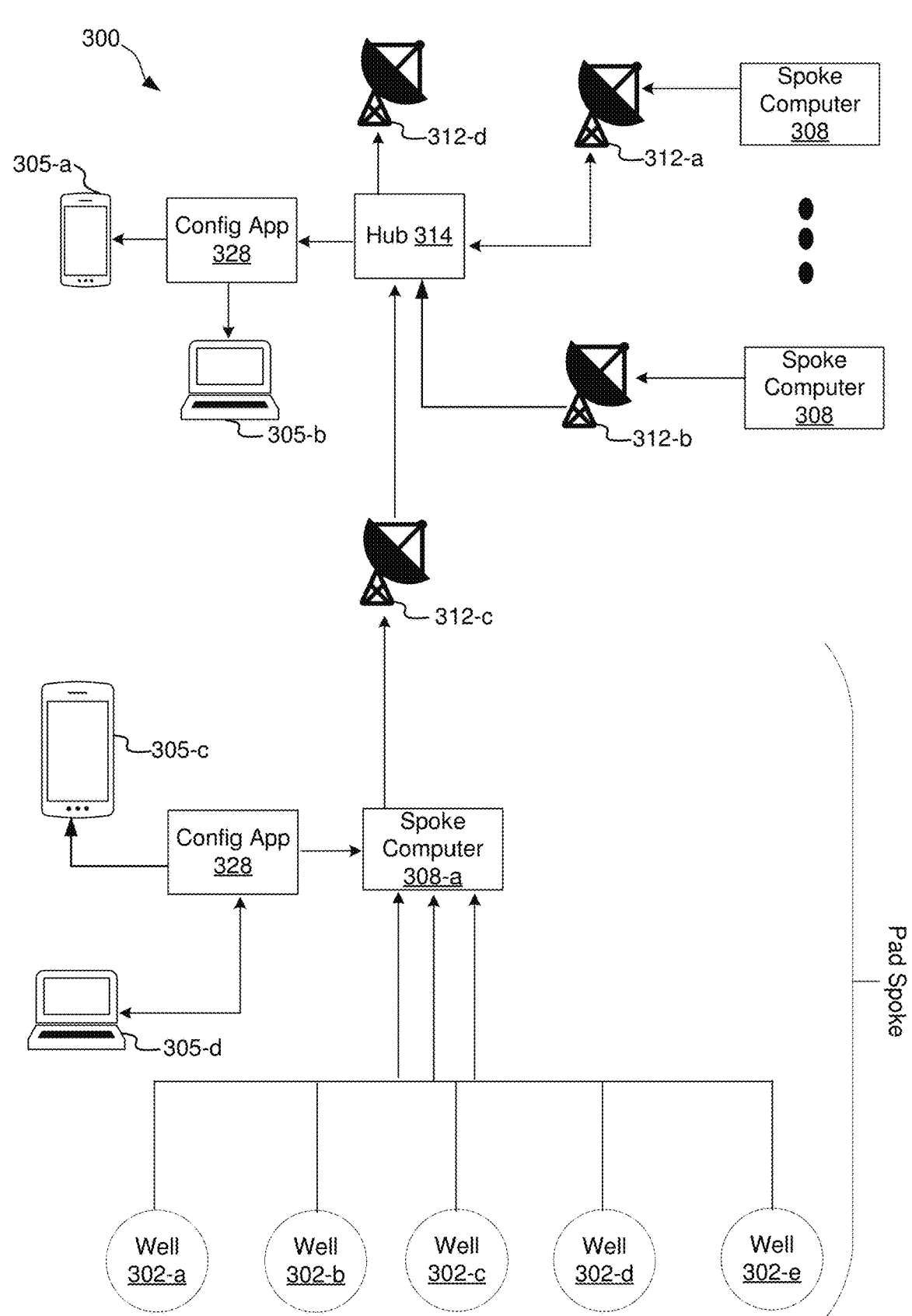
FIG. 3 illustrates a network structure for multiple spoke computers according to an embodiment of the disclosure.

FIG. 3 illustrates a network structure 300 for multiple spoke computers according to an alternate embodiment of the disclosure. As illustrated, the network structure 300 may comprise 'N' spoke computers 308, each including some or all the details shown in the spoke computer 308-*a*. In some examples, spoke computers 308 may be electronically and communicatively coupled to antenna systems 312. Further, each antenna system 312 may be in communication with a hub 314. Spoke computers 308, antenna systems 312, and hub 314 may be similar or substantially similar to spoke computers 208, antenna systems 212, and remote hub 214, respectively, previously described in relation to FIG. 2. In some examples, spoke computer 308-*a* may be in electronic communication with sensors (e.g., acoustic or vibration sensors) of a well pad (shown as well pad 202 in FIG. 2). As shown, the well pad may comprise one or more wells (e.g., well 302-*a*-*e*), each having an acoustic or vibration sensor. Further, these sensors may be configured to provide raw data (e.g., time domain acoustic or vibration signal data) to the spoke computer 308-*a*. In some embodiments, the spoke computers may be configured to wirelessly communicate with the hub 314. Furthermore, the hub 314 may be configured to communicate with a wide area network, for instance, via an antenna system 312-*d*.

In some cases, one or more user/operator devices 305, such as user/operator devices 305-*a*, 305-*b*, 305-*c*, and/or 305 may be in communication with a configuration app 328. The configuration app (also referred to as config app 328) may be in communication with the hub 314 and may be used to assign sensors to particular wells 302 and/or spoke computers 308, for instance. The config app 328 may also be used for configuring one or more of the hub 314, the sensors, and the spoke computers 308.

Figure 4:
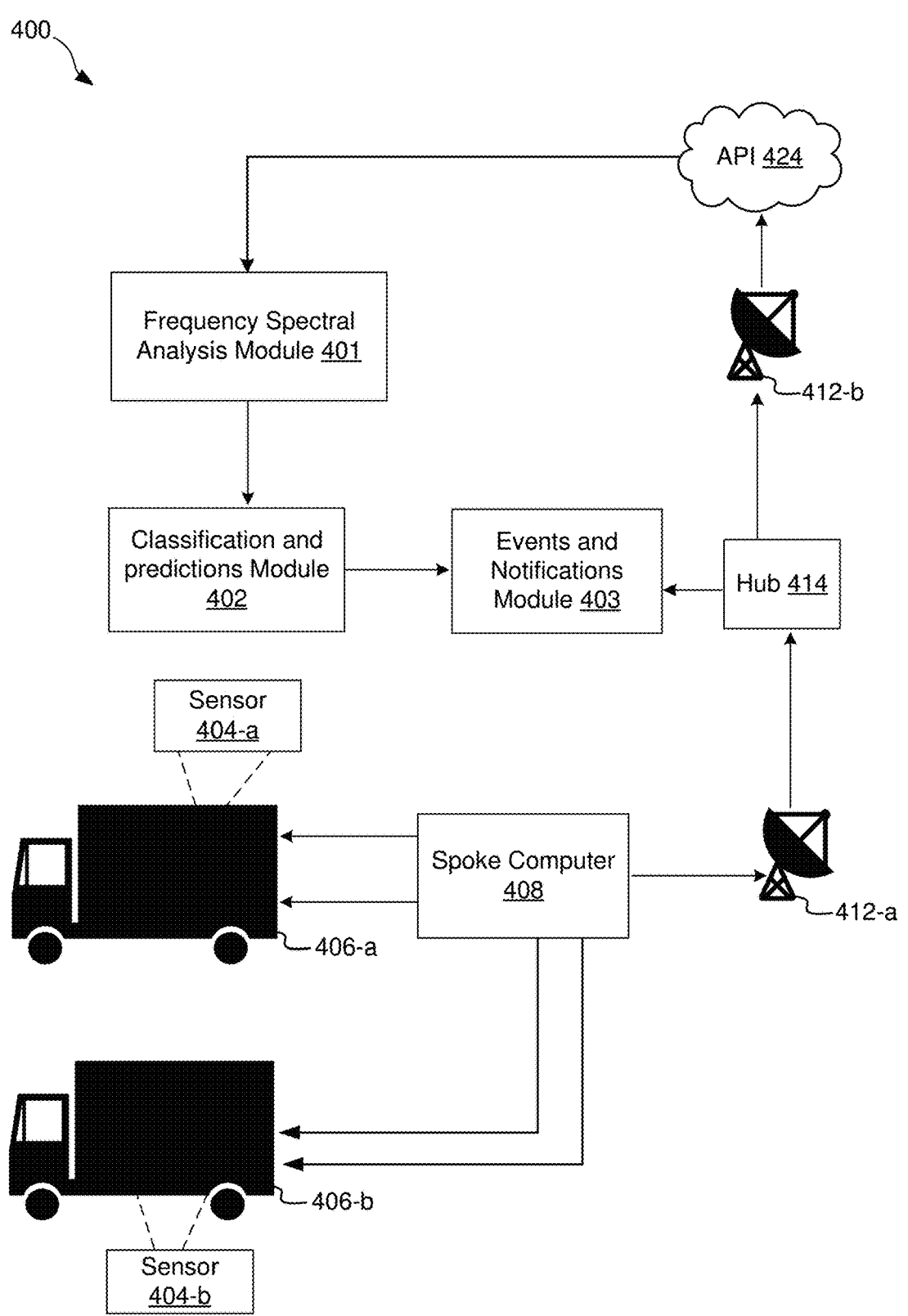
FIG. 4 illustrates a system for using frequency signatures of acoustic or vibration data to prevent fracture communication between wells according to an embodiment of the disclosure.

FIG. 4 illustrates a system 400 for using frequency signatures of acoustic or vibration data to predict and prevent fracture communication between offset wells. In this illustration, one or more sensors 404 (e.g., sensor 404-*a*, sensor 404-*b*) are coupled to pump trucks 406 (e.g., pump truck 406-*a*, pump truck 406-*b*), where the one or more sensors 404 may be acoustic or vibration sensors. In some cases, the sensors 404 may be similar or substantially similar to the sensors 104 previously described in relation to FIG. 1. The sensors 404 can be configured to make direct or indirect measurements of acoustic or vibration waves in fracking fluid, for instance, via connection to a well's wellhead, circulating fluid lines, standpipe, or piping in a pump truck. In some embodiments, the sensors 404 may be configured to pass raw data (e.g., time domain acoustic or vibration signal data) to a spoke computer 408, which may implement one or more aspects of the spoke computers 208 and/or 308 described in FIGS. 2 and/or 3, respectively. Following reception of raw sensor data, the spoke computer 408 may transmit the raw data using wired or wireless communication to a hub 414. Alternatively, the spoke computer 408 may be configured to convert the raw data in the time domain to the frequency domain, for instance, using a FFT algorithm. As shown, the spoke computer 408 may be configured to communicate with the hub 414 using antenna system 412-a. Antenna systems 412 may be similar or substantially similar to the antenna systems 212 and 312 described in relation to FIGS. 2 and 3. The antenna systems 412 may comprise one or more of omnidirectional, Yagi, dish, and cellular antennas, to name a few non-limiting examples.

After hub 414 receives the data (e.g., raw data, or frequency domain sensor data) from spoke computer 408, it may further relay said data on to a frequency spectral analysis module 401 via antenna system 412-b and/or API 424. The API 424 may implement one or more aspects of API 224 discussed in relation to FIG. 2. In some examples, for instance, if the hub 414 receives time domain data from the spoke computer 408, the hub 414 may transmit the time domain data to a conversion and analysis component and receive converted frequency domain data, prior to relaying the frequency domain data to the API 424.

As illustrated, the frequency spectral analysis module 401 may be electronically and communicatively coupled to a classification and prediction module 402. The classification and prediction module 402 may be configured to determine if the frequency spectrum of the raw data aligns with signatures for known subterranean activity or events, such as fracture initiation, fracture extension, horizontal shifting, fracture intersection with well-bore, and fracture intersection with another fracture, to name a few non-limiting examples. In other cases, the classification and prediction module 402 may be configured to determine if the frequency spectrum of the raw data resembles a frequency signature before a frac hit actually occurred. Alignment with frequency signatures for known sizes, such as diameter and length of a fracture may also be looked for. If such a classification occurs, then an events and notification module 403 may be activated. In some circumstances, the events and notification module 403 may be configured to issue an indication to an operator of the pump truck 406 or well. Alternatively or in parallel, the classification and prediction module 402 may be configured to analyze raw time series data and determine if this raw data aligns with known time series signatures. If such a classification occurs, the events and notification module 403 may be activated to send an indicator to an operator.

Figure 5:
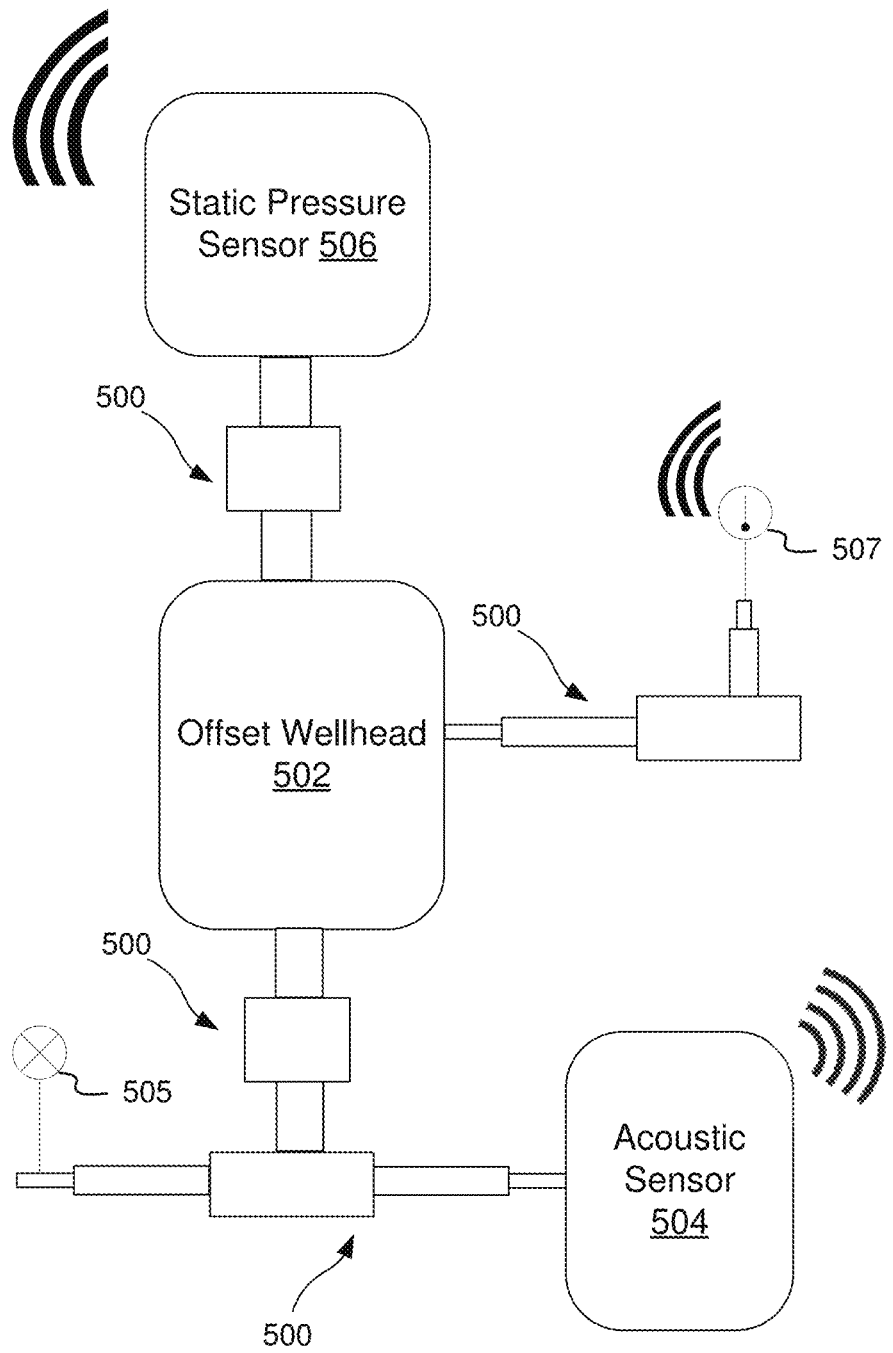
FIG. 5 illustrates a well head embodying the herein-disclosed acoustic sensor in accordance with one or more implementations.

FIG. 5 illustrates wellhead assembly 500 comprising a wellhead 502 and one or more sensors. As shown, the wellhead 502 may include several interfaces for various sensors such as a casing pressure sensor 505, a static pressure sensor 506, a tubing temperature sensor 507, an acoustic or vibration sensor 504, etc. In some embodiments, different sensors may be provided for the tubing and the casing since these are separate fluid paths. It should be noted that, the sensors depicted in FIG. are not intended to be limiting, and more or fewer sensors may be utilized in other embodiments. For instance, in some examples, a tubing pressure sensor may be provided in addition to the casing pressure sensor 505. Additionally or alternatively, a casing temperature sensor may be provided along with the tubing temperature sensor 507. In some embodiments, the herein disclosed acoustic or vibration sensor 504 may be coupled to one of the interfaces of the wellhead 502, such that the acoustic or vibration sensor 504 is in direct physical contact with fluid in the wellhead 502. In some examples, the acoustic sensor 504 may comprise wireless transmission hardware for supporting communication with a spoke computer, hub, or wide area network (not shown).

Figure 6:
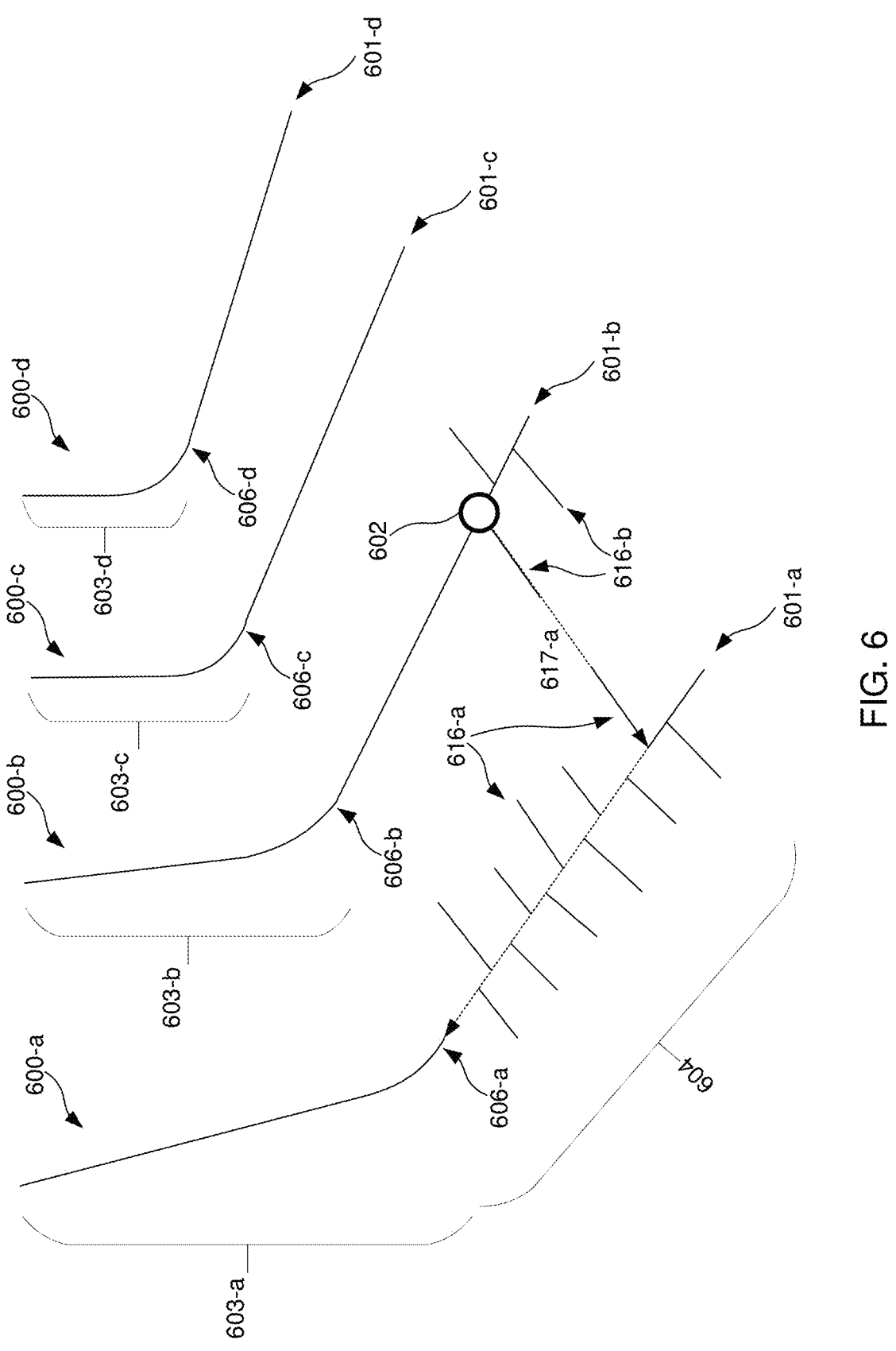
FIG. 6 illustrates an isometric view of four offset wells, each including a vertical and horizontal region separated by the heel, in accordance with one or more implementations.

FIG. 6 illustrates an isometric view of four offset wells 600 (e.g., offset wells 600-a, 600-b, 600-c, and 600-d), each including a vertical (e.g., vertical regions 603-a, 603-b, 603-c, and 603-d) and a horizontal region 604 separated by a heel 606 (e.g., heel 606-a, 606-b, 606-c, 606-d). The horizontal region 604 of each offset well 600 connects a respective heel 606 to a toe 601 (e.g., toe 601-a, toe 601-b, toe 601-c, toe 601-d). In this example, an event 602 has occurred near the toe 601-b of the second offset well 600-b. An acoustic or vibration sensor as described earlier may be coupled to a top or wellhead of the first offset well 600-a (e.g., a wellhead, circulating fluid line, or standpipe). In this case, the first offset well 600-a may be referred to as the observation well. In some cases, the acoustic sensor at the wellhead of the first offset well 600-a may detect the event 602 at the second well based on detecting sound or vibrations passing through the underground formation separating the two offset wells 600-a and 600-b. In some cases, the sound or vibrations associated with the event 602 may also pass through one or more fractures 616 (e.g., fractures 616-a, 616-b) off of both wells. Because pressure or sound tend to move more quickly through dense rock than through fluids in a fracture or in a well, event 602 may be detected multiple times at the acoustic sensor. In some cases, the pressure or sound measured by the acoustic sensor may be recorded in a digital format as a time series or in the time domain, also referred to as a trace, over a given time period. In some cases, the sound or vibration energy recorded may be projected back to multiple possible points of origin for the event in the underground formation. A microseismic event such as a fracture emits energy (e.g., sound or vibrations) that are detected and recorded by the acoustic sensor at the top or wellhead of well 600-a. In some cases, multiple acoustic sensors may be utilized. For instance, each well 600 may comprise an acoustic sensor at their wellhead. The microseismic data recorded at the one or more acoustic sensors may be projected back to a possible point of origin for event 602. In some circumstances, if acoustic/sound or vibration waves are emitted from a given subsurface point, then the waves arriving at different points along the sensing well may add constructively (i.e., the maxima of two waves add together, since they are in phase or phase difference is an even multiple of 180 degrees). In such cases, the amplitude of the resulting wave recorded at the different points along the sensing well may be equal to the sum of the individual amplitudes. In some other cases, if the waves are not emitted from a given subsurface point, they may wholly (i.e., when phase difference is an odd multiple of 180 degrees) or partly (i.e., phase difference is intermediate between the two extremes) cancel one another at the multiple elevations along the well height.

Figure 7:
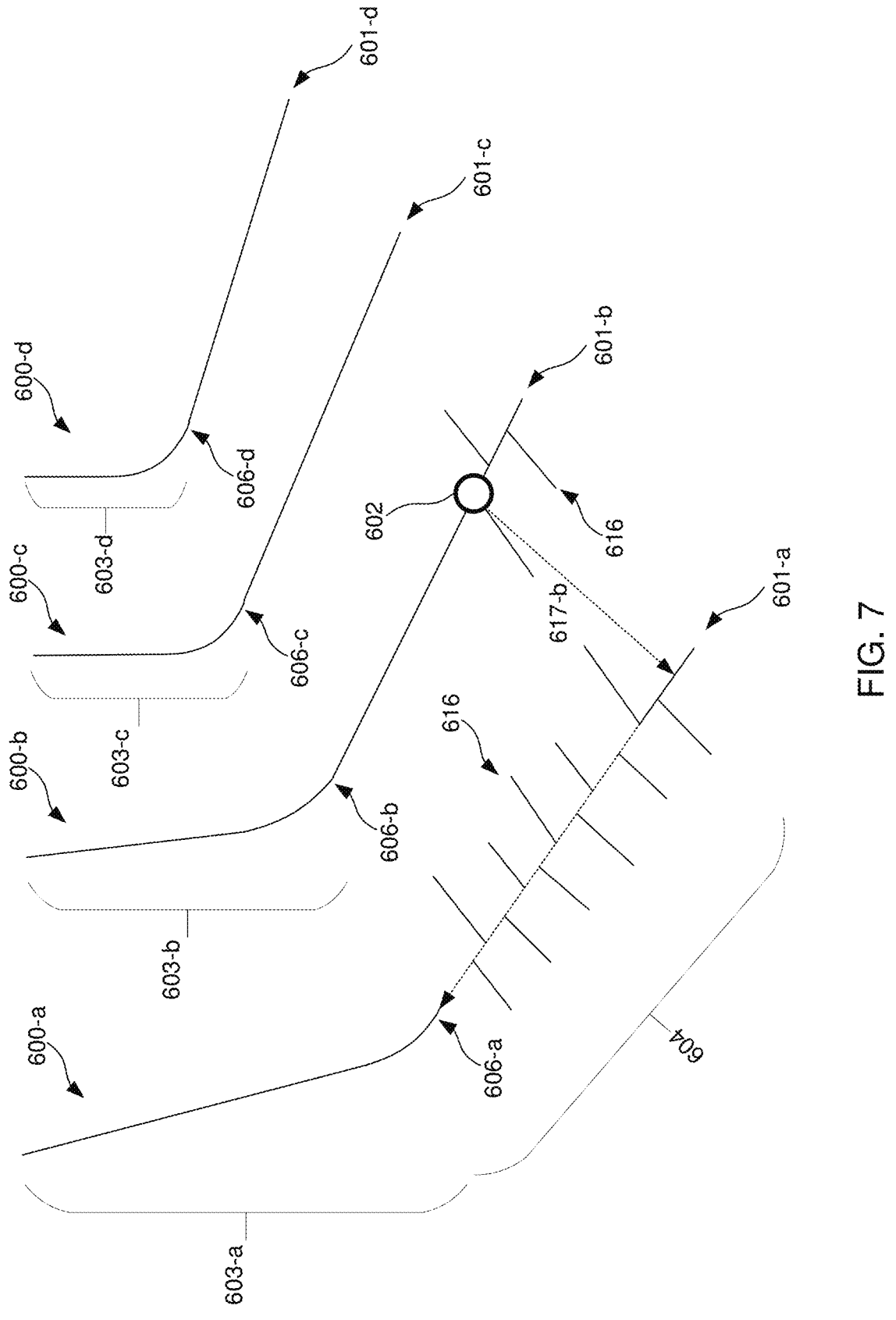
FIG. 7 illustrates an isometric view of the four offset wells in FIG. 6, in accordance with one or more implementations.
Figure 8:
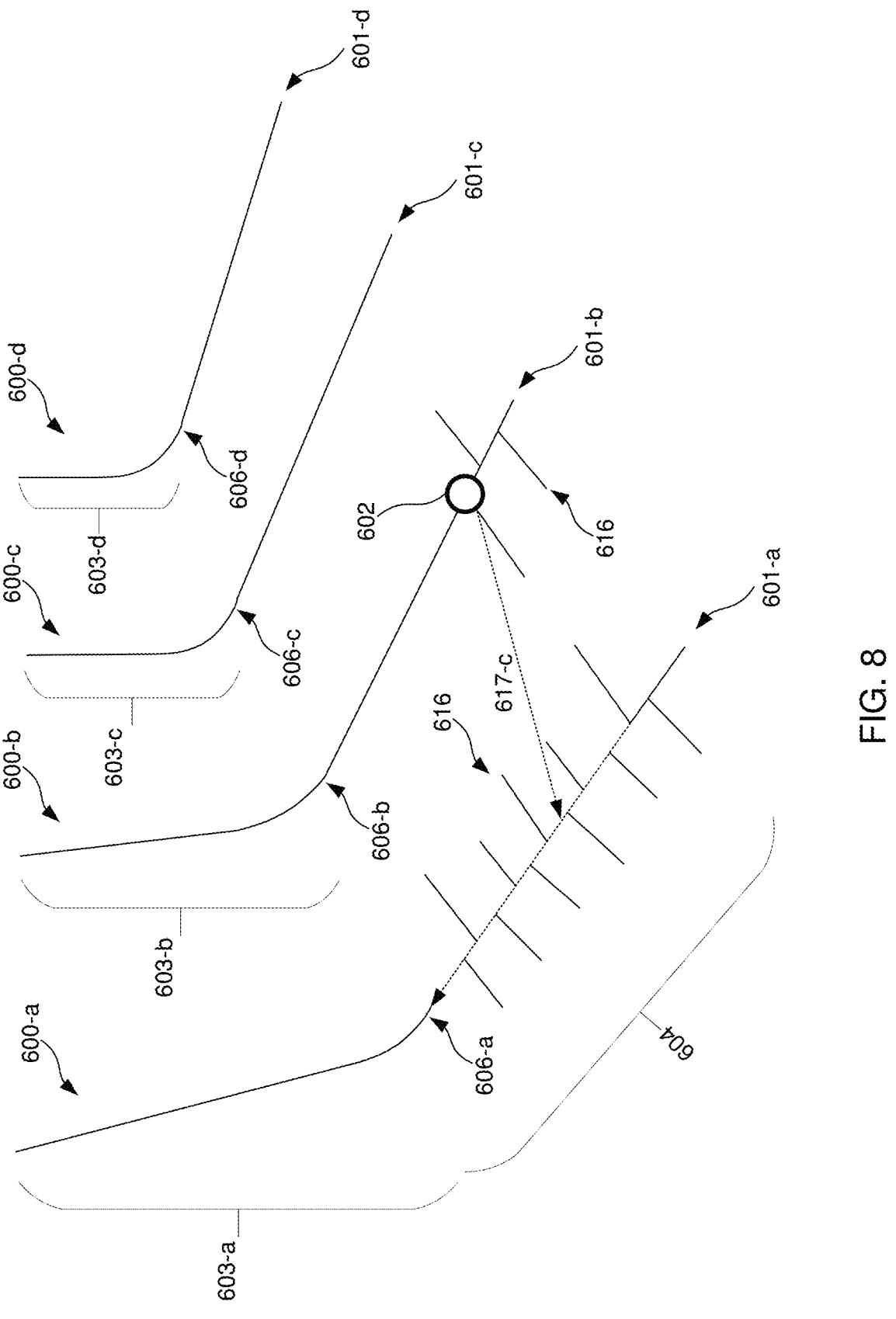
FIG. 8 illustrates an isometric view of the four offset wells in FIG. 6, in accordance with one or more implementations.
Figure 9:
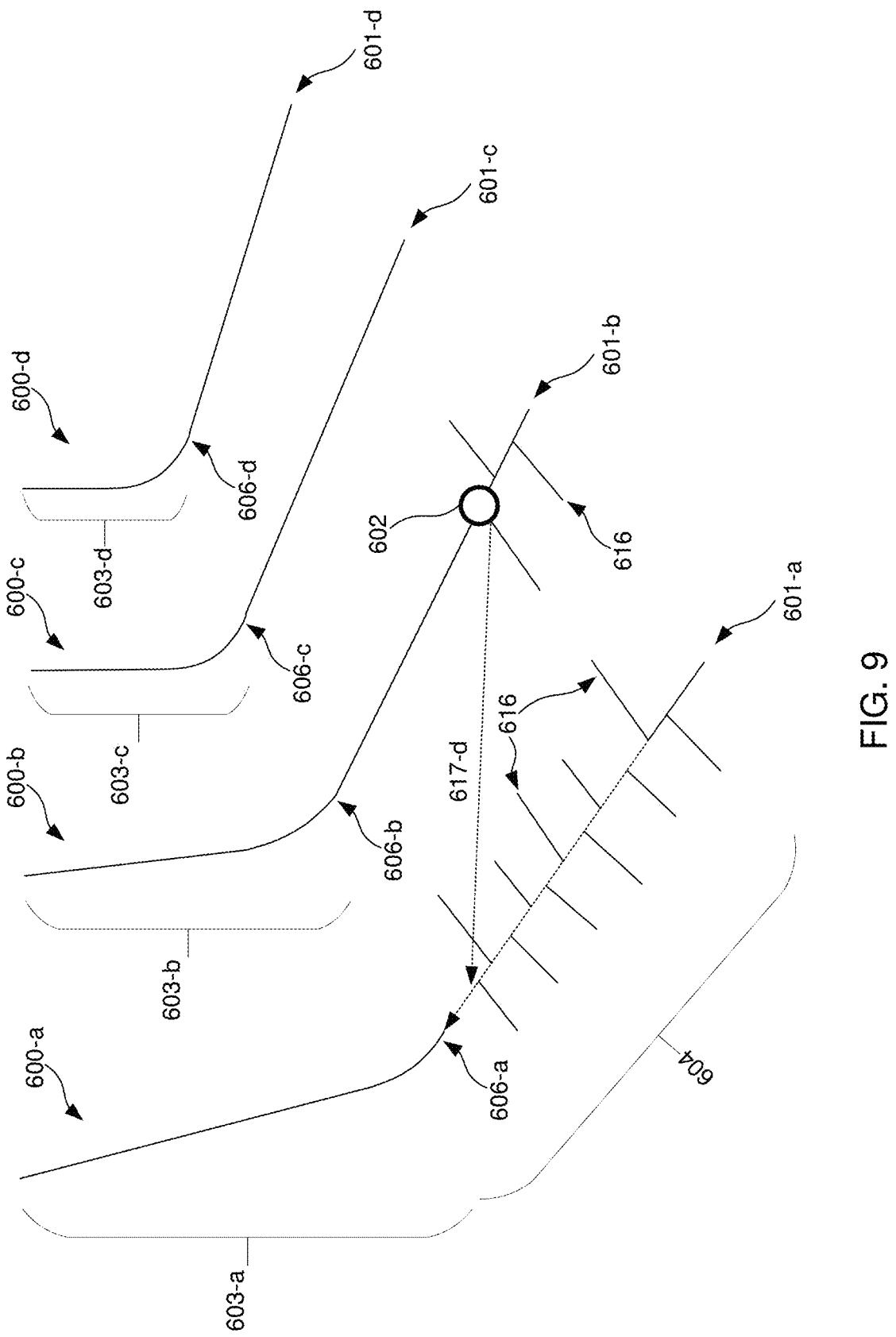
FIG. 9 illustrates an isometric view of the four offset wells in FIG. 6, in accordance with one or more implementations.
Figure 10:
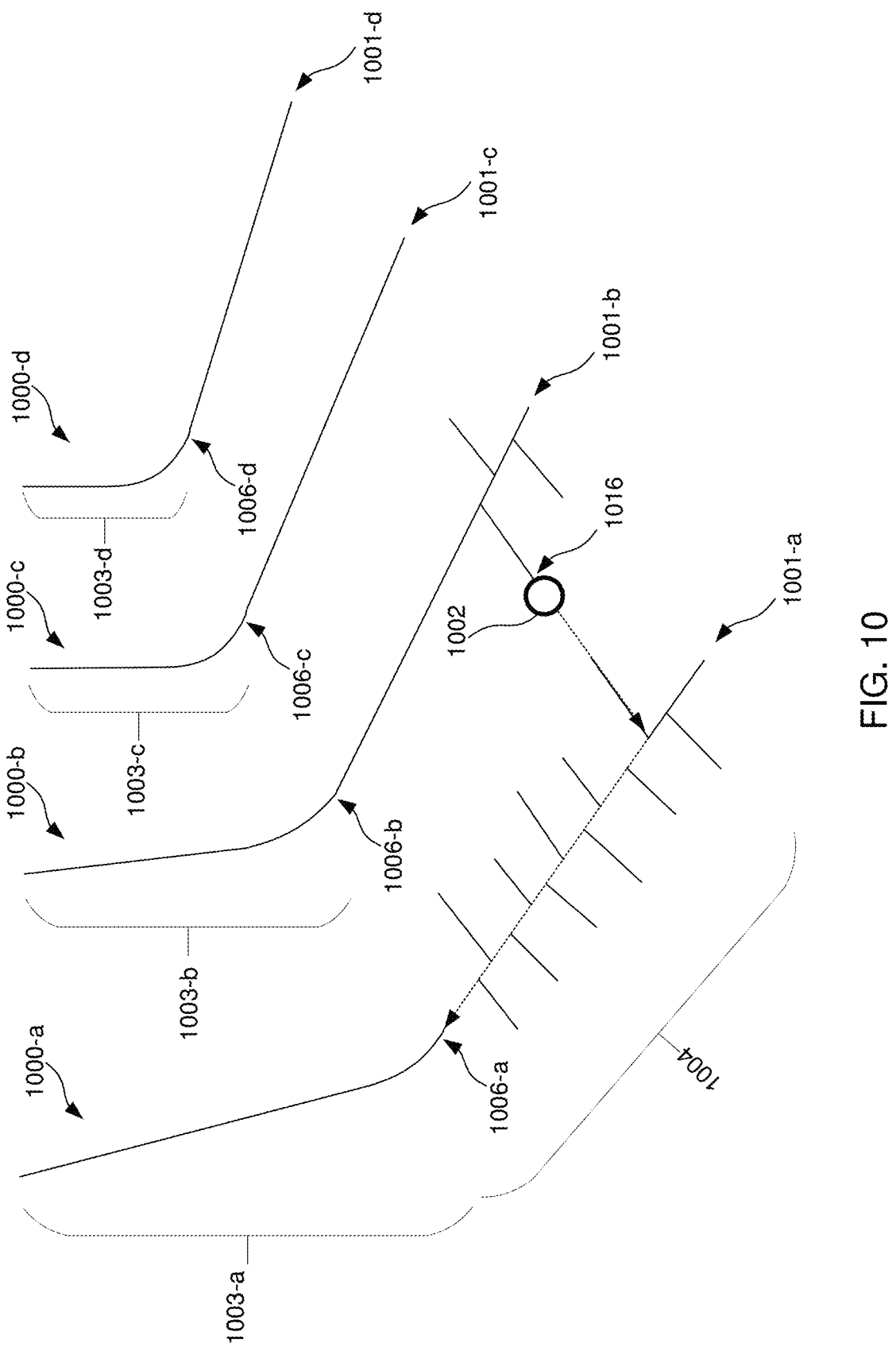
FIG. 10 illustrates an isometric view of four offset wells, each including a vertical and horizontal region separated by the heel, in accordance with one or more implementations.
Figure 11:
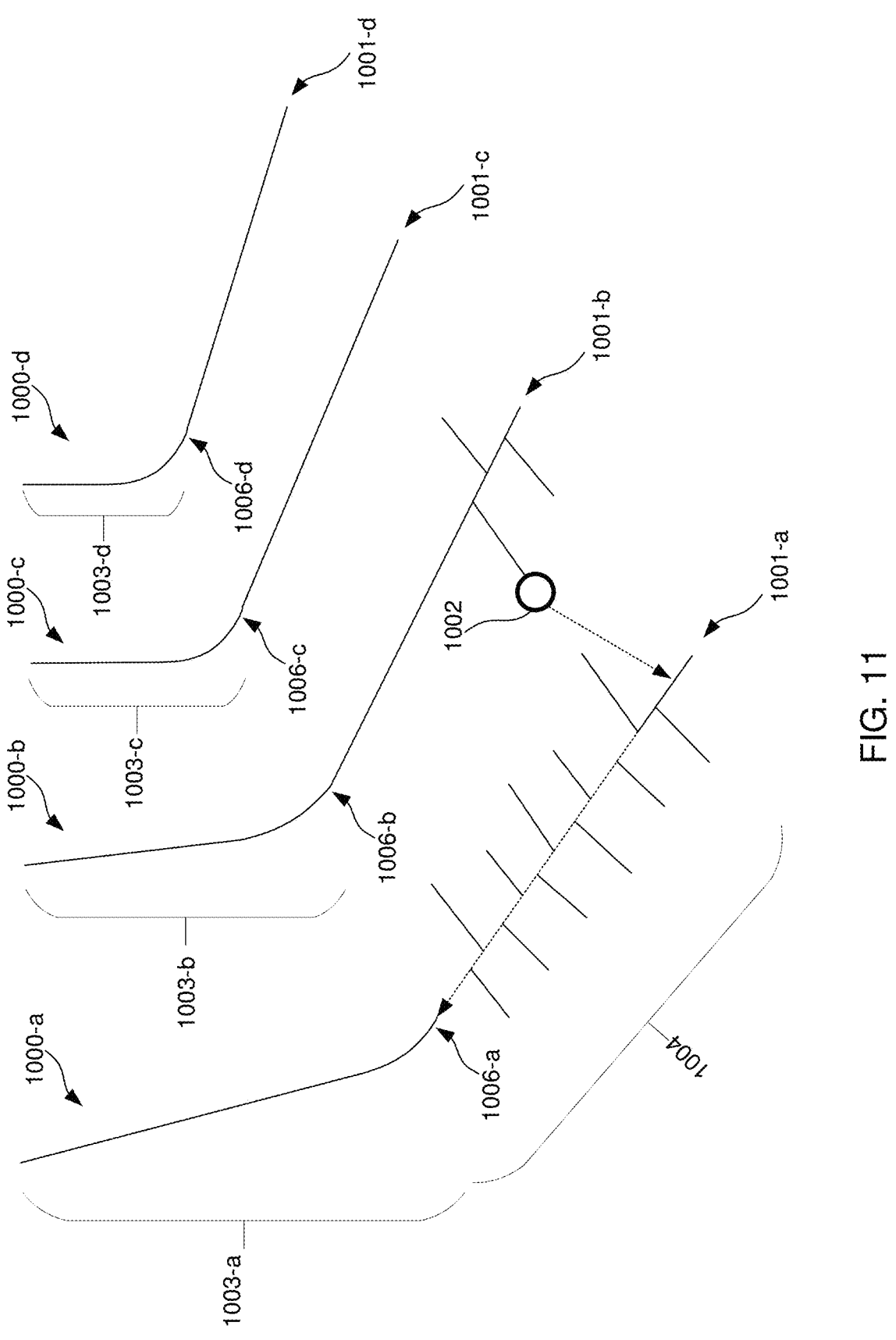
FIG. 11 illustrates an isometric view of the four offset wells in FIG. 10, in accordance with one or more implementations.
Figure 12:
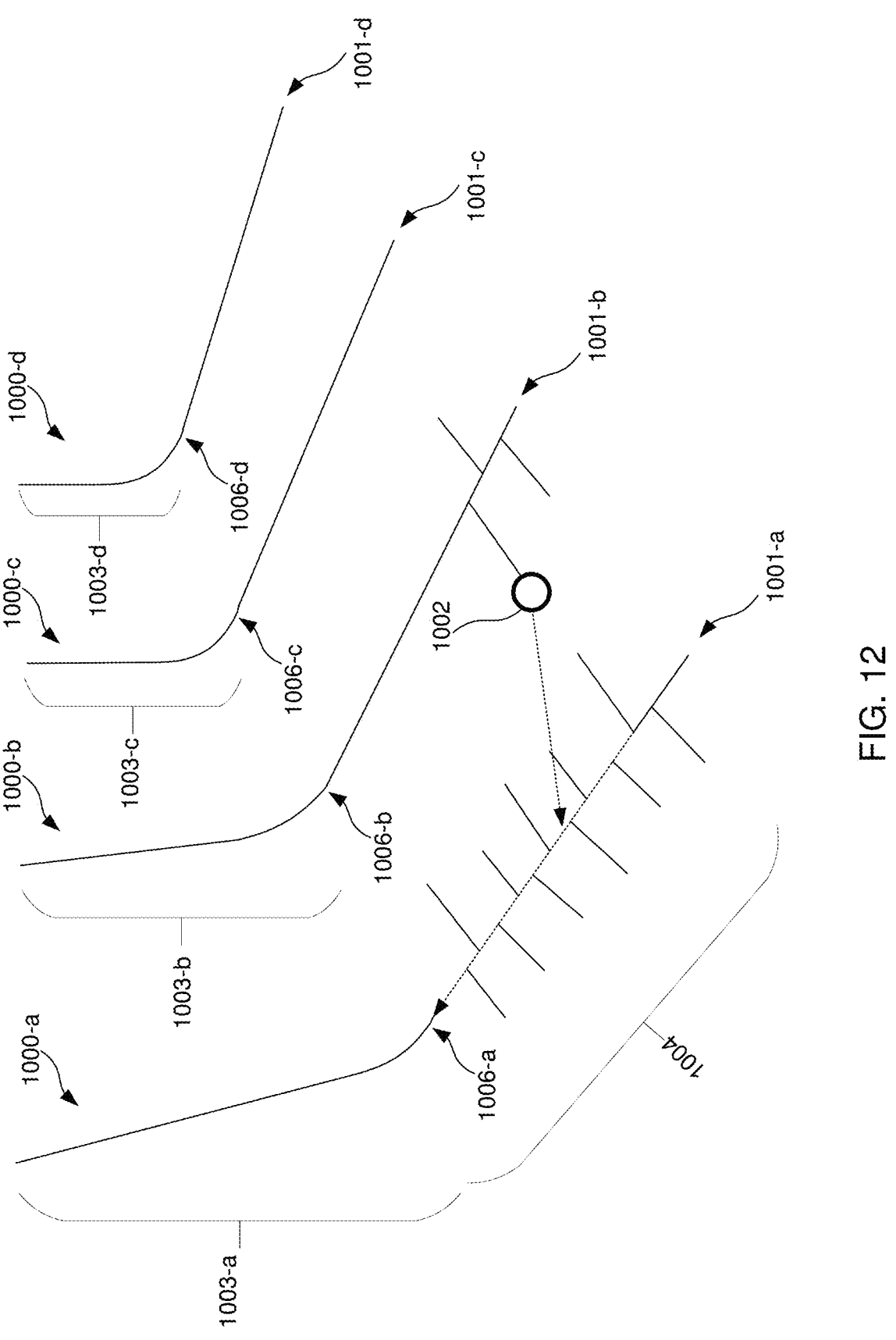
FIG. 12 illustrates an isometric view of the four offset wells in FIG. 10, in accordance with one or more implementations.
Figure 13:
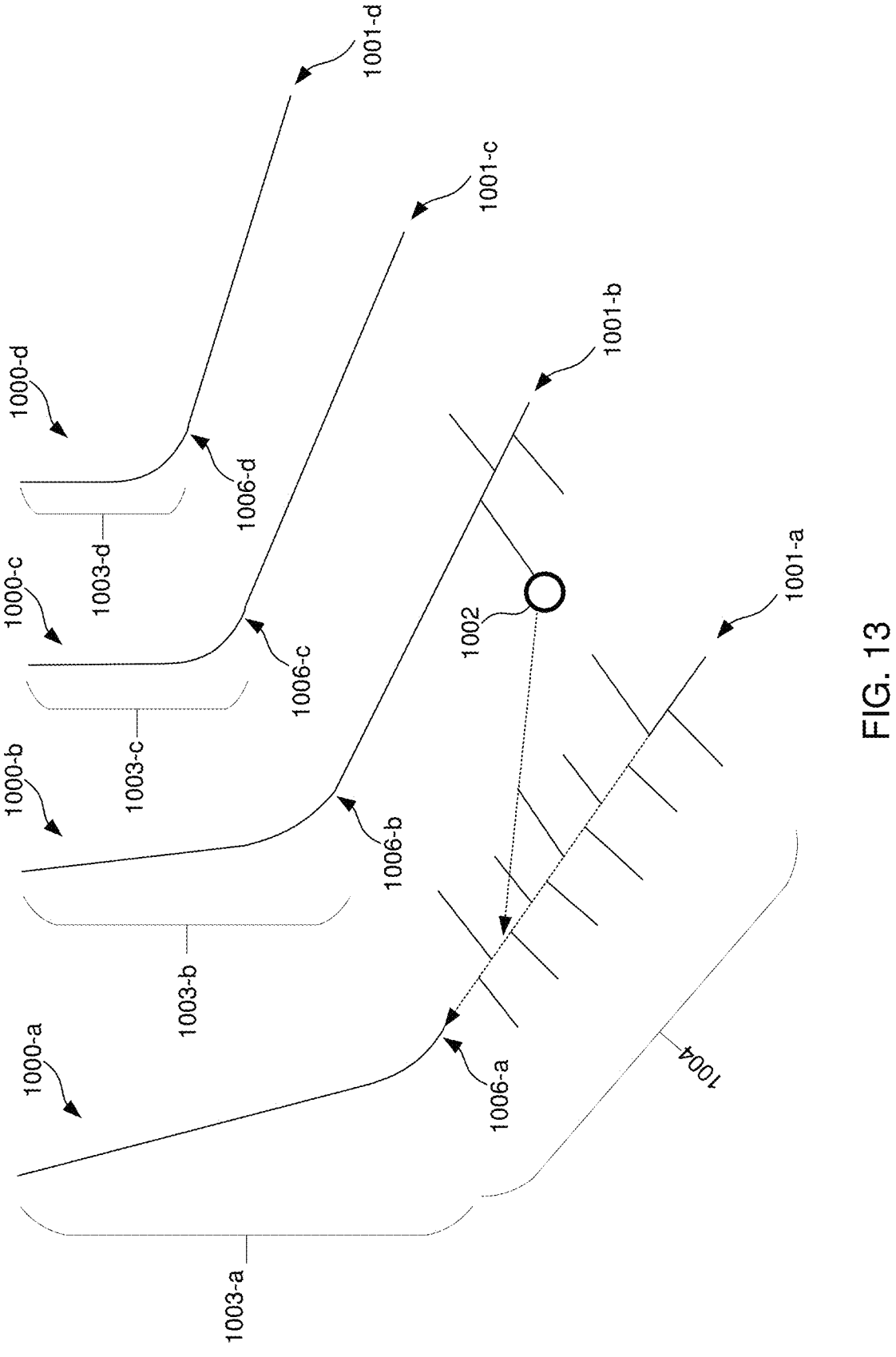
FIG. 13 illustrates an isometric view of the four offset wells in FIG. 10, in accordance with one or more implementations

FIGS. 7, 8, and 9 implement one or more aspects of the figures described herein, including at least FIG. 6. For instance, FIGS. 6-9 show example paths (i.e., path 617-*a*, path 617-*b*, path 617-*c*, and path 617-*d*) followed by the sound or vibrations from the event 602 to the heel 606-*a* of the first observation well 600-*a*. After arriving at the heel 606-*a* of the first observation well 600-*a*, the sound or vibration signals may follow the vertical wellbore (i.e., vertical region 603-*a* of the first observation well) and arrive at different times at the acoustic sensor of the wellhead. In particular, FIG. 6 shows sound or vibrations passing from the event 602 through fractures 616-*a* and 616-*b* of wells 600-*a* and 600-*b*, respectively, as well as a small portion of rock between those fractures. In some cases, the sound or vibrations may then travel through the horizontal region 604 of the well 600-*a* towards the heel 606-*a*. Because much of the path in FIG. 6 involves sound passing through fluids rather than solid rock, the path in FIG. 6 may be slower than the paths seen in FIGS. 7-9.

FIG. 7 shows a path slightly longer in distance than that in FIG. 6, but one where the sound or vibrations travel primarily through rock between the two wells 600-*a* and 600-*b* and then through the fluid in the well 600-*a* to the heel 606-*a*. As previously described, despite the longer distance traveled, the signal in FIG. 7 may arrive at the acoustic sensor before the signal in FIG. 6, since more of this path is through rock than the path seen in FIG. 6. FIGS. 8 and 9 show shorter paths than those seen in either of FIGS. 6 and 7. Further, the paths traveled by the sound or vibration from event 602 in FIGS. 8 and 9 may be primarily through rock. The combination of an overall shorter path length, as well as a greater path length through rock as compared to fluid, may enable the signals in FIGS. 8 and 9 to reach the acoustic sensor before the signals in FIGS. 6 and 7.

It should be noted that, the specifics of the FIGS. 6 through 9 are not as important as the fact that the acoustic or vibration sensor at the wellhead of the first well 600-*a* is likely to hear ringing, or multiple instances of the signal (or vibrations) associated with event 602, where each instance arrives at a different time. In some embodiments, this ringing may be correlated with ringing from previously-monitored events, such as one where fracture communication actually occurred. In this way, analyzing the ringing may allow a structure of the wells 600 and their fractures 616 to be assessed, assuming some knowledge about the rock formation. Alternatively, if some understanding of the wells 600 and fractures 616 is already known, an analysis of the ringing may help determine a structure of the rock formation. In some cases, deconvolution of the arriving signal may be used to separate each of the various signals following different paths and arriving from the event 602.

FIGS. 10-13 show a similar concept as FIGS. 6-9, but for an offset well event 1002 occurring within or near an end of a fracture 1016. As shown, FIGS. 10-13 illustrate an isometric view of four offset wells 1000 (e.g., offset wells 1000-*a*, 1000-*b*, 1000-*c*, and 1000-*d*), each including a vertical (e.g., vertical regions 1003-*a*, 1003-*b*, 1003-*c*, and 1003-*d*) and a horizontal region 1004 separated by a heel 1006 (e.g., heel 1006-*a*, 1006-*b*, 1006-*c*, 1006-*d*). The horizontal region 1004 of each offset well 1000 connects a respective heel 1006 to a toe 1001 (e.g., toe 1001-*a*, toe 1001-*b*, toe 1001-*c*, toe 1001-*d*). In this example, an event 1002 has occurred within or near an end of a fracture 1016, where the fracture 1016 located proximal to the toe 1001-*b* (as opposed to the heel 1006-*b*) of the second offset well 1000-*b*. In some cases, an acoustic or vibration sensor (not shown) may be coupled to a top or wellhead of the first offset well 1000-*a* (e.g., at a wellhead, circulating fluid line, or standpipe).

Additionally or alternatively, a vibration sensor (not shown) may be attached to a component (e.g., metal component, such as a pipe) of the wellhead. In such cases, vibrations felt through the metal component may also be measured and recorded. Similar to FIGS. 6-9, the acoustic or vibration sensor at the well head of the observation well (i.e., first offset well 1000-*a*) may hear ringing, or multiple instances of the signal or vibrations associated with event 1002, since each instance may arrive at a different time based on the amount of path length through rock, fluid, etc. Analysis of this ringing and time or frequency signatures obtained from the signal data may allow an earlier or more accurate fracture communication warning to be generated.

FIGS. 14-16 show different views of an exemplary spectral plot 1400 with four frequency spikes associated with a frac initiation in an observation well. This plot was created from actual acoustic sensor data taken over a period of time and then converted to a spectral plot via Fourier Transform. In this example, four frequencies dominate above the noise baseline and three of these spikes have relatively the same amplitude. In some cases, the amplitudes may correlate to a size of the fracture (e.g., diameter, length, or volume). Further, these four frequencies may correspond to a formation of a fracture during one stage of a multi-stage fracturing process. While not shown, other frequencies, or other combinations of frequencies may indicate other events, such as communication between wells, frac initiation at an offset well, pump deployment at an offset well, etc. Furthermore, although spectral plot 1400 shows spikes for an event in an observation well (i.e., the well being monitored), in other illustrations, such spikes may represent activities in an offset well. In such cases, the events or activities may be transmitted through intervening rock/soil between the observation and offset wells.

The spectral artifacts seen in FIGS. 14-16 are exemplary only but may be used to illustrate the analysis of any spectrum detected by the acoustic sensors. For instance, each of one or more spikes in a spectrum can be classified by intensity, amplitude, and/or stage relative perforation intensity (SRPI). There may be a separate classification for each spike, or an average of two or more spikes may be used in a classification. Each of one or more spikes may also be classified by the frac stage in which the spike occurred and/or a time that the spike occurred within a given frac stage. Each of one or more spikes may also be classified by a max or central frequency as well as a frequency width (i.e., the bandwidth). In some embodiments, the spectral plot showing the frequency spikes may be used to generate a frequency signature, where the frequency signature may be associated with the event or activity. In some cases, the frequency signature may be labeled by a trained model and used to further train the model to identify similar frequency signatures associated with future events. In some embodiments, the labeling can be manual, but the trained model can be used to identify potential fracture communication events during fracking and drilling operations. Changes in the spectrum over time may also be associated with a frequency signature (e.g., where a frequency peak shifts at a recognizable rate).

In some embodiments, analysis of acoustic data may involve consideration of at least one model pertaining to the interaction of fluids with subterranean rock. For instance, uncoupled models can be used in cases where the stress/displacement analysis of the reservoir rock assumes that the rock is elastic. The fracture aperture can be computed from the elastic constants of the rock, in-situ stresses, and pressure distribution inside the fracture. Calculation of the fluid loss to the formation can be based on Carter's 1D diffusion solution, which predicts an instantaneous leakage inversely proportional to the square root of the wetting time. There is no direct interaction between the diffusion and deformation processes, except for a leak-off term in the mass-conservation equations of the fluid-flow analysis inside the fracture. In another example, partially coupled models can be used where the stress/displacement analysis is still based on the assumptions of elasticity. The fluid loss is calculated exactly, within the framework of the linear diffusion law, by distributing fluid sources along the fracture. The effect of pore-pressure gradient (caused by leakoff) on rock deformation and therefore on fracture width may be accounted for with the concept of back stress. In yet another example, fully coupled models can be implemented that include the full range of coupled diffusion/deformation effects predicted by Biot's theory of poroelasticity: sensitivity of the volumetric response of the rock to the rate of loading, pore-pressure change induced by the variation of mean stress, and back-stress effects already accounted for in the partially coupled models. While the fully coupled model may be most useful in assessing potential communication between wells, in some circumstances, the fully coupled model may also assist in assessing fracture quality. In some aspects, fracture quality is inherently linked to the probability (or lack thereof) of fracture communication between wells. For instance, a first fracture in an observation well that has a high likelihood of experiencing a frac hit situation (e.g., a communication with a second fracture in an offset well), may be deemed to be lower in quality than a third fracture in the observation well that has a lower (or no) likelihood of experiencing a frac hit situation, assuming other characteristics or attributes of the first and third fracture are comparable.

In general, AI models aim to learn a function (f(X)) which provides the most precise correlation between input values (X) and output values (Y), such that Y=f(X). The artificial intelligence (AI) models described throughout this disclosure may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks.

In some embodiments, a plurality of distinct machine-learning algorithms may operate in parallel, which may serve to enhance the accuracy of predicting fracture communication between wells, or for preventing fracture communication between wells, further described below. In some aspects, the use of multiple machine-learning algorithms may also decrease false positive indications as compared to the use of a single machine learning algorithm. In some cases, a combination of three or four machine learning algorithms may operate in parallel, which may provide a balance of high accuracy versus system complexity. Some non-limiting examples of machine learning algorithms may include a neural network, a decision tree, a support vector machine, and Bayesian methods. In some cases, the model may be trained on first comparing a frequency spectrum with a previous fracture communication event. Further, the model may also suggest adjustment parameters that successfully averted a previously predicted frac communication.

This disclosure now turns to using the acquisition and analysis of high frequency acoustic or vibration data and converting it to the frequency domain to provide real-time prediction and prevention of fracture communication between wells. Whereas traditional subterranean analysis, such as microseismic monitoring, takes in massive amounts of data, and uses slow off-site computation in server farms, high frequency acoustic or vibration data can provide greater insights with less data processing by using one sensor per well. Further, since the processing requirements are significantly lower as compared to traditional techniques, feedback may be in real-time (or close to real time), and processing may be performed on less expensive, less computationally powerful, on-site computers. In some embodiments, a single acoustic or vibration sensor may also be used to provide both position and quality information about cracks. In some cases, one or more of the following parameters may be determined for a given crack or a set of cracks: (1) connection to the well; (2) connection to another crack; (3) diameter; (4) length; (5) whether the crack has been propped; (6) quality and/or volume of fluid flow within the crack; (7) number; (8) location and/or depth; (9) cross-section; and (10) volume.

In some cases, the acoustic/vibration signal data may comprise a plurality of frequency domain features, where the frequency domain features are indicative of the acoustic or vibration signal across a frequency spectrum. By comparing the plurality of frequency domain features with one or more known frac communication signatures, frac communication or a probability of frac communication occurring may also be obtained. As previously noted, a frequency domain representation of the time domain data may be using a Fourier Transform, for instance. In some embodiments, a Short Time Fourier Transform (STFT) technique, a Discrete Fourier Transform (DFT) technique, or a Fast Fourier Transform (FFT) algorithm may be used for the Fourier analysis.

Figure 17A:
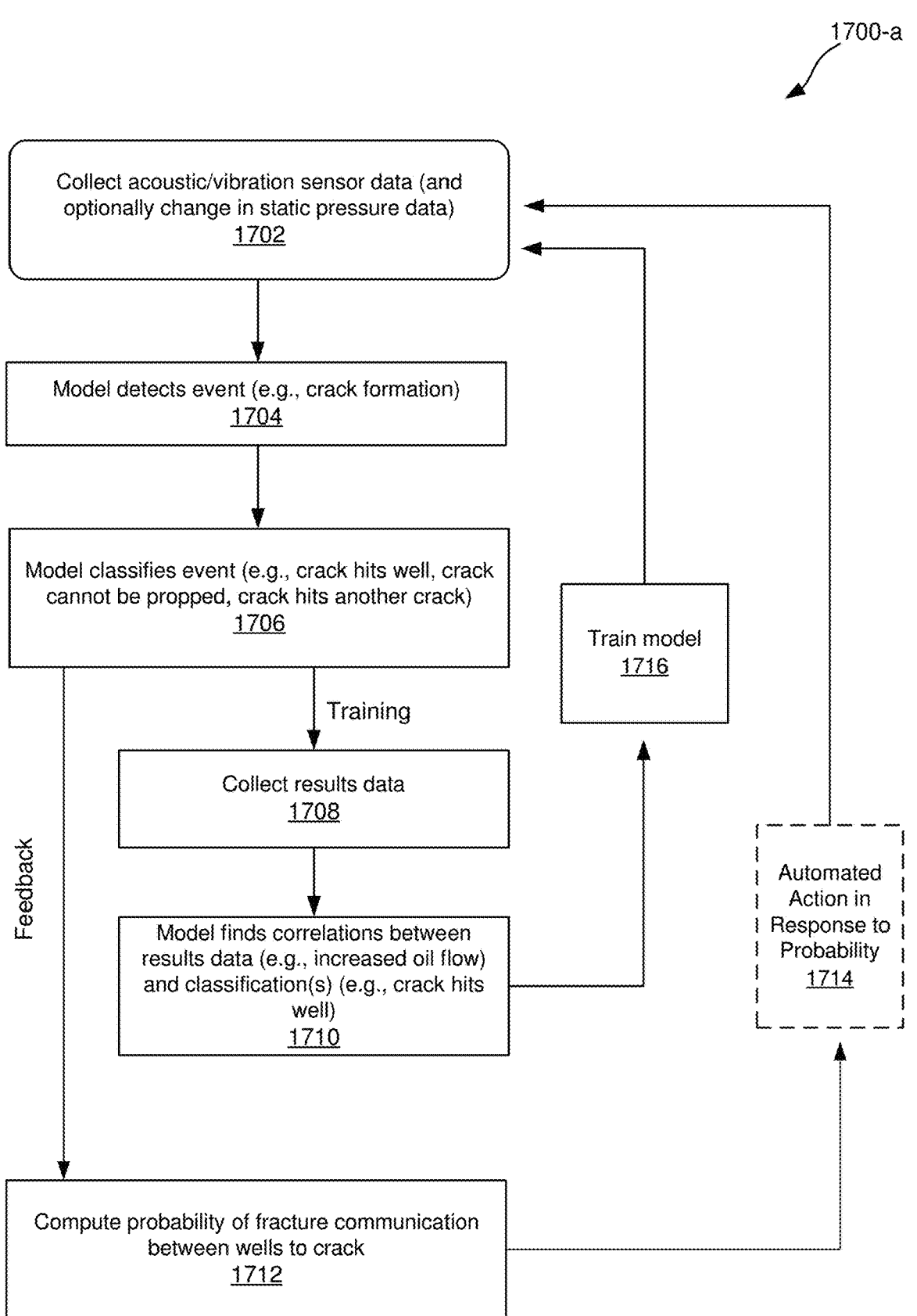
FIG. 17A shows an embodiment of a method for preventing fracture communication between wells, according to an embodiment of the disclosure.

FIGS. 17A and 17B illustrate methods 1700-*a* and 1700-*b*, respectively. The operations of methods 1700 presented below are intended to be illustrative only, and non-limiting. In some implementations, methods 1700-*a* and/or 1700-*b* may be accomplished with one or more additional operations not described, and/or without one or more of the operations discussed. Additionally, the order in which the operations of methods 1700-*a* and/or 1700-*b* are illustrated in FIGS. 17A and 17B and described below are not intended to be limiting.

In some implementations, methods 1700-*a* and/or 1700-*b* may be implemented in one or more processing devices (e.g., a digital processor, an analog processor, a digital circuit designed to process information, an analog circuit designed to process information, a state machine, and/or other mechanism for electronically processing information). The one or more processing devices may include one or more devices executing some or all of the operations of methods 1700-*a* and/or 1700-*b* in response to instructions stored electronically on an electronic storage medium. The one or more processing devices may include one or more devices configured through hardware, firmware, and/or software to be specifically designed for execution of one or more of the operations of methods 1700-*a* and/or 1700-*b*.

FIG. 17A illustrates a method 1700-*a* of training a model to predict fracture communication between wells. The method 1700-*a* will be described in association with components of the system 1800 shown in FIG. 18 and the system 1900 shown in FIG. 19. The method 1700-*a* can include collecting high frequency acoustic or vibration data at an acoustic sensor (Block 1702), for instance, via one or more acoustic or vibration sensors 1808 and/or 1913. Optionally, the method 1700-*a* may also involve monitoring and recording static pressure readings and/or changes in static pressure (Block 1702). In some embodiments, conversion to a frequency spectrum may be performed via an optional spectrum analyzer 1910 or other device for converting data from the time domain to the frequency domain (e.g., the optional acoustic/vibration data converting module 1814). In some cases, conversion may involve performing a FFT on the time domain data to generate frequency domain data. In some examples, the data from the acoustic or vibration sensor may be fed into a model for identifying spectral aspects of the data that may match (or resemble) known acoustic or vibration behavior of an event (Block 1704). For instance, the spectrum analyzer 1910 may pass frequency spectrum data to the machine learning component 1912 where the frac communication prediction module 1924 can, in concert with the model 1914, detect a frequency signature deserving further analysis. Additionally or alternatively, the data comparing module 1816 may also be used to perform this detection. For instance, background noise may be associated with a rounded peak around 1 kHz. In one non-limiting example, amplitude spikes observed at around 5 and/or 10 kHz may be identified as events for comparing to known signatures in the model. In other words, the model may been previously trained to recognize a spectral signal associated with certain fracking events or crack types or crack parameters. Besides analyzing and assessing frequency spectrum data, the model may optionally be used to analyze changes in static pressure taken by the acoustic or vibration sensor, or by a second sensor that tracks pressure rather than acoustic or vibration data.

In some examples, the model may then classify the fracking event (Block 1706), for instance, by matching the sensor data with one or more categories of events and/or geometries of the observation well, or an offset well. Classifying can be performed by calculating a stage relative perforation intensity (SRPI) for each event (e.g., frac initiation) and comparing each SRPI to a baseline SRPI for a stage of a well (either the observation well or an offset well). Classifying may also look at the spectral range of an event (i.e., where is the min and max frequency of a given frac initiation), and/or a central frequency of an event (e.g., the frequency having the highest amplitude or decibel level). Classifying may also look at the time in which an event occurred for a given stage of fracking. These are just a few ways that the model can classify an event based on spectral data from the acoustic sensor. For instance, the model and/or a label assignment module 1818 may match the acquired sensor data with a category of fractures that intersect the well versus horizontal shifting. In one example, a 5 kHz spike in the frequency domain may be associated with a formation of cracks that do not intersect the wellbore, while a 10 kHz spike may generally be associated with an intersection of a crack and the main well. In this case, the label assignment module 1818 may match the acquired sensor data with these known frequency spikes. Additionally, in some embodiments, there may be smaller additional frequency spikes that the model has associated with fluid flow dynamics such as laminar versus turbulent flows. Thus, the event data can be compared to known frequency spectrum signatures for various fracture events and other types of events to identify fractures that are relevant to cluster efficiency analysis. In some embodiments, existing categories or classifications may be stored in the model 1914.

As part of the feedback track of the method 1700-*a*, a probability of a fracture communication between an observation and an offset well may be computed (Block 1712). In some cases, if the estimated probability exceeds a threshold (e.g., 50% chance of a fracture communication occurring within an hour if no change in fracking operation parameters, or 100% chance of a fracture communication if fracking is not paused immediately), the method 1700-*a* may include automating fracking operations (e.g., increasing fluid pressure or increasing well spacing as two non-limiting examples) in response to the assigned probability (Block 1714 in dashed lines implies that it is optional). Further, the method 1700-*a* may include returning to Block 1702 for collection of more data. As another response, the method 1700 could provide a warning to an operator or prompt an operator to take remedial action.

After the model classifies events (Block 1706), the method 1700-*a* may also include collecting results data (i.e., as part of the model training track of the method 1700-*a*), where the results data may be associated with the event (Block 1708). It should be noted that, the training and feedback tracks may operate serially, or in parallel, based on use case. In some other cases, the training and feedback tracks may be alternatives. In some cases, results data may include any data type or information produced as a consequence of the event classified in Block 1706. For instance, results data could relate to increased oil flow in the well, during production, or following formation of one or more cracks during fracking. In some other cases, results data may relate to an initial increase in oil flow in the well, following frac initiation, and a significant decrease over time due to a frac hit situation, to name another non-limiting example. In some embodiments, results data may be obtained from external resources 1834 such as a flow meter measuring oil/gas volume during production. As another example, in FIG. 19, the controller 1918 or another sensor may provide oil and/or gas flow data to the frac communication prediction module 1924.

In such cases, the model (e.g., model 1914) may then analyze the data to determine correlations (if any) between the results data and the classified event data (Block 1710). In some instances, data from many stages and even many different wells, can be used in this correlation step. In some cases, the goal of correlation (Block 1710) is to identify stage intensity, temporal location in a stage, and/or a frequency range of an event that correlate to either a significant increase or decrease in production. For instance, certain spectral signals associated with a frac initiation may correlate with decreased production, and it could be inferred that this particular frac initiation led to communication between wells and thus a reduction in production. In some cases, the data comparing module 1816 and/or the frac communication prediction module 1924 may be configured to determine said correlations. In some cases, multiple sets of results data may be correlated to a single classified event. In some cases, these correlations may be used to train the model, following which the method 1700-*a* may restart. In some cases, one or more of the frac communication prediction module 1824, the frac communication prevention module 1831, and/or the model training module 1830 may be used to train the model 1914 (Block 1716). In some cases, the Blocks 1702, 1704, 1706, 1708, 1710, and/or 1716 can be repeated to continually train the model such that the model increasingly identifies spectral data that is associated with increased or decreased production outcomes. Operators could then use this correlation in future work to decrease the chances of communication or other events. While this exemplary method 1700-*a* discussed production data (i.e., as results data) in Block 1708, other results data could be used in the model relative to event data. For instance, drill bit degradation data, drill bit stalling data, excessive casing wear data, etc. could be used instead of production data to train different models to spectrally recognize certain causes of these outcomes.

In some cases, the method 1700-*a* may include determining that an original classification or labeling of a data signature is inaccurate. In some cases, this lack of correlation may also be used to train the model (alternate functionality of Block 1710). For instance, a frequency signature may appear similar to previous instances where fracture communication between wells actually occurred, but the model had either estimated the probability to be under a minimum threshold (e.g., <5%), or had not flagged it at all. However, the results data from this event may indicate a steady decline in oil flow until the fracture communication occurred, which may suggest that the fracture communication was imminent (Block 1710). In this example, this inaccurate classification may indicate that the model is focusing on improper aspects of the frequency spectrum while trying to predict fracture communication between wells. In some instances, this recognition may be used to train the model to focus on other aspects of the frequency signature. For example, the model may have initially focused on three frequency spikes to estimate a probability of fracture communication between wells. However, after erroneously not considering a fourth spike (e.g., a spike with the lowest amplitude in comparison to the other three) and classifying one or more cracks as "not problematic" even though it resulted in a drop in oil production, the model may proceed to focus on all four spikes in its analysis, regardless of their relative amplitude with respect to other identified spikes. Either way, one or more sets of data collected on an event, along with resulting classifications or labels, as well as correlations found, if any, based on results data, may be used alone or in any combination to train the model (Block 1716).

FIG. 17B illustrates a method 1700-*b* of using acoustic or vibrational data at a well to identify related events through a model analyzing a frequency spectrum of the acoustic or vibrational data. The method 1700-*b* can include installing an acoustic or vibrational sensor in direct communication with fluid in an observation well (1718). Alternatively, the sensor can be put in direct communication with fluid in a pumping truck or another fluid line of a fracking operation. In some embodiments, the acoustic or vibration sensor may be adapted for direct physical contact with fluid within a well (or alternatively, for direct physical contact with a component of the well such as a pipe). In some examples, the sensor may be a high frequency sensor, for instance, designed for >1000 sample/second rate. The method 1700-*b* can monitor the acoustic or vibrational signal via the sensor (Block 1720) and perform a fracking operation (e.g., drilling, perforating, pumping, plugging, etc.) on an offset well (Block 1724). Optionally, fracking operations may also be taking place on the observation well (Block 1722). The sensor can provide data that is converted from the time domain to the frequency domain through a Fourier Transform or another transform algorithm (e.g., as embodied in a spectrum analyzer) (Block 1726). The method 1700-*b* can then analyze the frequency spectrum of the transformed acoustic or vibrational data using a model to identify known activities such as pumping at an offset well, resonances within an underground chamber, frac initiation in the observation well, and potential communication between the observation and offset wells, to name a few non-limiting examples (Block 1728). In some cases, the analysis may label or categorize the data to further train the model (not shown).

Figure 18:
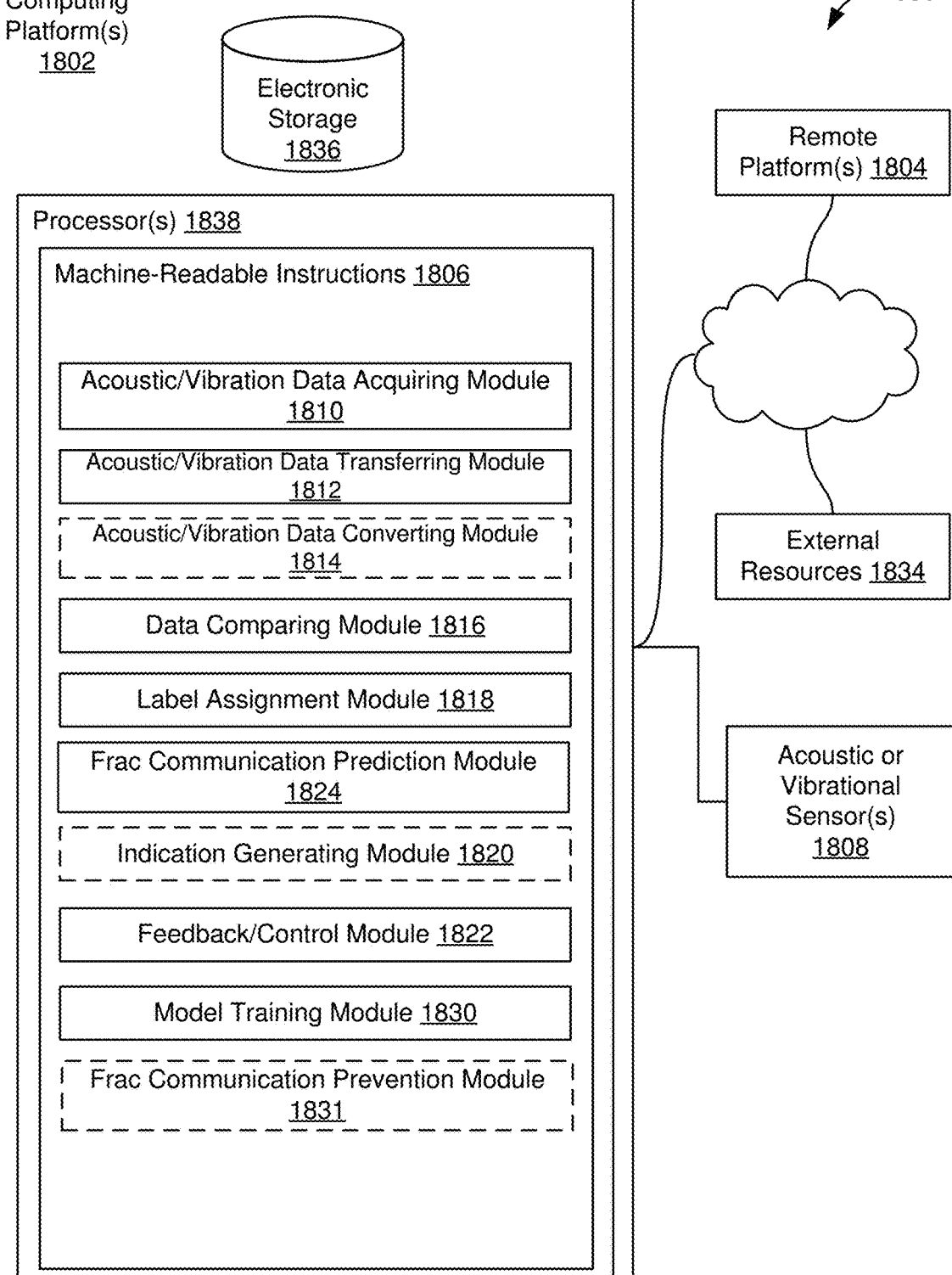
FIG. 18 illustrates a computing system configured for predicting and/or preventing fracture communication between wells in accordance with one or more implementations.

In FIG. 18, the order of the blocks within the machine-readable instructions 1806 is non-limiting. For instance, the model training module 1830 can operate to train the model either before, after, or in parallel to operation of frac communication prediction module 1824, indication generating module 1820, and/or feedback/control module 1822.

Figure 19:
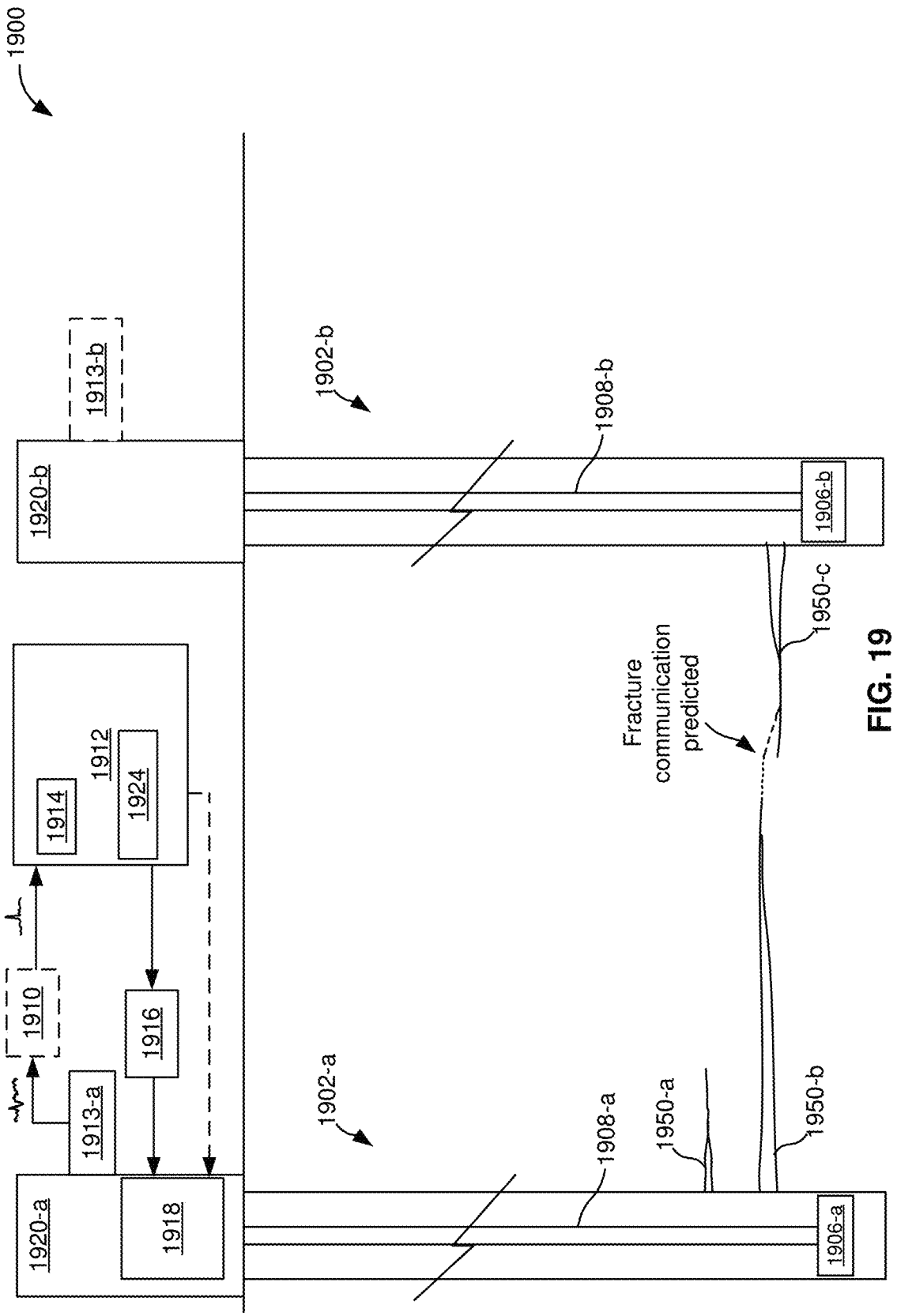
FIG. 19 illustrates an observation well including an acoustic or vibration sensor at the wellhead, the observation well adjacent an offset well being fracked, according to an embodiment of the disclosure.
Figure 21:
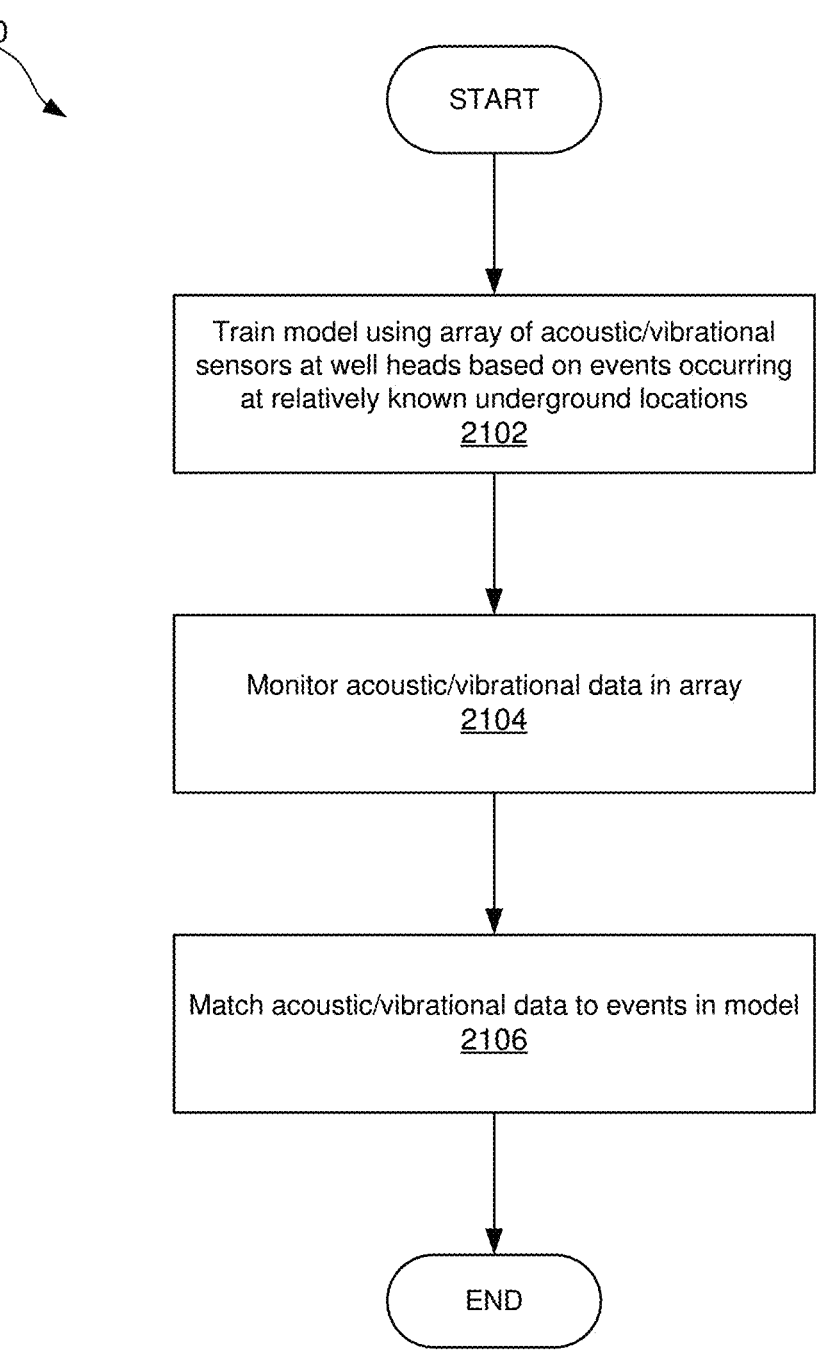
FIG. 21 shows an embodiment of a method for matching acoustic or vibrational data to events in a model, according to an alternate embodiment of the disclosure.

The following provides a more detailed description of the system 1800 shown in FIG. 18, where FIG. 18 illustrates a more detailed embodiment of some example components that may be used to carry out the methods shown in FIGS. 17A, 17B, 21, and/or to underly the components shown in FIG. 19. Specifically, FIG. 18 illustrates a system 1800 configured for using acoustic or vibrational data at a well to identify related events, such as a fracture communication with an adjacent or offset well, through a model analyzing a frequency spectrum of the acoustic or vibrational data, in accordance with one or more implementations. Optionally the system 1800 may also be configured for controlling fracking operations to prevent the fracture communication with the adjacent well, in accordance with one or more implementations. In some implementations, system 1800 may include one or more computing platforms 1802. Computing platform(s) 1802 may be configured to communicate with one or more remote platforms 1804 according to a client/server architecture, a peer-to-peer architecture, and/or other architectures. Remote platform(s) 1804 may be configured to communicate with other remote platforms via computing platform(s) 1802 and/or according to a client/server architecture, a peer-to-peer architecture, and/or other architectures. Users or operators may access system 1800 via remote platform(s) 1804.

Computing platform(s) 1802 may be configured by machine-readable instructions 1806. Machine-readable instructions 1806 may include one or more instruction modules. The instruction modules may include computer program modules. The instruction modules may include one or more of acoustic or vibration data acquiring module 1810, acoustic or vibration data transferring module 1812, acoustic or vibration data converting module 1814 (optional), data comparing module 1816, label assignment module 1818, frac communication prediction module 1824, indication generating module 1820 (optional), feedback/control module 1822, model training module 1830, and/or frac communication prevention module 1831 (optional), to name a few non-limiting examples.

Acoustic or vibration sensor(s) 1808, previously described above, may be in communication with the computing platform(s) 1802 and may be configured to provide raw data to the processor(s) 1838. In some embodiments, the acoustic or vibration sensor(s) 1808 may be adapted for direct physical contact with fluid within a well (or alternatively, for direct physical contact with a component of the well such as a pipe). In some examples, the sensor(s) 1808 may be high frequency sensors, for instance, designed for >1000 sample/second rate. In an embodiment, the acoustic or vibration sensor 1808 may include a piezoelectric material configured to generate a current or voltage proportional to an amplitude of vibration of the piezoelectric material. Some non-limiting examples of piezoelectric materials may include lead zirconate titanate (PZT), barium titanate, lead titanate, Rochelle salt, ammonium dihydrogen phosphate, lithium sulphate, quartz, topaz, zinc oxide, etc.

In some examples, acoustic or vibration data acquiring module 1810 may be configured to acquire acoustic or vibration data in a time domain from the sensor(s) 1808.

In some examples, acoustic vibration data transferring module 1812 may be configured to transfer the acoustic or vibration data to a data comparing module, for instance, when time series data is analyzed. Alternatively, the acoustic/vibration data transferring module may be configured to transfer the data to a spectrum analyzer (e.g., spectrum analyzer 1910) or any another device capable of transforming data from the time domain to the frequency domain. It should be noted that, the spectrum analyzer may or may not be part of the same computing platform that various other modules in FIG. 18 are a part of. For instance, the spectrum analyzer may be separate from a computing platform where comparisons of frequency signatures to the model occur.

In some embodiments, the computing system may comprise an optional acoustic or vibration data converting module 1814 configured to convert the acoustic or vibration data from the time domain to a frequency domain via the spectrum analyzer or another applicable device.

Data comparing module 1816 may be configured to compare the acoustic or vibration data in the frequency domain to a model trained on frequency signatures, where the frequency signatures correspond to known incidences of fracture communication between wells. By way of non-limiting example, the comparing may comprise considering a recorded/measured amplitude versus a baseline or steady state amplitude, and/or evaluating a variation in frequency components of the acoustic or vibration data. In another non-limiting example, the comparing may consideration of a number of frequency spikes, a width of the frequency spikes, and/or an amplitude of the frequency spikes pertaining to the frequency signatures, among other aspects of the frequency spectrum. In other words, under normal operation, the acoustic or vibration data may have a consistent set of one or more frequency components in the spectral regime. However, when fractures between adjacent wells start getting closer to each other, the one or more frequency components may change or increase in number, which may be indicative of an increased likelihood of a fracture communication. Increased amplitude, rate of amplitude spikes, or variation in amplitudes over time in the time domain may also be analyzed in the comparing. In some other examples, training the model may include building one or more fracture communication curves. For instance, the fracture communication curve may comprise a fracking operation parameter on the X axis and a corresponding probability on the Y axis, and multiple fracture communication curves may be charted for different distances of fractures from a first well with fractures from a second well. In some other cases, the fracture communication curve may be a 3D curve with different fracking operation parameters on the X and Y axis (or alternatively the Y axis may be associated with a distance between fractures of adjacent wells), and a corresponding probability on the Z axis. In some cases, the machine-learning system (shown as machine-learning system 1912 in FIG. 19) may be configured to analyze current frequency components of the electrical signal in a window of time and to identify impending fracture communication between the well and an offset well, the machine-learning system having been trained on previous frequency components of electrical signals measured during previous instances of fracture communication between wells. In some cases, the machine-learning system may comprise the data comparing module 1816, or alternatively, may be configured to work in conjunction with the data comparing module 1816. In some other embodiments, the data comparing module 1816 may be configured to compare the acoustic or vibration data in the frequency domain to a model trained on frequency signatures, where the frequency signatures correspond to known crack types or qualities (e.g., connected to well, able to be propped, etc.). In some examples, the model may be trained to recognize frequency signatures corresponding to certain fracking fluid flow patterns, which may also be used to predict fracture communication.

Label assignment module 1818 may be configured to assign one of a plurality of labels to the acoustic or vibration data in the frequency domain based on the comparing. By way of non-limiting example, the plurality of labels may include: an impending fracture communication, a frac hit or fracture communication, to name two non-limiting examples. In some other cases, the label may include: connected to the well, connected to the well and/or an adjacent well, connected to another crack of the well, connected to another crack of an adjacent well, etc. In some cases, the plurality of labels may be associated with binary values (i.e., 1 or 0, True or False, Yes or No), for instance, an impending fracture communication, or a fracture communication. In some cases, for instance, if the impending fracture communication label is assigned, an indication generating module 1920 may be configured to generate and display a first indication on an operator display suggesting a reduction in fracking fluid pressure, reduction in proppant pressure, or even temporarily pausing fracking operations for the stage. Additionally, if a frac hit label is assigned, the indication generating module 1920 may be configured to generate and display a second indication on an operator display, wherein the second indication may suggest immediately halting all fracking operations in the stage.

Frac communication prediction module 1824 may be configured to predict fracture communication between wells. In some cases, the frac communication prediction module 1824 may be used in conjunction with or as an alternative to one or more of the data comparing module 1816 and the label assignment module 1818. For instance, the frac communication prediction module 1824 may be used to identify impending fracture communication between the well and an offset well where the current frequency components show sufficient similarity to previous frequency components measured during previous instances of fracture communication between wells. In some cases, the frac communication prediction module 1824 may be configured to identify the impending fracture communication via analysis of the electrical signal in the frequency domain. In some cases, the frac communication prediction module 1824 identifies the impending fracture communication by an increase in a number or decrease in bandwidth of frequency peaks in the current frequency components and/or an increase in amplitude of the current frequency components.

Indication generating module 1820 may be configured to send an indication of a frac hit prediction with an adjacent or offset well to the operator display (e.g., operator display 1916), thereby helping the operator prevent the potential fracture communication. In some other cases, the indication generating module 1820 may be configured to send an indication of an actual frac hit to the operator display. The indication generating module 1820 is optional since an automated process of preventing the fracture communication may alternatively be used to vary fracking operation parameters without sending an indication to the operator display. Alternatively, even where automated adjustments are made, a notification of the impending fracture communication may be returned to an operator of the well, along with what adjustments are being made.

In some cases, feedback/control module 1822 may be configured to instruct a controller (e.g., controller 1918) to make adjustments to current or future fracking operations, for instance, in response to receiving the prediction for the fracture communication. In one example, a frac communication prediction module 1824 (also shown as frac communication prediction module 1924 in FIG. 19) may determine that the current frequency components closely match a grouping of previous frequency components measured during previous fracking operations where a communication event occurred, suggesting an impending fracture communication. In this case, the feedback/control module 1822 may instruct the controller to change fracking fluid pressure, or another parameter until the impending fracture communication label is no longer assigned.

In some embodiments, model training module 1830 may be configured to train the model (also shown as model 1914 in FIG. 19) for recognizing acoustic or vibration data in the frequency domain using one or more of the plurality of labels or classifications. In some other cases, the model training module 1830 may be configured to train the model for recognizing acoustic or vibration signatures in the time domain, or in both the time and the frequency domain.

In some cases, optional frac communication prevention module 1831 may be used in conjunction with or as an alternative to the feedback/control module 1822. The frac communication prevention module 1831 may also be configured to instruct a controller (e.g., controller 1918) to make adjustments to current or future fracking operations, for instance, in response to receiving the prediction for the fracture communication.

In some implementations, computing platform(s) 1802, remote platform(s) 1804, and/or external resources 1834 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 1802, remote platform(s) 1804, and/or external resources 1834 may be operatively linked via some other communication media.

A given remote platform 1804 may include one or more processors configured to execute computer program modules. The computer program modules may be configured to enable an operator or user associated with the given remote platform 1804 to interface with system 1800 and/or external resources 1834, and/or provide other functionality attributed herein to remote platform(s) 1804. By way of non-limiting examples, a given remote platform 1804 and/or a given computing platform 1802 may include one or more of a server, a desktop computer, a laptop computer, a handheld computer, a tablet computing platform, a NetBook, a Smartphone, a gaming console, and/or other computing platforms.

External resources 1834 may include sources of information outside of system 1800, external entities participating with system 1800, and/or other resources. For instance, external data may be fed into the model to help with initial training. In some implementations, some or all of the functionality attributed herein to external resources 1834 may be provided by resources included in system 1800. One non-limiting example of an external resource is results data, such as oil/gas flow volume that may be measured by one or more sensors other than the acoustic or vibration sensor 1913.

Computing platform(s) 1802 may include electronic storage 1836, one or more processors 1838, and/or other components. Computing platform(s) 1802 may include communication lines, or ports to enable the exchange of information with a network and/or other computing platforms. Illustration of computing platform(s) 1802 in FIG. 18 is not intended to be limiting. Computing platform(s) 1802 may include a plurality of hardware, software, and/or firmware components operating together to provide the functionality attributed herein to computing platform(s) 1802. For example, computing platform(s) 1802 may be implemented by a cloud of computing platforms operating together as computing platform(s) 1802. In an embodiment, the computing platform 1802 including the processor(s) 1838 may reside on the premises of the fracking operation, for instance, on the same pad as the well(s) being monitored/controlled.

Electronic storage 1836 may comprise non-transitory storage media that electronically stores information. The electronic storage media of electronic storage 1836 may include one or both of system storage that is provided integrally (i.e., substantially non-removable) with computing platform(s) 1802 and/or removable storage that is removably connectable to computing platform(s) 1802 via, for example, a port (e.g., a USB port, a firewire port, etc.) or a drive (e.g., a disk drive, etc.). Electronic storage 1836 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1836 may include one or more virtual storage resources (e.g., cloud storage, a virtual private network, and/or other virtual storage resources). Electronic storage 1836 may store software algorithms, information determined by processor(s) 1838, information received from computing platform(s) 1802, information received from remote platform(s) 1804, and/or other information that enables computing platform(s) 1802 to function as described herein.

Processor(s) 1838 may be configured to provide information processing capabilities in computing platform(s) 1802. As such, processor(s) 1838 may include one or more of a digital processor, an analog processor, a digital circuit designed to process information, an analog circuit designed to process information, a state machine, and/or other mechanisms for electronically processing information. Although processor(s) 1838 is shown in FIG. 18 as a single entity, this is for illustrative purposes only. In some implementations, processor(s) 1838 may include a plurality of processing units. These processing units may be physically located within the same device, or processor(s) 1838 may represent processing functionality of a plurality of devices operating in coordination. Processor(s) 1838 may be configured to execute modules 1810, 1812, 1814, 1816, 1818, 1824, 1820, 1822, 1830, 1831, and/or other modules. Processor(s) 1838 may be configured to execute modules 1810, 1812, 1814, 1816, 1818, 1824, 1820, 1822, 1830, 1831, and/or other modules by software; hardware; firmware; some combination of software, hardware, and/or firmware; and/or other mechanisms for configuring processing capabilities on processor(s) 1838. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1810, 1812, 1814, 1816, 1818, 1824, 1820, 1822, 1830, and/or 1831 are illustrated in FIG. 18 as being implemented within a single processing unit, in implementations in which processor(s) 1838 includes multiple processing units, one or more of modules 1810, 1812, 1814, 1816, 1818, 1824, 1820, 1822, 1831, and/or 1830 may be implemented remotely from the other modules. The description of the functionality provided by the different modules 1810, 1812, 1814, 1816, 1818, 1824, 1820, 1822, 1831, and/or 1830 described herein is for illustrative purposes, and is not intended to be limiting, as any of modules 1810, 1812, 1814, 1816, 1818, 1824, 1820, 1822, 1831, and/or 1830 may provide more or less functionality than is described. For example, one or more of modules 1810, 1812, 1814, 1816, 1818, 1824, 1820, 1822, 1831, and/or 1830 may be eliminated, and some or all of its functionality may be provided by other ones of modules 1810, 1812, 1814, 1816, 1818, 1824, 1820, 1822, 1831, and/or 1830. As another example, processor(s) 1838 may be configured to execute one or more additional modules that may perform some or all of the functionality attributed below to one of modules 1810, 1812, 1814, 1816, 1818, 1824, 1820, 1822, 1831, and/or 1830.

FIG. 19 illustrates a drilling system 1900 comprising a first well 1902-*a* (i.e., a current or observation well) and a second well 1902-*b* (i.e., an adjacent or offset well). In some examples, the first and second wells 1902 may each comprise a wellhead 1920 (e.g., wellhead 1920-*a*, wellhead 1920-*b*), or alternatively, a circulating fluid line or standpipe. In some cases, an acoustic or vibration sensor 1913-*a* at the wellhead 1920-*a* may be in direct physical contact with fluid in the well 1902-*a*. Optionally, well 1902-*b* may also comprise an acoustic or vibration sensor 1913-*b* at the wellhead 1920-*b*. In some cases, the drilling system 1900 may further comprise plugs 1906-*a* and 1906-*b* coupled to wirelines 1908-*a* and 1908-*b*, respectively, where the plugs 1906 are deployed between stages in the respective wells 1902. The wirelines 1908 may be used to control the ascent/descent of the plugs within the borehole. Although the plugs 1906 are illustrated in a vertical section of the wells, it should be noted that, in other embodiments, one or more of the plugs 1906 may be located in a horizontal or roughly horizontal section of the wells 1902 (e.g., horizontal region 604 in FIG. 6).

In some cases, one or more cracks having varying characteristics may be created due to pumping of fracking fluids down one or both wells 1902-*a*, 1902-*b*. For instance, and as illustrated in FIG. 19, a number of cracks may be created, including a crack 1950-*a* that intersects the well 1902-*a* but is a distance away from the cracks of the adjacent well 1902-*b*, another crack 1950-*b* that intersects the well 1902-*a*, and one or more cracks 1950-*c* that intersect the well 1902-*b*. As illustrated, the crack 1950-*b* and cracks 1950-*c* are approaching each other and could lead to communication if operations continue without change.

In some embodiments, the acoustic or vibration sensor 1913-*a* may provide raw data (e.g., in a time domain) to an optional converter 1910 arranged on-site (or optionally at a location remote from the well pad). A spectrum analyzer is one non-limiting example of the converter 1910. In some embodiments, the converter 1910 may be configured to convert the raw time series data to a frequency domain. A machine learning system 1912, including a model 1914, and a frac communication prediction module 1924, may be configured to search for and identify frequency signatures in the frequency domain of the data. In some embodiments, the model 1914 may be stored in electronic storage such as electronic storage 1836. In some cases, the machine learning system 1912 may be configured to search for and identify time signatures in the raw data, without the use of the converter 1910. In some circumstances, even though conversion from time domain to frequency domain may not be performed for analysis or training the model, conversion may be performed prior to display on the operator's computer, since potential communication may be more visible to a human in the frequency domain (e.g., FIGS. 14-16). In some cases, the conversion and analysis component may be further configured to monitor changes in the signal from one well to the other (e.g., where one of the two wells is approaching a communication or frac hit situation, as further described below).

In some cases, the identified frequency signatures may be associated with known frequency signatures for different fracking events and parameters, including, but not limited to, offset well communication or fracture communication events. For instance, water and proppant passing through smaller cracks, such as crack 1950-*a*, with little risk of a frac hit, may generate different frequency signatures than crack 1950-*b*. In some cases, the acoustic vibrations picked up by the acoustic or vibration sensor 1913-*a* may be caused by injecting fracking fluid through perforations in a casing of the well 1902-*a* under pressure in order to form subsurface fractures, the fracking fluid's flow through subsurface fractures, expansion of subsurface fractures, or a pumping truck at the offset well (e.g., well 1902-*b*). As shown, a potential frac hit situation between the wells 1902-*a* and 1902-*b* has been identified by the machine-learning system 1912 and/or the frac communication prediction module 1924. Specifically, the machine-learning system 1912 and/or the frac communication prediction module 1924 has predicted that crack 1950-*b* has a high likelihood of being in hydraulic communication with the crack 1950-*c*, for instance, if no modifications are made to current fracking parameters. In some cases, the prediction may be based on analyzing current frequency components of the electrical signal received from the acoustic sensor, where the current frequency components show sufficient similarity to previous frequency components measured during previous instances of fracture communication between wells. For instance, it has been shown that fracture communication is preceded by unique acoustic signatures, even though two fractures have yet to meet, and that actual communication can be identified almost immediately due to a sudden change in the spectral signature. Additionally or alternatively, the machine-learning system 1912 identifies the impending fracture communication by an increase in a number of frequency peaks or decrease in bandwidth of frequency peaks in the current frequency components, an increase in amplitude of the current frequency components, or a combination of the above.

In some cases, the machine-learning system 1912 is trained on the previous frequency components of electrical signals measured during previous instances of fracture communication between wells as machine-learning inputs and associated fracture communication as a machine-learning output. In some other cases, the machine-learning system 1912 is trained on previous pressure data measured during previous instances of fracture communication between wells. Further, the machine-learning system 1912 may be configured to analyze the current frequency components based on a grouping of previous frequency components measured during previous fracking and drilling operations that most closely match the current frequency components. In some cases, the analyzing may further comprise: analyzing the electrical signal for the window of time in the time domain and using it in addition to the analyzing the current frequency components to identify the impending fracture communication. Optionally, the drilling system 1900 may further comprise a pressure sensor configured to measure a pressure in the fracking fluid. In such cases, the machine-learning system 1912 may be further configured to analyze the pressure in combination with the current frequency components.

Figure 20:
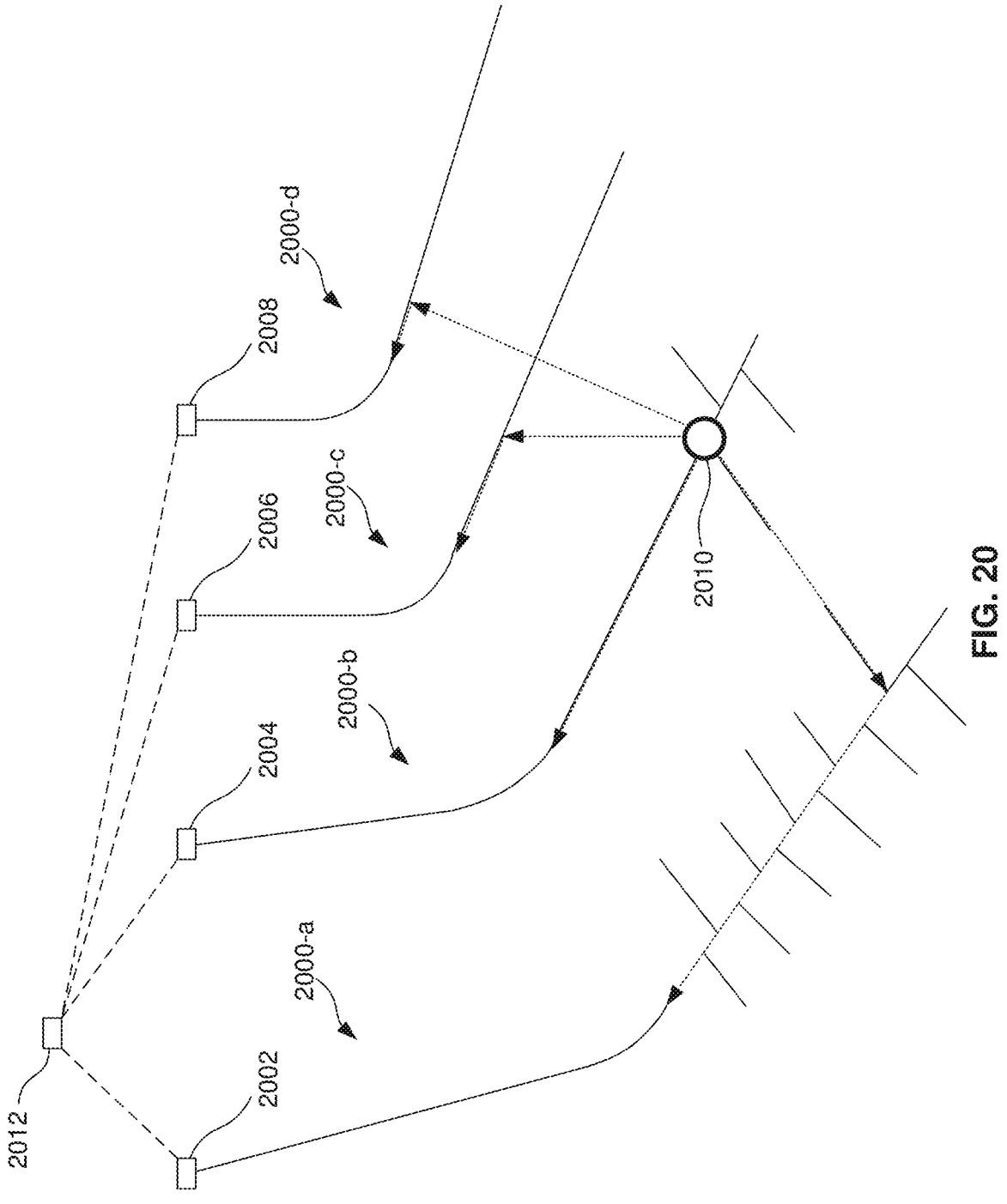
FIG. 20 illustrates an isometric view of four offset wells, each including an acoustic or vibrational sensor at their respective wellheads, according to an alternate embodiment of the disclosure.

In some embodiments, the frac prediction may be passed to an operator's computer and display 1916 to enable the operator to make manual adjustments to well operations via the controller 1918. Additionally or alternatively, the machine learning system 1912 may be configured to automatically adjust fracking operations through the controller 1918. Regardless of manual or automated control, the controller 1918 may be instructed to utilize different pressures on different stages, or different stage durations, and adjust pressure or duration for future stages based on the frac prediction returned from these previous stages. In other words, one or more pressure or duration adjustments may be made for future stages based on settings from previous stages that successfully prevented a predicted frac communication. In some embodiments, adjusting fracking operations may involve adjusting one or more downhole parameters through the controller 1918 (if automatic control is enabled), or providing one or more suggestions to the operator (if manual control). Some non-limiting examples of downhole parameters may relate to frac stage time, timing of proppant release, controlling perf gun firing (e.g., power), start and end of pumping down perf gun(s), start and end of pumping down plugs, pressurizing frack fluid to initiate creation of fractures, perf gun pressure level, pH of fluids forced into the formation, and well spacing, etc. Furthermore, although frac communication prediction may be assigned based on data from an observation well (i.e., the sensor is coupled to the well, such as well 1902-*a*, that is performing the fracking operation), the prediction may also be assigned based on data from an offset well (e.g., well 1902-*b*), or from a combination of the observation well and an offset well. Lastly, it should be noted that, in addition to being based on high frequency acoustic or vibration data, frac communication prediction may also be based on data acquired from traditional pressure sensors (e.g., absolute or relative pressure sensors) affixed to the observation well. In some embodiments, the operator computer 1916 may comprise a visual display, such as an LCD screen, a LED screen, a plasma screen, to name a few non-limiting examples FIG. 20 illustrates an isometric view of four offset wells 2000 (e.g., offset wells 2000-*a*, 2000-*b*, 2000-*c*, and 2000-*d*), each including a vertical and a horizontal region separated by a heel, similar in line to the offset wells 600 previously described in relation to FIG. 6. In some embodiments, an array of acoustic or vibrational sensors 2002, 2004, 2006, 2008 may be coupled to a top or wellhead of the plurality of wells 2000. In some cases, the acoustic or vibration sensors 2002, 2004, 2006, and 2008 may be coupled to a circulating fluid line or standpipe of the wells. Further, these sensors 2002, 2004, 2006, 2008 may be in direct physical contact with fluid in the wells. In this example, the offset wells 2000 may be close enough to each other that an event 2010, such as a fracture initiation, in one well (e.g., well 2000-*b*) can be acoustically or vibrationally detected at the acoustic sensors 2002, 2006 coupled to two adjacent or offset wells (e.g., wells 200-*a* and 2000-*c*). In some circumstances, if energy travels far enough, then sensors at non-adjacent wells may also be able to add data to the array (e.g., sensor 2008). In some cases, the pressure or sound measured by the acoustic sensors may be recorded in a digital format as a time series or in the time domain, also referred to as a trace, over a given time period. Further, the data recorded by the one or more sensors (e.g., sensors 2002, 2004, 2006, and optionally 2008) may be relayed to the spectrum analyzer 2012. In some aspects, this array comprising the sensors 2002, 2004, 2006, and 2008 may be thought of as a micro-seismic distributed acoustic sensor array that can triangulate spectrally-identified signals (e.g., signals 2014-*a*, 2014-*b*, 2014-*c*, 2014-*d*) and facilitate understanding of underground structures such as bore holes, fractures, stages of a well, and active communication (or imminent communication) between adjacent wells. Such triangulation may also provide insights into rock and soil structure near and around the wells.

In some embodiments, the acoustic or vibrational sensors 2002, 2004, 2006, 2008 may be designed for high-frequency applications, and may utilize fast sample rates (e.g., >100 second/second, >1000 samples/second, etc.). Further, the acoustic or vibrational sensors 2002, 2004, 2006, and 2008 may be connected in a network (e.g., a LAN) and may be configured to operate in phase via synchronized and highly accurate clocks (e.g., clocks in sync with GPS). The array of acoustic sensors 2002, 2004, 2006, 2008 may be configured to look for similar pressure or vibration signals (e.g., signals 2014-*a*, 2014-*b*, 2014-*c*, 2014-*d*) arriving at slightly different times. Further, from the timing differences between arrival of the waves or signals 2014 at each sensor in the array, the spectrum analyzer 2012 can infer a location of the fracture event 2010 or other events causing acoustic waves beneath the array of acoustic sensors 2002, 2004, 2006, 2008. The timing differences may also be used to infer types of materials and structures through which the waves passed to reach the acoustic sensors 2002, 2004, 2006, 2008. For instance, since pressure or sound tends to move more quickly through dense rock than through fluids in a fracture or in a well, event 2010 may be detected multiple times at the one or more acoustic sensors, as described in more detail above in relation to FIGS. 6-13.

While traditional arrays rely on a large number of sensors spaced over a large area to produce an accurate 3D map of underground events, aspects of this disclosure allow a single sensor (i.e., at each well) to be used to monitor event 2010. For instance, in some circumstances, acoustic or vibrational energy from the event 2010 may be distributed omnidirectionally. Further, this energy may reach each well 2000 at different points (in theory at an infinite number of different points along each well 2000) and at different times, following which the multitude of signals may travel up the wells 2000 to the respective sensors 2002, 2004, 2006, and/or 2008. In some embodiments, deconvolution of the arriving signals can effectively allow a single sensor to monitor the energy arriving from event 2010 at many, if not an infinite, number of points along a well's underground path. Consequently, each sensor 2002, 2004, 2006, 2008 may operate as its own sensor array with an effective distribution following a path of a respective well 2000. In other words, such a system may allow a single sensor to provide as much data as a slew of sensors in the art. Further, while traditional sensors are often spaced across the surface, and many of the sensors are far from an underground event, since the disclosed sensors operate as arrays that span an underground path of each well, the effective array is much closer to the event 2010 than a traditional surface-based array.

In some cases, this array of data collected by sensors 2002, 2004, 2006, and/or 2008 may then be used for triangulation, which may serve to provide a 3D model of underground activity with far fewer sensors distributed across a smaller portion of land than required by traditional micro-seismic arrays. Further, because the effective arrays are underground and surround the event 2010, the disclosed arrays may provide a greater degree of accuracy than that provided by traditional surface-based arrays. In one embodiment (see FIG. 22), even a single sensor on a single well may be used to provide some level of 3D mapping since every point along the length of the well may be used as a sensor using the deconvolution methods described herein.

While the illustrated embodiment shows four sensors in a line and four wells having relatively the same shapes, these details are in no way limiting. For instance, the wells being monitored may have any number of shapes and arrangements, leading to any number of different array shapes and numbers of acoustic sensors. In some cases, each well 2000 may include multiple well heads (e.g., one for completion, one for maintenance, and one for production), and each of these well heads could include an acoustic sensor. In other words, there can be two or more acoustic sensors for each well 2000, in some embodiments.

To improve the accuracy of such an array, FIG. 21 illustrates a method 2100 directed to matching acoustic or vibration data to events in a model. In some cases, the model may be similar or substantially similar to the model 1914 previously described in relation to FIG. 19. In some cases, the model can be built and trained (Block 2102) based on known phenomena at known locations and/or with known rock forms and compositions. For instance, operators may have a general sense of a plug's location in a well (i.e., since a tool used to place a plug has a known length). By analyzing the time and/or frequency domain spectrums from multiple acoustic sensors (e.g., acoustic sensors 2002, 2004, 2006, and/or 2008 in FIG. 20) for activity associated with placement of a plug, the model may also be trained to recognize other activities that occur at or near the plug. For instance, once trained based on the plug activity having a relatively known location, the plug may be removed or drilled through, such that the model may be able to identify fracture initiation, from an offset well, near the former plug's location via communication or poroeleastic interactions. As another example, a traditional microseismic array may be used to map fracture events for a well, while at the same time, the array of sensors discussed in FIG. 20 may be used to create a similar frac map or 3D map. In some embodiments, the model may be trained based on a comparison between the two maps, which may allow the model to generate more accurate 3D maps, especially in situations where it may not be feasible to employ a traditional microseismic array.

To build and implement the model, acoustic or vibrational data can be monitored using an array of the herein disclosed sensors (Block 2104). As noted above, this array of sensors may be similar or substantially similar to the array comprising sensors 2002, 2004, 2006, and 2008 described in relation to FIG. 20. In some cases, the method 2100 may further comprise analyzed the data and matching it to spectral signatures of events in the model (Block 2106). In some embodiments, these matches can be used to further train the model.

Figure 22:
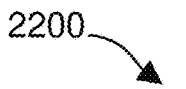
FIG. 22 illustrates an acoustic or vibration sensor coupled to an observation well adjacent an offset well being fracked, according to an alternate embodiment of the disclosure.
Figure 22:
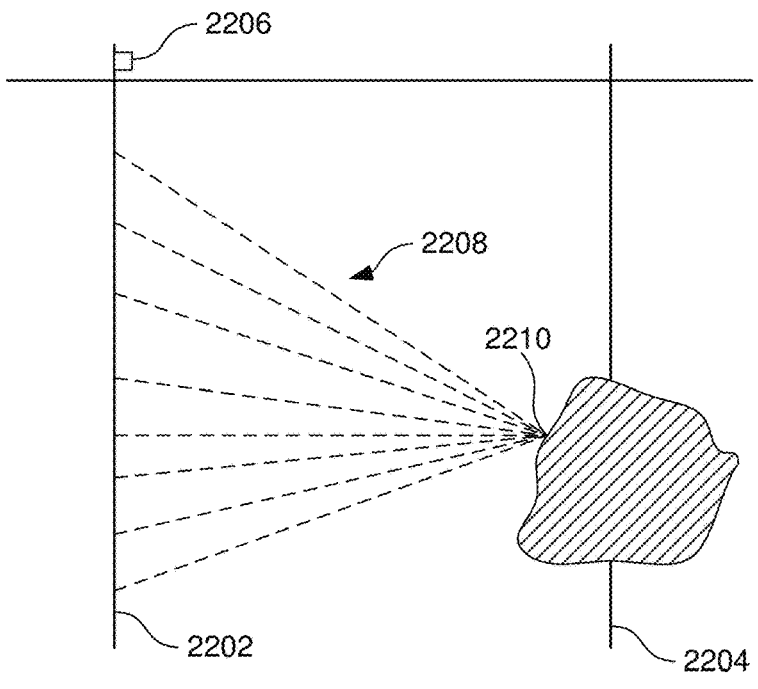

FIG. 22 illustrates a sensor system 2200 comprising a single-sensor 2206. In some cases, the sensor 2006 may be an acoustic or vibration sensor, or alternatively, a pressure sensor. The sensor 2006 may be coupled to a top or wellhead of a well 2202 (e.g., a wellhead, circulating fluid line, or standpipe). In this case, the well 2202 may be referred to as the observation well. Traditionally, a set of geophones (not shown) may be arranged at different locations within a single observation well for detecting signals emanating from a nearby fracture event. Further, the set of geophones may be configured to use the timing differences between received signals to create a 3D map of an offset well fracture system. In the herein-disclosed embodiment, the acoustic or vibrational sensor 2206 can be coupled to the observation well 2202, where the observation well 2202 is adjacent an offset well 2204 being fracked. As depicted, a frac event 2210 (similar to event 2010 in FIG. may generate an omnidirectional distribution of energy waves 2208 that impact the observation well 2202 at different locations and possibly at different times (i.e., due to different path length traveled and/or because the waves 2208 pass through material of varying density, composition, etc.). In some cases, these signals (i.e., waves 2208) then travel up the observation well 2202 to the acoustic or vibrational sensor 2206, where they are detected and recorded as a time series data. Further, deconvolution may be used to separate out the various signals 2208 arriving at different locations along the well's 2202 path. Effectively, this enables using a single sensor 2206 as an array of sensors along the path of the observation well 2202, which may serve to reduce costs and/or complexity as compared to currently used techniques.

Enhanced Acoustic or Vibrational Sources

The following embodiments describe systems, methods, and apparatuses for enhancing the signal-to-noise ratio (SNR) of acoustic and vibrational signals described above. In some embodiments, an acoustic transmitter can be added to one or more offset well heads being monitored, which may serve to enhance the SNR of the measured acoustic and/or vibrational signals.

Figure 23:
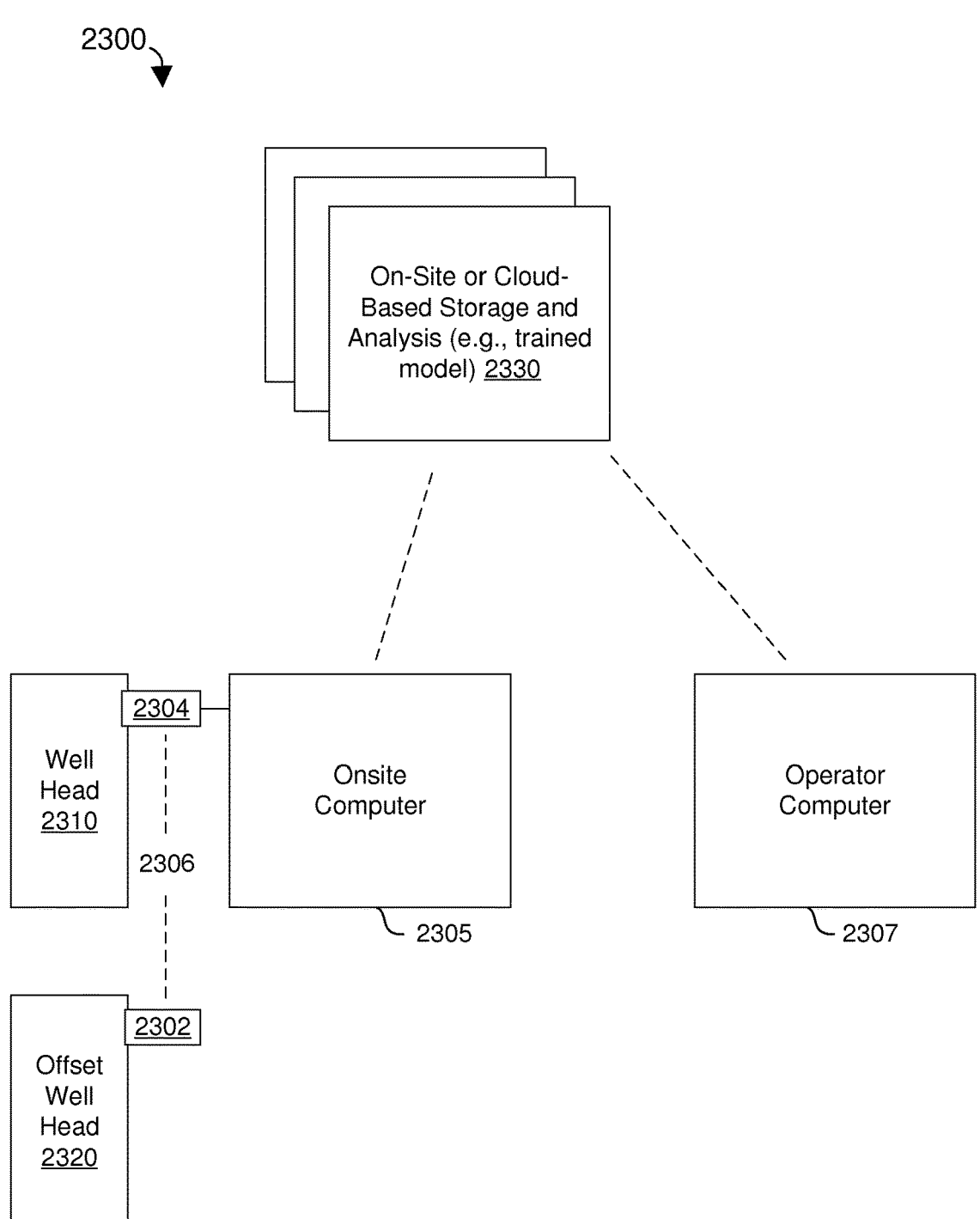
FIG. 23 illustrates an acoustic transmitter coupled to an offset well head being monitored, according to an alternate embodiment of the disclosure.
Figure 24:
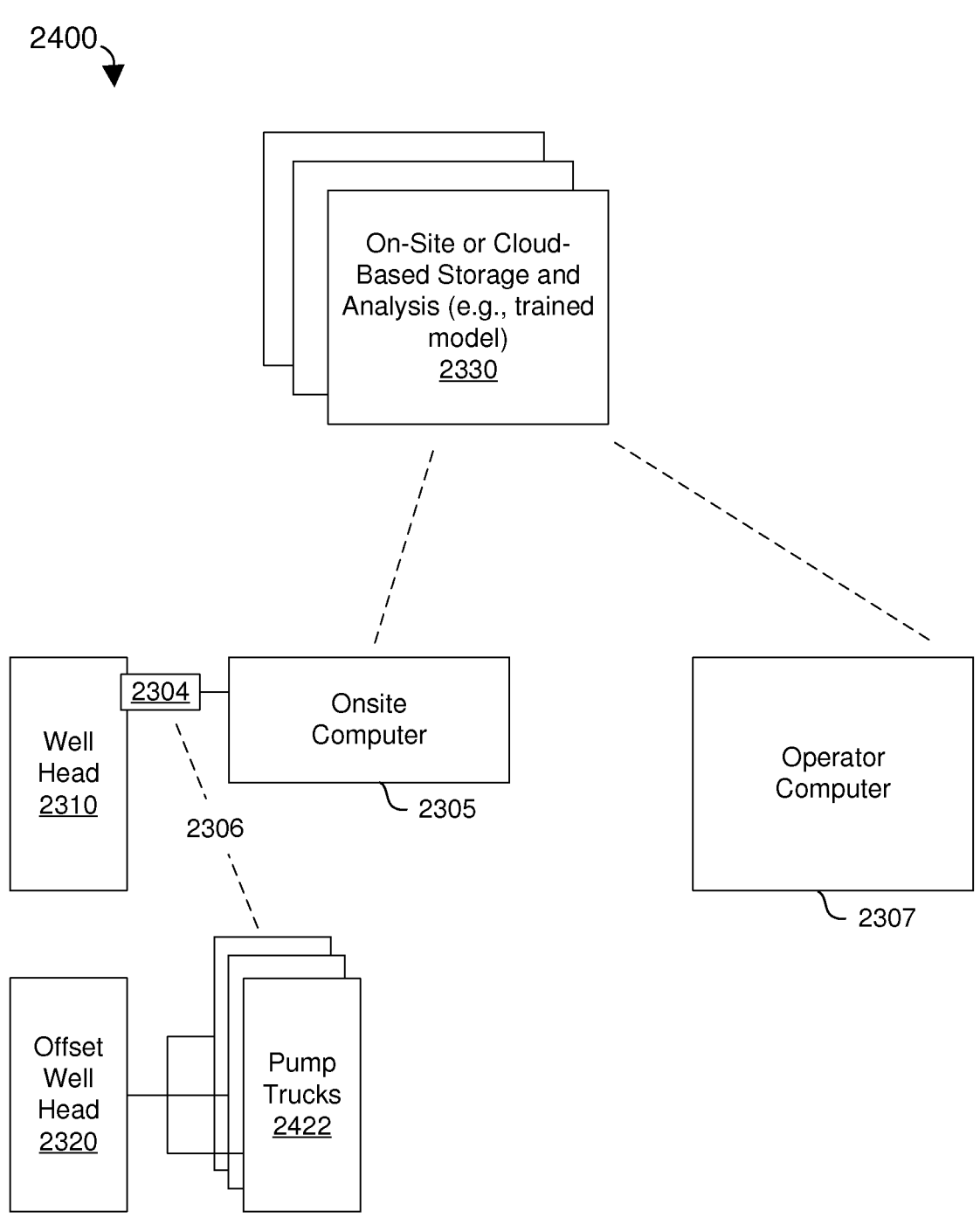
FIG. 24 illustrates a pump truck being used as an acoustic transmitter, according to an alternate embodiment of the disclosure.
Figure 25:
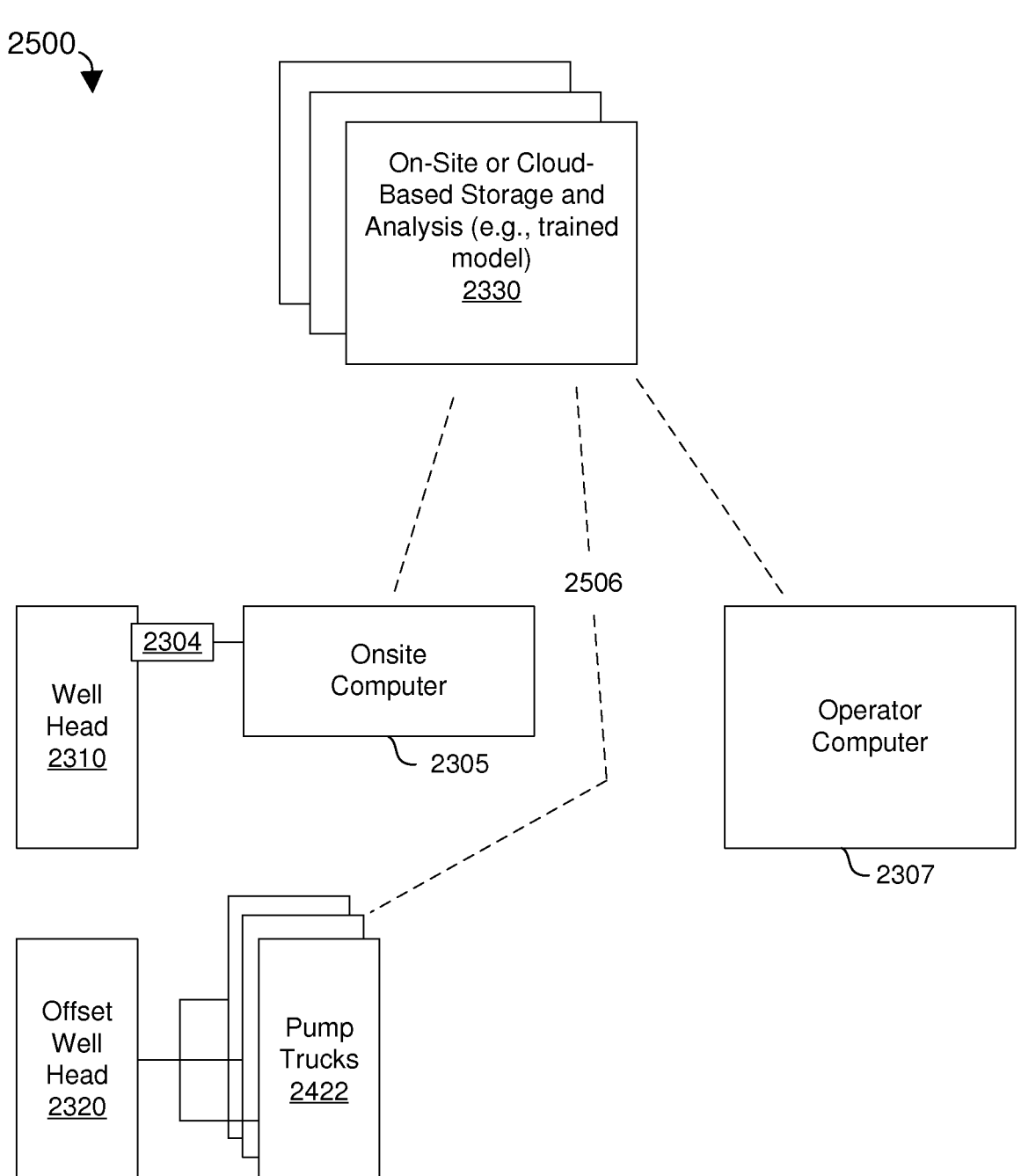
FIG. 25 illustrates a pump truck in communication with an on-site or cloud-based storage and analysis unit in FIG. 24, according to an alternate embodiment of the disclosure.

In some cases, FIGS. 23-25 implement one or more aspects of the figures described herein, including at least FIG. 1. For instance, FIGS. 23-25 illustrate drilling systems 2300-2500, which may be similar or substantially similar to drilling system 100 described in relation to FIG. 1. In some cases, FIG. 23 depicts one example embodiment for enhancing SNR based on collaboration between an acoustic sensor and an acoustic transmitter. As shown, the drilling system 2300 comprises an acoustic transmitter 2302 coupled to an offset wellhead 2320 (i.e., wellhead of an offset well). Further, the drilling system 2300 comprises a wellhead 2310 of an observation well, an onsite computer 2305, an operator computer 2307, and an on-site or cloud-based storage and analysis unit 2330. The well head 2310 of the observation well can include a sensor 2304 (e.g., acoustic or vibration sensor) in physical contact with fluid in the observation well or a component directly in contact with the fluid (e.g., a sensor affixed to an outside of the standpipe of wellhead). For instance, the sensor 2304 can be arranged within the wellhead, a circulating fluid line, or the standpipe. Alternatively, the sensor 2304 can be arranged at an end of a T-junction that runs roughly perpendicular to piping of the wellhead, a circulating fluid line, or the standpipe. In yet other cases, the sensor 2304 can be arranged within a pipe parallel to piping of the wellhead, circulating fluid line, or standpipe. The sensor 2304 can generate a signal and pass said signal to an onsite computer 2305, for instance, via an ADC (not shown). The onsite computer 2305 may be configured to process signals from one or more wellheads of a pad, or alternatively, from multiple pads.

In this example, the acoustic transmitter 2302 at the offset wellhead 2320 can be set to a frequency, or frequencies, or some other unique signal (e.g., pulsed frequencies with a predetermined frequency within each pulse and a predetermined duty cycle of the pulses) that the acoustic sensors 2304 are configured to look for. Alternatively, the transmitter 2302 and acoustic sensor 2304 can be in communication via a local area wireless network 2306 or some other network, wherein the acoustic sensor 2304 may be configured to receive indications of the signals to look for from the acoustic transmitter 2302. In some embodiments, if multiple acoustic transmitters 2302 are used, synced clocks or other applicable means may be used to ensure that the acoustic transmitters 2302 operate in phase.

In an embodiment, one or more pump trucks 2422 (also shown as pump trucks 122 in FIG. 1, or pump trucks 406 in FIG. 4) may be used as the acoustic transmitter, as seen in a drilling system 2400 in FIG. 24. Relative to other sources of noise in these systems, pump trucks 2422 may provide a distinct signal, especially in the frequency domain, since they tend to operate at relatively consistent pumping frequencies (e.g., 33 Hz at 2000 RPM). As shown, the acoustic sensor 2304 may be in communication with the pump trucks 2422, or one or more controllers of the pump trucks 2422. In this way, the acoustic sensor 2304 may receive an indication of the frequency that the pump trucks 2422 are operating at, for instance, over the local area wireless network 2306. Alternatively, the acoustic sensor 2304 may be configured to transmit instructions to the pump trucks 2422, or one or more controllers thereof, to operate at a desired frequency (e.g., 40 Hz).

In yet another embodiment seen in drilling system 2500 in FIG. 25, the pump trucks 2422 may be in communication with the on-site or cloud-based storage and analysis unit 2330 over a local area wireless network 2506, which may be similar or substantially similar to the network 2306 in FIGS. 23 and 24. In some embodiments, the on-site or cloud-based storage and analysis unit 2330 may include a trained model (e.g., as part of a machine-learning system), which may be similar or substantially similar to the on-site or cloud-based storage and analysis unit 112 previously described in relation to FIG. 1.

In this embodiment, the on-site or cloud-based storage and analysis unit 2330 can instruct the pump trucks 2422 to operate at a particular frequency (e.g., 33 Hz). Alternatively, the pump trucks 2422 may transmit an indication of what frequencies to look for to the on-site or cloud-based storage and analysis unit 2330. Either way, such a synchronization may assist the on-site or cloud-based storage and analysis unit 2330 in distinguishing the signals from the pump truck 2422 from the baseline noise, even though the signals pass through rock or other formations separating the offset well and the observation well.

Figure 26:
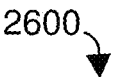
FIG. 26 illustrates a plurality of pump trucks being operated in phase for enhancing the signal-to-noise ratio at a conversion and analysis component, according to an alternate embodiment of the disclosure.
Figure 26:
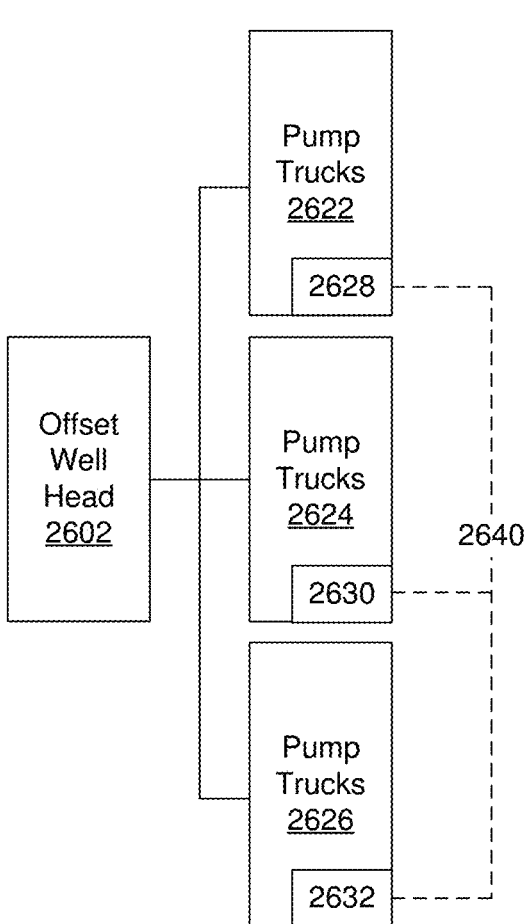

To further enhance signal to noise, one or more pump trucks 2622, 2624, and 2626 for an offset well comprising an offset wellhead 2602 may be operated in phase in drilling system 2600, as shown in FIG. 26. Operating the pump trucks in phase may serve to enhance the signal-to-noise ratio at a conversion and analysis component (e.g., via constructive interference). The conversion and analysis component discussed herein may be similar or substantially similar to the conversion and analysis component discussed in FIG. 1 and may comprise an on-site or cloud-based storage and analysis unit (shown as on-site or cloud-based storage and analysis unit 2330 in FIGS. 23-25). In some embodiments, the pumps on board the pump trucks 2622, 2624, and 2626 may be mechanically linked such that each pump operates at the same frequency and in phase. In another example, each pump truck 2622, 2630, 2632 for the given offset well head 2602 may comprise a digital controller 2628, 2630, 2632, where the digital controllers are wirelessly synced with each other. In this way, the different pumps of the pump trucks may also be operated at the same frequency and in phase. In some embodiments, the digital controllers 2628, 2630, 2632 may be configured to communicate via a local area network 2640, although network 2640 could also be a wide area network (WAN) in some embodiments. In some instances, where an electric fleet of pump trucks is being used, forcing the pumps to operate in phase may be even more practical since hardware to wirelessly control the pumps may already be in place. In another embodiment, the pumps on the pump trucks 2622, 2624, and 2626 may include a GPS-based clock such that the clocks of all the pump trucks 2622, 2624, and 2626 may be synchronized via a GPS signal rather than via network communication.

In some circumstances, such as when pump trucks are in use at both the observation well and the offset well, it may be difficult to discern the signals from the two groups of pump trucks. In such an instance, pump trucks coupled to the observation well can be operated at a first frequency or first frequency range that is different from and non-overlapping with a second frequency or second frequency range of the pump trucks coupled to the offset well. In this way, analysis of the spectrum can focus on the second frequency or second frequency range, and/or a filter (e.g., band-pass filter) may be used to remove or minimize the influence of the first frequency or first frequency range.

Figure 27:
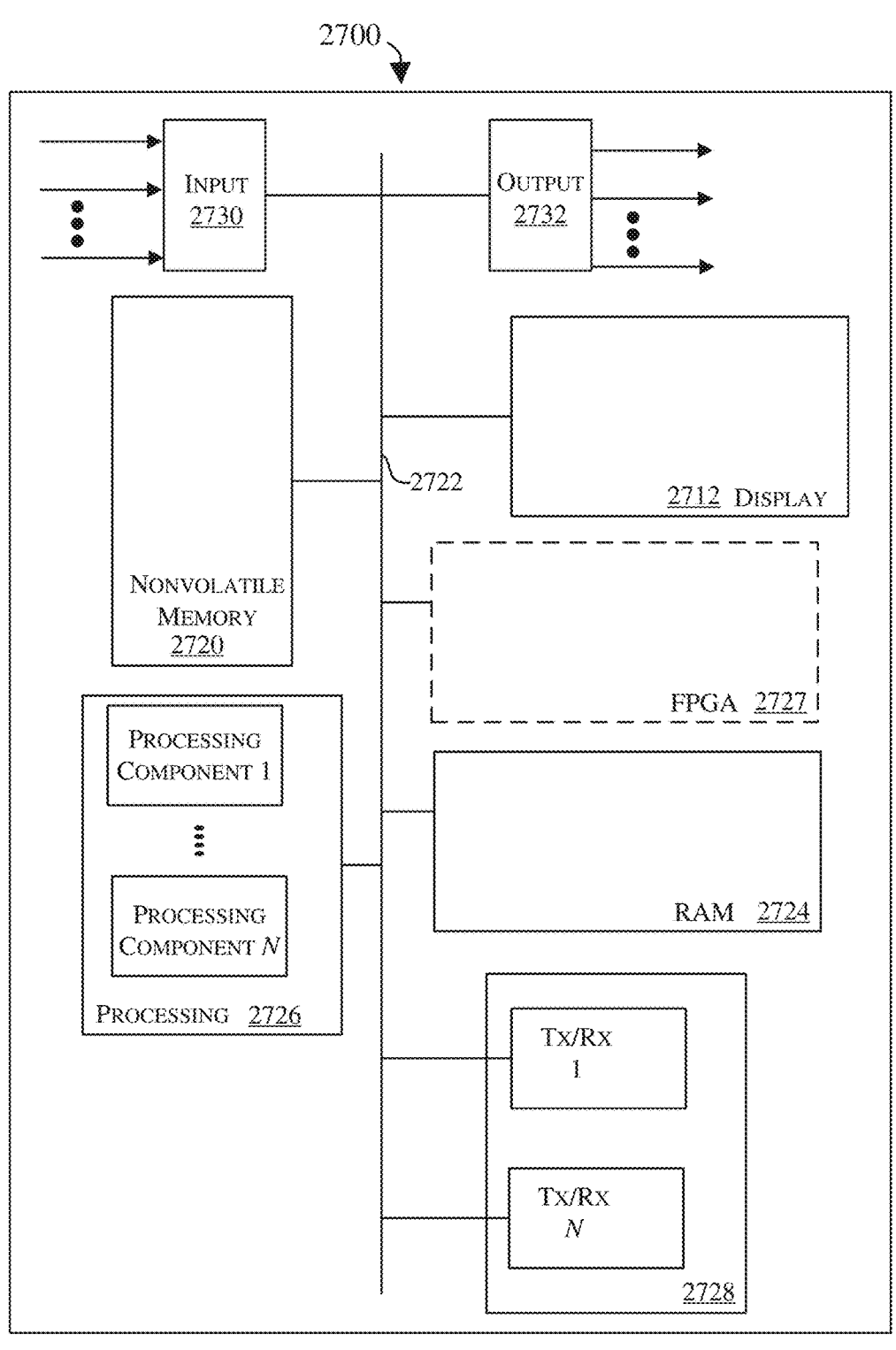
FIG. 27 is a block diagram depicting physical components that may be utilized to realize the one or more modules and subsystems in the figures described herein according to an exemplary embodiment.

The methods described in connection with the embodiments disclosed herein may be embodied directly in hardware, in processor-executable code encoded in a non-transitory tangible processor readable storage medium, or in a combination of the two. Referring to FIG. 27 for example, shown is a block diagram depicting physical components that may be utilized to realize the on-site or cloud-based storage and analysis 112, the insight 226, or the classification and predictions module 402 and/or the events and notifications module 403 in FIG. 4, or any of the modules and subsystems shown in FIG. 19, according to an exemplary embodiment. As shown, in this embodiment a display portion 2712 and nonvolatile memory 2720 are coupled to a bus 2722 that is also coupled to random access memory ("RAM") 2724, a processing portion (which includes N processing components) 2726, an optional field programmable gate array (FPGA) 2727, and a transceiver component 2728 that includes N transceivers. Although the components depicted in FIG. 27 represent physical components, FIG. 27 is not intended to be a detailed hardware diagram; thus many of the components depicted in FIG. 27 may be realized by common constructs or distributed among additional physical components. Moreover, it is contemplated that other existing and yet-to-be developed physical components and architectures may be utilized to implement the functional components described with reference to FIG. 27.

This display portion 2712 generally operates to provide a user interface for a user, and in several implementations, the display is realized by a touchscreen display. In general, the nonvolatile memory 2720 is non-transitory memory that functions to store (e.g., persistently store) data and processor-executable code (including executable code that is associated with effectuating the methods described herein). In some embodiments for example, the nonvolatile memory 2720 includes bootloader code, operating system code, file system code, and non-transitory processor-executable code to facilitate the execution of the methods discussed in reference to FIGS. 17A, 17B, and/or 21 described above.

In many implementations, the nonvolatile memory 2720 is realized by flash memory (e.g., NAND or ONENAND memory), but it is contemplated that other memory types may be utilized as well. Although it may be possible to execute the code from the nonvolatile memory 2720, the executable code in the nonvolatile memory is typically loaded into RAM 2724 and executed by one or more of the N processing components in the processing portion 2726.

The N processing components in connection with RAM 2724 generally operate to execute the instructions stored in nonvolatile memory 2720 to enable analysis of spectra using a trained model and to train the model. For example, non-transitory, processor-executable code to effectuate the methods described with reference to FIGS. 17A, 17B, and/or 21 may be persistently stored in nonvolatile memory 2720 and executed by the N processing components in connection with RAM 2724. As one of ordinarily skill in the art will appreciate, the processing portion 2726 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 2726 may be configured to effectuate one or more aspects of the methodologies described herein (e.g., the methods described with reference to FIGS. 17A, 17B, and/or 21). For example, non-transitory processor-readable instructions may be stored in the nonvolatile memory 2720 or in RAM 2724 and when executed on the processing portion 1926, cause the processing portion 2726 to perform utilization of a trained model to identify events of interest and to further train the model. Alternatively, non-transitory FPGA-configuration-instructions may be persistently stored in non-volatile memory 2720 and accessed by the processing portion 2726 (e.g., during boot up) to configure the hardware-configurable portions of the processing portion 2726 to effectuate the functions of the on-site or cloud-based storage and analysis 112, the insight 226, or the classification and predictions module 402 and events and notifications module 403 in FIG. 4.

The input component 2730 operates to receive signals (e.g., the raw data from acoustic or vibration sensors) that are indicative of one or more aspects of an observation or offset well. The signals received at the input component may include, for example, acoustic or vibrational raw data. The output component generally operates to provide one or more analog or digital signals to effectuate an operational aspect of the model. For example, the output portion 2732 may provide the operator warning or instruction described with reference to FIG. 1.

The depicted transceiver component 2728 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

Additional Embodiments

In some examples, the early warning system further comprises a converter configured to access the electrical signal from the memory and convert the electrical signal in the window of time into a current frequency domain spectrum from which the current frequency components can be analyzed. In some examples, the converter of the early warning system is configured to use a Fast-Fourier Transform. In some embodiments, the machine-learning system of the early warning system is configured to identify the impending fracture communication via analysis of the electrical signal in the frequency domain.

In some examples of the method, system (i.e., early warning system), computing platform, and non-transient computer-readable storage medium described herein the acoustic vibrations are caused by injecting the fracking fluid through perforations in a casing of the well under pressure in order to form subsurface fractures, the fracking fluid's flow through subsurface fractures, expansion of subsurface fractures, or a pumping truck at the offset well.

In some examples of the method, system (i.e., early warning system), computing platform, and non-transient computer-readable storage medium described herein the sensor samples at greater than 1 kHz.

In some examples of the method, system (i.e., early warning system), computing platform, and non-transient computer-readable storage medium described herein the sensor is an acoustic sensor. In some examples of the method, system (i.e., early warning system), computing platform, and non-transient computer-readable storage medium described herein the sensor is configured to be in contact with the fracking fluid in the well or with a surface of the circulating fluid line or the standpipe at the wellhead.

In some examples of the method, system (i.e., early warning system), computing platform, and non-transient computer-readable storage medium described herein the machine-learning system identifies the impending fracture communication by an increase in a number or decrease in bandwidth of frequency peaks in the current frequency components. In some other cases, the machine-learning system identifies the impending fracture communication based on an increase in bandwidth of frequency peaks in the current frequency components.

In some examples of the method, system (i.e., early warning system), computing platform, and non-transient computer-readable storage medium described herein the machine-learning system identifies the impending fracture communication by an increase in amplitude of the current frequency components. In some examples of the method, system (i.e., early warning system), computing platform, and non-transient computer-readable storage medium described herein the machine-learning system is trained on the previous frequency components of electrical signals measured during previous instances of fracture communication between wells as machine-learning inputs and associated fracture communication as a machine-learning output. In some examples of the method, system (i.e., early warning system), computing platform, and non-transient computer-readable storage medium described herein the machine-learning system is trained on previous fracture communications as machine-learning inputs and on the previous frequency components of electrical signals measured during previous instances of fracture communication between wells as machine-learning outputs.

In some examples of the method, system (i.e., early warning system), computing platform, and non-transient computer-readable storage medium described herein the machine-learning system is trained on previous pressure data measured during previous instances of fracture communication between wells. In some examples of the method, system (i.e., early warning system), computing platform, and non-transient computer-readable storage medium described herein the machine-learning system is trained on the previous frequency components of electrical signals measured during previous instances of fracture communication between wells.

In some examples of the method, system (i.e., early warning system), computing platform, and non-transient computer-readable storage medium described herein the machine-learning system is configured to analyze the current frequency components based on a grouping of previous frequency components measured during previous wireline operations that most closely match the current frequency components. Some examples of the method, system, computing platform, and non-transient computer-readable storage medium described above may further include processes, features, means, or instructions for analyzing the electrical signal for the window of time in the time domain and using this in addition to the analyzing the current frequency components to identify the impending fracture communication.

In some examples, the early warning system further comprises a pressure sensor configured to measure a pressure in the fracking fluid, wherein the machine-learning system is configured to analyze the pressure in combination with the current frequency components.

In some examples of the method, system (i.e., early warning system), computing platform, and non-transient computer-readable storage medium described herein the machine-learning system is configured to analyze the pressure in combination with the current frequency components.

In some examples of the method, system (i.e., early warning system), computing platform, and non-transient computer-readable storage medium described herein the machine-learning system is remote from the well and in communication with the sensor via a large area network.

In some examples, the early warning system further comprises: a wellbore with a casing; and a fracking pump.

In some examples the acoustic vibrations are caused by injecting the fracking fluid through perforations in a casing of the well under pressure in order to form subsurface fractures, the fracking fluid's flow through subsurface fractures, expansion of subsurface fractures, or a pumping truck at the offset well. In some examples, the sensor samples at greater than 1 kHz. In some examples, the sensor is an acoustic sensor.

In some examples of the method and non-transient computer-readable storage medium described herein, the method further comprises converting the electrical signal in the window of time to a frequency spectrum and analyzing the current frequency components in the frequency spectrum to identify impending fracture communication between the well and the offset well. In some examples of the method and non-transient computer-readable storage medium described herein, the method further comprises converting the electrical signal in the window of time to a frequency spectrum and analyzing the current frequency components in the frequency spectrum to identify impending fracture communication between the first and second wells.

In some examples of the method and non-transient computer-readable storage medium described herein the analyzing and the identifying is performed by a machine-learning system. In some examples of the method and non-transient computer-readable storage medium described herein the machine-learning system is trained on the previous frequency components of electrical signals measured during previous instances of fracture communication between wells. In some examples of the method and non-transient computer-readable storage medium described herein the machine-learning system is trained on pressure data measured during previous instances of fracture communication between wells.

In some examples of the method and non-transient computer-readable storage medium described herein the analyzing comprises monitoring increases in amplitude of the current frequency components. In some examples of the method and non-transient computer-readable storage medium described herein, the method further comprises analyzing the electrical signal in the time domain to identify impending fracture communication between the well and the offset well. In some examples of the method and non-transient computer-readable storage medium described herein, the method further comprises analyzing electrical signals from a pressure sensor at the wellhead, circulating fluid line, or standpipe of the well in addition to the electrical signal from the acoustic vibrations. In some examples of the method and non-transient computer-readable storage medium described herein, the method further comprises adjusting parameters of subsequent fracking operations to reduce chances of fracture communication between the well and the offset well.

In some examples of the method, system (i.e., early warning system), computing platform, and non-transient computer-readable storage medium described herein the analyzing comprises monitoring increases in amplitude of the current frequency components.

In some examples of the method and non-transient computer-readable storage medium described herein, the method further comprises analyzing the electrical signal in the time domain to identify impending fracture communication between the first and second wells.

In some examples of the method and non-transient computer-readable storage medium described herein, the method further comprises analyzing electrical signals from a pressure sensor at the wellhead, circulating fluid line, or standpipe of the second well in addition to the electrical signal from the acoustic vibrations.

In some examples of the method, system (i.e., early warning system), computing platform, and non-transient computer-readable storage medium described herein the adjusting comprises at least reducing fracking fluid pressure. In some examples of the method, system (i.e., early warning system), computing platform, and non-transient computer-readable storage medium described herein the adjusting comprises at least terminating a current fracking stage.

In some examples of the method, system (i.e., early warning system), computing platform, and non-transient computer-readable storage medium described herein the acoustic vibrations are caused by injecting fracking fluid through perforations in a casing of the offset well under pressure in order to form subsurface fractures, the fracking fluid's flow through subsurface fractures, expansion of subsurface fractures, or a pumping truck at the offset well.

In some examples of the method and non-transient computer-readable storage medium described herein, the method further comprises converting the electrical signal in the window of time to a frequency spectrum and analyzing the current frequency components in the frequency spectrum to identify impending fracture communication between the first well and the offset well.

In some examples of the method and non-transient computer-readable storage medium described herein, the method further comprises analyzing the electrical signal in the time domain to identify impending fracture communication between the first well and the offset well.

In some examples of the method and non-transient computer-readable storage medium described herein, the method further comprises analyzing electrical signals from a pressure sensor at the wellhead, circulating fluid line, or standpipe of the first well in addition to the electrical signal from the acoustic vibrations.

In some examples of the method and non-transient computer-readable storage medium described herein, the method further comprises adjusting parameters of subsequent fracking operations to reduce chances of fracture communication between the first well and the offset well.

In some examples of the method and non-transient computer-readable storage medium described herein the adjusting comprises at least reducing fracking fluid pressure. In some examples of the method and non-transient computer-readable storage medium described herein the adjusting comprises at least terminating a current fracking stage.

In some examples, the early warning system further comprises a converter configured to access the electrical signal from the memory and convert the electrical signal in the window of time into a current frequency domain spectrum from which the current frequency components can be analyzed. In some embodiments, the converter of the early warning system is configured to use a Fast-Fourier Transform. In some embodiments, the machine-learning system is configured to identify the impending fracture communication via analysis of the electrical signal in the frequency domain. In some embodiments, the acoustic vibrations are caused by injecting fracking fluid through perforations in a casing of the second well under pressure in order to form subsurface fractures, the fracking fluid's flow through subsurface fractures, expansion of subsurface fractures, or a pumping truck at the second well.

In some embodiments, the sensor of the early warning system is configured to be in contact with the fracking fluid in the first well or with a surface of the circulating fluid line or the standpipe at the wellhead. In some embodiments, the early warning system is configured to analyze electrical signals from a pressure sensor at the wellhead, circulating fluid line, or standpipe of the first well in addition to the electrical signal from the acoustic vibrations.

In some embodiments, the early warning system is configured to convert the electrical signal in the window of time to a frequency spectrum and analyze the current frequency components in the frequency spectrum to identify impending fracture communication between the first and second wells.

In some examples of the method, system, computing platform, and non-transient computer-readable storage medium described herein the sensor samples at greater than 1 kHz. In some examples of the method, system, and non-transient computer-readable storage medium described herein the sensor is an acoustic sensor.

In some examples of the method, system, computing platform, and non-transient computer-readable storage medium described herein the converter uses a Fast-Fourier transform to convert the electrical signal in a window of time into a current frequency domain spectrum.

In some examples of the method, system, computing platform, and non-transient computer-readable storage medium described herein the machine-learning system considers one or more of a number of frequency spikes in the current frequency domain spectrum, a width of one or more frequency spikes in the current frequency domain spectrum, and an amplitude of the one or more frequency spikes in the current frequency domain spectrum.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of predicting fracture communication between wells comprising:
   providing a sensor coupled to a wellhead, circulating fluid line, or standpipe of a well and configured to convert acoustic vibrations in fluid in the well into an electrical signal in a time domain;
   recording the electrical signal to a memory;
   analyzing current frequency components of the electrical signal in a window of time;
   identifying impending fracture communication between the well and an offset well where the current frequency components show sufficient similarity to previous frequency components measured during previous instances of fracture communication between wells; and
   returning a notification of the impeding fracture communication to an operator of the well.

2. The method of claim 1, wherein the acoustic vibrations are caused by injecting the fracking fluid through perforations in a casing of the well under pressure in order to form subsurface fractures, the fracking fluid's flow through subsurface fractures, expansion of subsurface fractures, or a pumping truck at the offset well.

3. The method of claim 1, wherein the sensor samples at greater than 1 kHz.

4. The method of claim 1, wherein the sensor is an acoustic sensor.

5. The method of claim 1, further comprising converting the electrical signal in the window of time to a frequency spectrum and analyzing the current frequency components in the frequency spectrum to identify impending fracture communication between the well and the offset well.

6. The method of claim 1, wherein the analyzing and the identifying is performed by a machine-learning system.

7. The method of claim 6, wherein the machine-learning system is trained on the previous frequency components of electrical signals measured during previous instances of fracture communication between wells.

8. The method of claim 7, wherein the machine-learning system is trained on pressure data measured during previous instances of fracture communication between wells.

9. The method of claim 6, wherein the analyzing comprises monitoring increases in amplitude of the current frequency components.

10. The method of claim 6, further comprising analyzing the electrical signal in the time domain to identify impending fracture communication between the well and the offset well.

11. The method of claim 6, further comprising analyzing electrical signals from a pressure sensor at the wellhead, circulating fluid line, or standpipe of the well in addition to the electrical signal from the acoustic vibrations.

12. The method of claim 6, further comprising adjusting parameters of subsequent fracking operations to reduce chances of fracture communication between the well and the offset well.

13. A method of preventing fracture communication between wells, the method comprising:

performing a fracking operation on a first well in a subterranean formation;

providing a sensor coupled to a wellhead, circulating fluid line, or standpipe of a second well and configured to convert acoustic vibrations in fluid in the second well into an electrical signal in a time domain;

recording the electrical signal to a memory;

analyzing current frequency components of the electrical signal in a window of time;

identifying impending fracture communication between the first and second wells where the current frequency components show sufficient similarity to previous frequency components measured during previous instances of fracture communication between wells; and adjusting parameters of the fracking operation on the first well to avoid the impending fracture communication between the first and second wells.

14. The method of claim 13, wherein the acoustic vibrations are caused by injecting fracking fluid through perforations in a casing of the first well under pressure in order to form subsurface fractures, the fracking fluid's flow through subsurface fractures, expansion of subsurface fractures, or a pumping truck at the first well.

15. The method of claim 13, wherein the sensor samples at greater than 1 kHz.

16. The method of claim 13, wherein the sensor is an acoustic sensor.

17. The method of claim 13, further comprising converting the electrical signal in the window of time to a frequency spectrum and analyzing the current frequency components in the frequency spectrum to identify impending fracture communication between the first and second wells.

18. The method of claim 13, wherein the analyzing and the identifying is performed by a machine-learning system.

19. The method of claim 18, wherein the machine-learning system is trained on the previous frequency components of electrical signals measured during previous instances of fracture communication between wells.

20. The method of claim 19, wherein the machine-learning system is trained on pressure data measured during previous instances of fracture communication between wells.

21. The method of claim 13, wherein the analyzing comprises monitoring increases in amplitude of the current frequency components.

22. The method of claim 13, further comprising analyzing the electrical signal in the time domain to identify impending fracture communication between the first and second wells.

23. The method of claim 13, further comprising analyzing electrical signals from a pressure sensor at the wellhead, circulating fluid line, or standpipe of the second well in addition to the electrical signal from the acoustic vibrations.

24. The method of claim 13, wherein the adjusting comprises at least reducing fracking fluid pressure.

25. The method of claim 13, wherein the adjusting comprises at least terminating a current fracking stage.

26. A method of training a machine-learning model to predict fracture communication between wells, the method comprising:

providing a sensor coupled to a wellhead, circulating fluid line, or standpipe of a first well and configured to convert acoustic vibrations in fluid in the first well into an electrical signal in a time domain;

recording the electrical signal to a memory;

analyzing current frequency components of the electrical signal in a window of time;

identifying, via a machine-learning system, impending fracture communication between the first well and an offset well where the current frequency components show sufficient similarity to previous frequency components measured during instances of fracture communication between wells; and wherein the machine-learning system is trained by grouping the current frequency components with similar ones of the previous frequency components that are also associated with fracture communication between wells.

27. The method of claim 26, wherein the acoustic vibrations are caused by injecting fracking fluid through perforations in a casing of the offset well under pressure in order to form subsurface fractures, the fracking fluid's flow through subsurface fractures, expansion of subsurface fractures, or a pumping truck at the offset well.

28. The method of claim 26, wherein the sensor samples at greater than 1 kHz.

29. The method of claim 26, wherein the sensor is an acoustic sensor.

30. The method of claim 26, further comprising converting the electrical signal in the window of time to a frequency spectrum and analyzing the current frequency components in the frequency spectrum to identify impending fracture communication between the first well and the offset well.

31. The method of claim 26, wherein the analyzing and the identifying is performed by a machine-learning system.

32. The method of claim 31, wherein the machine-learning system is trained on the previous frequency components of electrical signals measured during previous instances of fracture communication between wells.

33. The method of claim 32, wherein the machine-learning system is trained on pressure data measured during previous instances of fracture communication between wells.

34. The method of claim 26, wherein the analyzing comprises monitoring increases in amplitude of the current frequency components.

35. The method of claim 26, further comprising analyzing the electrical signal in the time domain to identify impending fracture communication between the first well and the offset well.

36. The method of claim 26, further comprising analyzing electrical signals from a pressure sensor at the wellhead, circulating fluid line, or standpipe of the first well in addition to the electrical signal from the acoustic vibrations.

37. The method of claim 26, further comprising adjusting parameters of subsequent fracking operations to reduce chances of fracture communication between the first well and the offset well.

38. The method of claim 37, wherein the adjusting comprises at least reducing fracking fluid pressure.

39. The method of claim 37, wherein the adjusting comprises at least terminating a current fracking stage.

40. A method of spacing wells to avoid fracture communication between the wells, the method comprising:

performing a fracking operation on a first well in a subterranean formation;

providing a sensor coupled to a wellhead, circulating fluid line, or standpipe of a second well and configured to convert acoustic vibrations in fluid in the second well into an electrical signal in a time domain;

recording the electrical signal to a memory;

analyzing frequency components of the electrical signal in a window of time;

identifying fracture communication between the first and second wells where the frequency components show sufficient similarity to previous frequency components measured during previous instances of fracture communication between wells; and adjusting a spacing of new wells based on the identifying fracture communication between the first and second wells.

\*   \*   \*   \*   \*